US012757202B2

(12) United States Patent
Ibrahim et al.

(10) Patent No.: US 12,757,202 B2
(45) Date of Patent: Oct. 6, 2026

(54) FULL-DUPLEX FOR LINE-OF-SIGHT MULTIPLE-INPUT MULTIPLE-OUTPUT

(71) Applicant: QUALCOMM Incorporated, San Diego, CA (US)

(72) Inventors: Abdelrahman Mohamed Ahmed Mohamed Ibrahim, San Diego, CA (US); Ahmed Elshafie, San Diego, CA (US); Krishna Kiran Mukkavilli, San Diego, CA (US); Muhammad Sayed Khairy Abdelghaffar, San Jose, CA (US); Ahmed Attia Abotabl, San Diego, CA (US); Renqiu Wang, San Diego, CA (US); Pinar Sen, San Diego, CA (US); Seyong Park, San Diego, CA (US); Naga Bhushan, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 18/693,866

(22) PCT Filed: Nov. 22, 2021

(86) PCT No.: PCT/CN2021/132014
§ 371 (c)(1),
(2) Date: Mar. 20, 2024

(87) PCT Pub. No.: WO2023/087297
PCT Pub. Date: May 25, 2023

(65) Prior Publication Data
US 2024/0389100 A1 Nov. 21, 2024

(51) Int. Cl.
*H04W 72/20* (2023.01)
*H04B 7/0413* (2017.01)
*H04L 5/14* (2006.01)

(52) U.S. Cl.
CPC .......... *H04W 72/20* (2023.01); *H04B 7/0413* (2013.01); *H04L 5/14* (2013.01)

(58) Field of Classification Search
CPC ......... H04W 72/20; H04B 7/0413; H04L 5/14
See application file for complete search history.

(56) References Cited

U.S. PATENT DOCUMENTS

2005/0227631 A1 10/2005 Robinett et al.
2013/0051288 A1 * 2/2013 Yamada .................. H04L 5/001
370/280

(Continued)

FOREIGN PATENT DOCUMENTS

CN 113365348 A 9/2021
EP 3439257 A1 * 2/2019 ........... H04B 7/0617

(Continued)

OTHER PUBLICATIONS

International Search Report and Written Opinion—PCT/CN2021/132014—ISA/EPO—Apr. 25, 2022 (2107545WO1).

(Continued)

*Primary Examiner* — Jamaal Henson
(74) *Attorney, Agent, or Firm* — Holland & Hart LLP

(57) ABSTRACT

Methods, systems, and devices for wireless communications are described. A first wireless device may transmit, to a second wireless device, a message indicating a capability of the first wireless device to support full-duplex line-of-sight (LOS) multiple-input multiple-output (MIMO) communications. The first wireless device may receive, from the second wireless device, control signaling indicating an uplink channel resource allocated for one or more uplink communications, a downlink channel resource allocated for one or more downlink communications, a first set of LOS MIMO transmission modes for the one or more uplink communications, and a second set of LOS MIMO transmission modes for the one or more downlink communications. The uplink channel (Continued)

resource may at least partially overlap with the downlink channel resource in time, frequency, or both. The first wireless device may communicate the one or more uplink communications and the one or more downlink communications based on the control signaling.

30 Claims, 22 Drawing Sheets

(56) References Cited

U.S. PATENT DOCUMENTS

| | | | | |
|---|---|---|---|---|
| 2013/0301485 | A1* | 11/2013 | Beale | H04L 5/1438 370/277 |
| 2014/0177742 | A1* | 6/2014 | Maltsev | H04B 7/0413 375/295 |
| 2014/0328228 | A1* | 11/2014 | Park | H04B 7/2656 370/280 |
| 2016/0249245 | A1 | 8/2016 | Kim et al. | |
| 2016/0344457 | A1 | 11/2016 | Olsson et al. | |
| 2017/0093472 | A1 | 3/2017 | George et al. | |
| 2017/0104576 | A1 | 4/2017 | Liu et al. | |
| 2017/0163403 | A1 | 6/2017 | Karjalainen et al. | |
| 2018/0270854 | A1* | 9/2018 | Lee | H04L 5/0044 |
| 2019/0089441 | A1 | 3/2019 | Sivahumaran | |
| 2020/0119788 | A1 | 4/2020 | Huang et al. | |
| 2020/0259625 | A1 | 8/2020 | Papasakellariou | |
| 2020/0367271 | A1 | 11/2020 | Bai et al. | |
| 2023/0387996 | A1* | 11/2023 | Leather | H04W 72/51 |

FOREIGN PATENT DOCUMENTS

| | | | |
|---|---|---|---|
| JP | 2015070295 | A | 4/2015 |
| JP | 2020048001 | A | 3/2020 |
| TW | 202130211 | A | 8/2021 |
| WO | WO-2011074265 | A1 | 6/2011 |
| WO | WO-2021128289 | A1 | 7/2021 |
| WO | WO-2021133412 | A1 | 7/2021 |
| WO | WO-2021146829 | A1 | 7/2021 |

OTHER PUBLICATIONS

Qualcomm Incorporated: "Resource Management for Enhanced Duplexing," 3GPP Draft, 3GPP TSG RAN WG1 Meeting #103-e, R1-2009269, 3rd Generation Partnership Project (3GPP), Mobile Competence Centre, 650, Route Des Lucioles, F-06921, Sophia-Antipolis Cedex, France, vol. RAN WG1, No. e-meeting, Oct. 26, 2020-Nov. 13, 2020, Oct. 24, 2020 (Oct. 24, 2020), XP051946932, 10 Pages.

Samsung: "Views on NR Duplexing", 3GPP TSG RAN WG1 Meeting #87, R1-1612560, Reno, US, Nov. 14-18, 2016, 3 Pages, Nov. 18, 2016 (Nov. 18, 2016) the whole document.

Taiwan Search Report TW111139419 TIPO Oct. 31, 2025 (2107545TW).

Supplementary European Search Report—EP21964449—Search Authority—The Hague—Jul. 3, 2025 (2107545EP).

* cited by examiner

600

601

602

FULL-DUPLEX FOR LINE-OF-SIGHT MULTIPLE-INPUT MULTIPLE-OUTPUT

CROSS REFERENCE

The present application is a 371 national stage filing of International PCT Application No. PCT/CN2021/132014 by IBRAHIM et al. entitled "FULL-DUPLEX FOR LINE-OF-SIGHT MULTIPLE-INPUT MULTIPLE-OUTPUT," filed Nov. 22, 2021, which is assigned to the assignee hereof, and which is expressly incorporated by reference in its entirety herein.

FIELD OF TECHNOLOGY

The following relates to wireless communications, including full-duplex for line-of-sight (LOS) multiple-input multiple-output (MIMO).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Components within a wireless communication system may be coupled (for example, operatively, communicatively, functionally, electronically, and/or electrically) to each other.

Some wireless devices may be capable of performing full-duplex communications. For example, a wireless device may be capable of transmitting a first signal while simultaneously receiving a second signal. In some cases, however, conventional full-duplex operations may not be suitable for line-of-sight (LOS) multiple-input multiple-output (MIMO) communication schemes.

SUMMARY

The described techniques relate to improved methods, systems, devices, and apparatuses that support full-duplex for line-of-sight (LOS) multiple-input multiple-output (MIMO). Generally, the described techniques provide for configuring a wireless device to perform full-duplex communications using different LOS MIMO transmission modes. A first wireless device may transmit, to a second wireless device, a message indicating a capability of the first wireless device to support full-duplex LOS MIMO communications. The first wireless device may receive, from the second wireless device, control signaling indicating an uplink channel resource allocated for one or more uplink communications, a downlink channel resource allocated for one or more downlink communications, a first set of LOS MIMO transmission modes for the one or more uplink communications, and a second set of LOS MIMO transmission modes for the one or more downlink communications. The uplink channel resource may at least partially overlap with the downlink channel resource in time, frequency, or both. The first wireless device may communicate the one or more uplink communications and the one or more downlink communications based on the control signaling.

A method for wireless communications at a first wireless device is described. The method may include transmitting, to a second wireless device, a message indicating a capability of the first wireless device to support full-duplex LOS MIMO communications, receiving control signaling from the second wireless device in response to the message, the control signaling indicating one or more of an uplink channel resource allocated for one or more uplink communications, a downlink channel resource allocated for one or more downlink communications, a first set of one or more LOS MIMO transmission modes to be used for the one or more uplink communications, or a second set of one or more LOS MIMO transmission modes to be used for the one or more downlink communications, where the uplink channel resource at least partially overlaps with the downlink channel resource in time, frequency, or both, and communicating the one or more uplink communications via the uplink channel resource in accordance with the first set of one or more LOS MIMO transmission modes and the one or more downlink communications via the downlink channel resource in accordance with the second set of one or more LOS MIMO transmission modes based on the control signaling.

An apparatus for wireless communications at a first wireless device is described. The apparatus may include a processor, memory coupled with the processor, and one or more instructions stored in the memory and executable by the processor to cause the apparatus to, based on the one or more instructions, transmit, to a second wireless device, a message indicating a capability of the first wireless device to support full-duplex LOS MIMO communications, receive control signaling from the second wireless device in response to the message, the control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both, and communicate the one or more uplink communications via the uplink channel resource in accordance with the first set of one or more LOS MIMO transmission modes and the one or more downlink communications via the downlink channel resource in accordance with the second set of one or more LOS MIMO transmission modes based on the control signaling.

Another apparatus for wireless communications at a first wireless device is described. The apparatus may include means for transmitting, to a second wireless device, a message indicating a capability of the first wireless device to support full-duplex LOS MIMO communications, means for receiving control signaling from the second wireless device in response to the message, the control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both, and means for communicating the one or more uplink communications via the uplink channel resource in accordance with the first set of one or more LOS MIMO transmission modes and the one or more downlink communications via the downlink channel resource in accordance with the second set of one or more LOS MIMO transmission modes based on the control signaling.

A non-transitory computer-readable medium storing code for wireless communications at a first wireless device is described. The code may include instructions executable by a processor to transmit, to a second wireless device, a message indicating a capability of the first wireless device to support full-duplex LOS MIMO communications, receive control signaling from the second wireless device in response to the message, the control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both, and communicate the one or more uplink communications via the uplink channel resource in accordance with the first set of one or more LOS MIMO transmission modes and the one or more downlink communications via the downlink channel resource in accordance with the second set of one or more LOS MIMO transmission modes based on the control signaling.

In some examples of the method, apparatuses, and non-transitory computer-readable medium described herein, receiving the control signaling may include operations, features, means, or instructions for receiving, from the second wireless device, a first control message indicating a mapping between multiple LOS MIMO transmission modes and multiple channel resource pairings, each channel resource pairing including a respective uplink channel resource of multiple uplink channel resources and a respective downlink channel resource of multiple downlink channel resources and receiving, from the second wireless device, a second control message indicating a first channel resource pairing of the multiple channel resource pairings including the uplink channel resource and the downlink channel resource.

In some examples of the method, apparatuses, and non-transitory computer-readable medium described herein, receiving the control signaling may include operations, features, means, or instructions for receiving, from the second wireless device, a first control message indicating a mapping between multiple LOS MIMO transmission modes and multiple transmission configuration indicator (TCI) states and receiving, from the second wireless device, a second control message indicating one or both of a first TCI state of the multiple TCI states to be used for the one or more uplink communications or a second TCI state of the multiple TCI states to be used for the one or more downlink communications.

In some examples of the method, apparatuses, and non-transitory computer-readable medium described herein, receiving the control signaling may include operations, features, means, or instructions for receiving, from the second wireless device, a first control message indicating a mapping between multiple LOS MIMO transmission modes and multiple polarizations and receiving, from the second wireless device, a second control message indicating one or both of a first polarization of the multiple polarizations to be used for transmission of the one or more uplink communications or a second polarization of the multiple polarizations to be used for transmission of the one or more downlink communications.

In some examples of the method, apparatuses, and non-transitory computer-readable medium described herein, receiving the control signaling may include operations, features, means, or instructions for receiving, from the second wireless device, a first control message indicating a mapping between multiple LOS MIMO transmission modes and multiple precoding schemes and receiving, from the second wireless device, a second control message indicating one or both of a first precoding scheme of the multiple precoding schemes to be used for transmission of the one or more uplink communications or a second precoding scheme of the multiple precoding schemes to be used for transmission of the one or more downlink communications.

In some examples of the method, apparatuses, and non-transitory computer-readable medium described herein, receiving the control signaling may include operations, features, means, or instructions for receiving the control signaling indicating the first set of one or more LOS MIMO transmission modes to be used for the one or more uplink communications, the first set of one or more LOS MIMO transmission modes corresponding to the uplink channel resource to be used for transmission of the one or more uplink communications, a transmission priority of the one or more uplink communications, a quality of service (QOS) threshold associated with the one or more uplink communications, a precoding scheme to be used for transmission of the one or more uplink communications, or a combination thereof.

In some examples of the method, apparatuses, and non-transitory computer-readable medium described herein, receiving the control signaling may include operations, features, means, or instructions for receiving the control signaling indicating the second set of one or more LOS MIMO transmission modes to be used for the one or more downlink communications, the second set of one or more LOS MIMO transmission modes corresponding to the downlink channel resource to be used for transmission of the one or more downlink communications, a transmission priority of the one or more downlink communications, a QoS threshold associated with the one or more downlink communications, a precoding scheme to be used for transmission of the one or more downlink communications, or a combination thereof.

In some examples of the method, apparatuses, and non-transitory computer-readable medium described herein, receiving the control signaling may include operations, features, means, or instructions for receiving the control signaling indicating a first set of one or more polarizations to be used for transmission of the one or more uplink communications, a second set of one or more polarizations to be used for transmission of the one or more downlink communications, or both.

In some examples of the method, apparatuses, and non-transitory computer-readable medium described herein, receiving the control signaling may include operations, features, means, or instructions for receiving the control signaling indicating a pattern of one or more LOS MIMO transmission modes to be used for the one or more uplink communications, the pattern corresponding to a transport block size (TBS) of the one or more uplink communications, a QoS threshold associated with the one or more uplink communications, a priority level of the one or more uplink communications, a TCI state to be used for the one or more uplink communications, or a combination thereof.

In some examples of the method, apparatuses, and non-transitory computer-readable medium described herein, receiving the control signaling may include operations, features, means, or instructions for receiving the control signaling indicating a pattern of LOS MIMO transmission modes to be used for the one or more downlink communications, the pattern corresponding to a TBS of the one or more downlink communications, a QoS threshold associated with the one or more downlink communications, a priority level of the one or more downlink communications, a TCI state to be used for the one or more downlink communications, or a combination thereof.

In some examples of the method, apparatuses, and non-transitory computer-readable medium described herein, receiving the control signaling may include operations, features, means, or instructions for receiving the control signaling indicating a number of uplink repetitions for the one or more uplink communications, a number of downlink repetitions for the one or more downlink communications, a mapping between the first set of one or more LOS MIMO transmission modes and the number of uplink repetitions, a mapping between the second set of one or more LOS MIMO transmission modes and the number of downlink repetitions, or a combination thereof.

In some examples of the method, apparatuses, and non-transitory computer-readable medium described herein, receiving the control signaling may include operations, features, means, or instructions for receiving one or more of a radio resource control (RRC) message or an instance of downlink control information (DCI) indicating the uplink channel resource, the downlink channel resource, the first set of one or more LOS MIMO transmission modes, the second set of one or more LOS MIMO transmission modes, or a combination thereof.

Some examples of the method, apparatuses, and non-transitory computer-readable medium described herein may further include operations, features, means, or instructions for determining a rotation matrix based on an alignment between a first antenna array of the first wireless device and a second antenna array of the second wireless device and compensating the one or more downlink communications, the one or more uplink communications, or both based on the rotation matrix.

In some examples of the method, apparatuses, and non-transitory computer-readable medium described herein, communicating the one or more uplink communications and the one or more downlink communications may include operations, features, means, or instructions for communicating the one or more uplink communications and the one or more downlink communications in accordance with a Slepian-based precoding scheme or a Legendre-based precoding scheme.

In some examples of the method, apparatuses, and non-transitory computer-readable medium described herein, communicating the one or more uplink communications and the one or more downlink communications may include operations, features, means, or instructions for communicating the one or more uplink communications and the one or more downlink communications using a uniform linear array (ULA) structure, a uniform rectangular array (URA) structure, a uniform circular array (UCA) structure, or a uniform planar array (UPA) structure.

A method for wireless communications at a first wireless device is described. The method may include receiving, from a second wireless device, a message indicating a capability of the second wireless device to support full-duplex LOS MIMO communications, transmitting, based on receiving the message from the second wireless device, control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both, and communicating the one or more uplink communications via the uplink channel resource in accordance with the first set of one or more LOS MIMO transmission modes and the one or more downlink communications via the downlink channel resource in accordance with the second set of one or more LOS MIMO transmission modes based on the control signaling.

An apparatus for wireless communications at a first wireless device is described. The apparatus may include a processor, memory coupled with the processor, and one or more instructions stored in the memory and executable by the processor to cause the apparatus to, based on the one or more instructions, receive, from a second wireless device, a message indicating a capability of the second wireless device to support full-duplex LOS MIMO communications, transmit, based on receiving the message from the second wireless device, control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both, and communicate the one or more uplink communications via the uplink channel resource in accordance with the first set of one or more LOS MIMO transmission modes and the one or more downlink communications via the downlink channel resource in accordance with the second set of one or more LOS MIMO transmission modes based on the control signaling.

Another apparatus for wireless communications at a first wireless device is described. The apparatus may include means for receiving, from a second wireless device, a message indicating a capability of the second wireless device to support full-duplex LOS MIMO communications, means for transmitting, based on receiving the message from the second wireless device, control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both, and means for communicating the one or more uplink communications via the uplink channel resource in accordance with the first set of one or more LOS MIMO transmission modes and the one or more downlink communications via the downlink channel resource in accordance with the second set of one or more LOS MIMO transmission modes based on the control signaling.

A non-transitory computer-readable medium storing code for wireless communications at a first wireless device is described. The code may include instructions executable by a processor to receive, from a second wireless device, a message indicating a capability of the second wireless device to support full-duplex LOS MIMO communications, transmit, based on receiving the message from the second wireless device, control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both, and communicate the one or more uplink communications via the uplink channel resource in accordance with the first set of one or more LOS MIMO transmission modes and the one or more downlink communications via the downlink channel resource in accordance with the second set of one or more LOS MIMO transmission modes based on the control signaling.

In some examples of the method, apparatuses, and non-transitory computer-readable medium described herein, transmitting the control signaling may include operations, features, means, or instructions for transmitting a first control message indicating a mapping between multiple LOS MIMO transmission modes and multiple channel resource pairings, each channel resource pairing including a respective uplink channel resource of multiple uplink channel resources and a respective downlink channel resource of multiple downlink channel resources and transmitting a second control message indicating a first channel resource pairing of the multiple channel resource pairings including the uplink channel resource and the downlink channel resource.

In some examples of the method, apparatuses, and non-transitory computer-readable medium described herein, transmitting the control signaling may include operations, features, means, or instructions for transmitting a first control message indicating a mapping between multiple LOS MIMO transmission modes and multiple TCI states and transmitting a second control message indicating one or both of a first TCI state to be used for the one or more uplink communications or a second TCI state to be used for the one or more downlink communications.

In some examples of the method, apparatuses, and non-transitory computer-readable medium described herein, transmitting the control signaling may include operations, features, means, or instructions for transmitting a first control message indicating a mapping between multiple LOS MIMO transmission modes and multiple polarizations and transmitting a second control message indicating one or both of a first polarization of the multiple polarizations to be used for transmission of the one or more uplink communications or a second polarization of the multiple polarizations to be used for transmission of the one or more downlink communications.

In some examples of the method, apparatuses, and non-transitory computer-readable medium described herein, transmitting the control signaling may include operations, features, means, or instructions for transmitting a first control message indicating a mapping between multiple LOS MIMO transmission modes and multiple precoding schemes and transmitting a second control message indicating one or both of a first precoding scheme of the multiple precoding schemes to be used for transmission of the one or more uplink communications or a second precoding scheme of the multiple precoding schemes to be used for transmission of the one or more downlink communications.

In some examples of the method, apparatuses, and non-transitory computer-readable medium described herein, transmitting the control signaling may include operations, features, means, or instructions for transmitting the control signaling indicating the first set of one or more LOS MIMO transmission modes to be used for the one or more uplink communications, where the first set of one or more LOS MIMO transmission modes corresponds to the uplink channel resource to be used for transmission of the one or more uplink communications, a transmission priority of the one or more uplink communications, a QoS threshold associated with the one or more uplink communications, a precoding scheme to be used for transmission of the one or more uplink communications, or a combination thereof.

In some examples of the method, apparatuses, and non-transitory computer-readable medium described herein, transmitting the control signaling may include operations, features, means, or instructions for transmitting the control signaling indicating the second set of one or more LOS MIMO transmission modes to be used for the one or more downlink communications, where the second set of one or more LOS MIMO transmission modes corresponds to the downlink channel resource to be used for transmission of the one or more downlink communications, a transmission priority of the one or more downlink communications, a QoS threshold associated with the one or more downlink communications, a precoding scheme to be used for the one or more downlink communications, or a combination thereof.

In some examples of the method, apparatuses, and non-transitory computer-readable medium described herein, transmitting the control signaling may include operations, features, means, or instructions for transmitting the control signaling indicating a first set of one or more polarizations to be used for transmission of the one or more uplink communications, a second set of one or more polarizations to be used for transmission of the one or more downlink communications, or both.

In some examples of the method, apparatuses, and non-transitory computer-readable medium described herein, transmitting the control signaling may include operations, features, means, or instructions for transmitting the control signaling indicating a pattern of one or more LOS MIMO transmission modes to be used (e.g., at the transmit side or the receive side) for the one or more uplink communications, the pattern corresponding to a TBS of the one or more uplink communications, a QoS threshold associated with the one or more uplink communications, a priority level of the one or more uplink communications, a TCI state to be used (e.g., at the transmit side or the receive side) for the one or more uplink communications, or a combination thereof.

In some examples of the method, apparatuses, and non-transitory computer-readable medium described herein, transmitting the control signaling may include operations, features, means, or instructions for transmitting the control signaling indicating a pattern of LOS MIMO transmission modes to be used for the one or more downlink communications, the pattern corresponding to a TBS of the one or more downlink communications, a QoS threshold associated with the one or more downlink communications, a priority level of the one or more downlink communications, a TCI state to be used for the one or more downlink communications, or a combination thereof.

In some examples of the method, apparatuses, and non-transitory computer-readable medium described herein, transmitting the control signaling may include operations, features, means, or instructions for transmitting the control signaling indicating a number of uplink repetitions for the one or more uplink communications, a number of downlink repetitions for the one or more downlink communications, a mapping between the first set of one or more LOS MIMO transmission modes and the number of uplink repetitions, a mapping between the second set of one or more LOS MIMO transmission modes and the number of downlink repetitions, or a combination thereof.

In some examples of the method, apparatuses, and non-transitory computer-readable medium described herein, transmitting the control signaling may include operations, features, means, or instructions for transmitting one or more of an RRC message or an instance of DCI indicating the uplink channel resource, the downlink channel resource, the first set of one or more LOS MIMO transmission modes, the second set of one or more LOS MIMO transmission modes, or a combination thereof.

Some examples of the method, apparatuses, and non-transitory computer-readable medium described herein may further include operations, features, means, or instructions for determining an interference estimate based on the first set of one or more LOS MIMO transmission modes and the second set of one or more LOS MIMO transmission modes and compensating the one or more downlink communications, the one or more uplink communications, or both based on the interference estimate.

DETAILED DESCRIPTION

Figure 1:
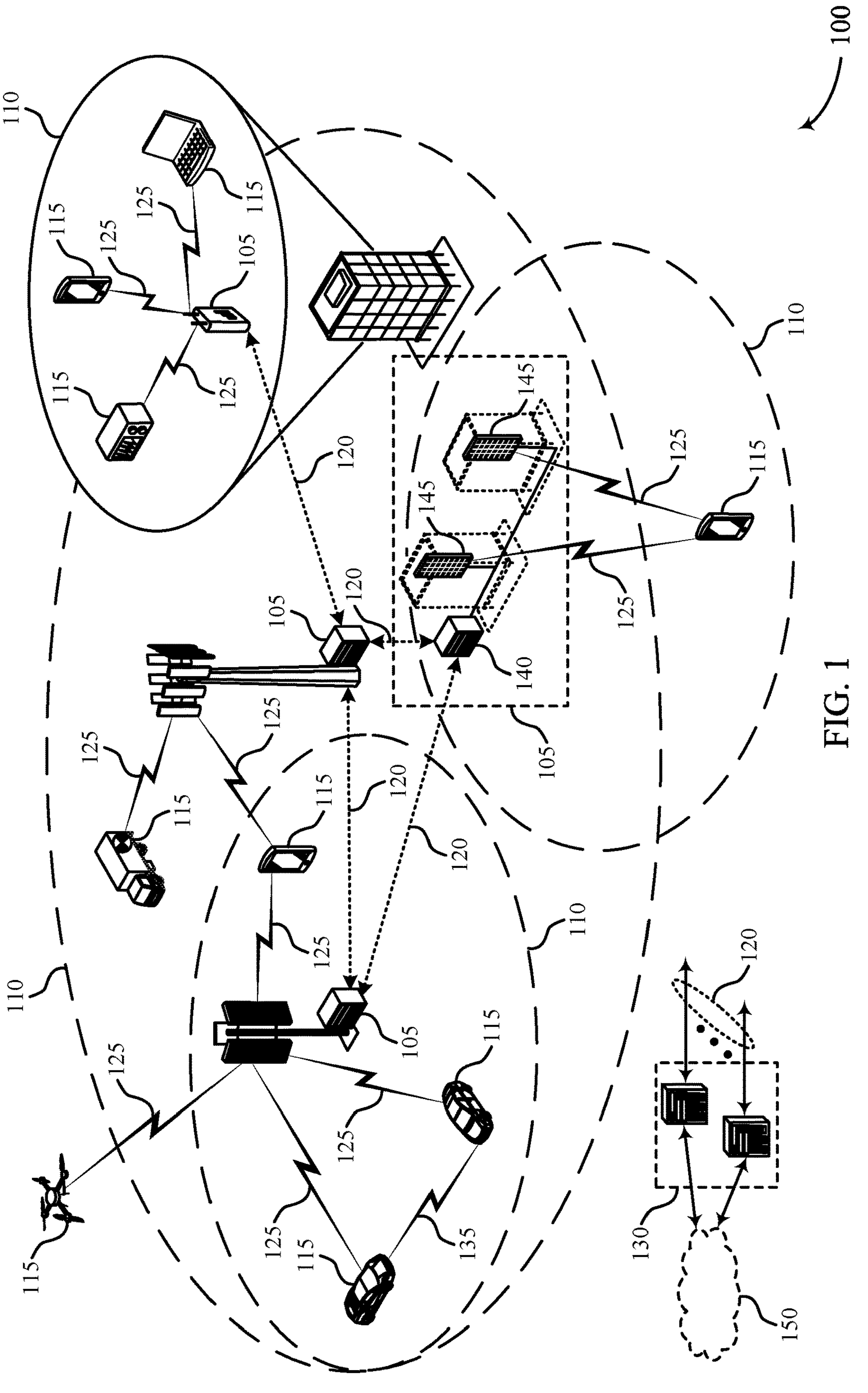
FIGS. 1 and 2 illustrate examples of wireless communications systems that support full-duplex for line-of-sight (LOS) multiple-input multiple-output (MIMO) in accordance with aspects of the present disclosure.

Some wireless communication systems may support line-of-sight (LOS) multiple-input multiple-output (MIMO) communications between wireless devices. For example, if there is a LOS channel between a first wireless device and a second wireless device (e.g., if there are no obstructions between the first wireless device and the second wireless device) and a distance between the first wireless device and the second wireless device is below a threshold, the first wireless device and the second wireless device may communicate using a LOS MIMO communication scheme. Using LOS MIMO may enable the first wireless device and the second wireless device to attain higher multiplexing gain.

However, existing LOS MIMO schemes may be limited to half-duplex communications. That is, existing LOS MIMO schemes may not be suitable for full-duplex communications (e.g., communications that involve simultaneous transmission and reception) between the first wireless device and the second wireless device. For example, existing LOS MIMO schemes may result in higher self-interference (e.g., interference between simultaneous transmission and reception operations) and lower communication reliability when used for full-duplex communications. Thus, using conventional LOS MIMO schemes for full-duplex may reduce the likelihood of successful communications between the first wireless device and the second wireless device.

Aspects of the present disclosure provide for enabling full-duplex LOS MIMO communications. Specifically, the techniques described herein provide for configuring a wireless device to perform full-duplex LOS MIMO communications using different transmission modes (e.g., antenna weighting schemes) and precoding schemes that result in decreased self-interference and higher signal quality. As an example, a first wireless device (e.g., a user equipment (UE)) may transmit a capability message to a second wireless device (e.g., a base station). The capability message may indicate a capability of the first wireless device to support full-duplex LOS MIMO communications (e.g., no support, partial support, or full support). The second wireless device may transmit control signaling to the first wireless device based on receiving the capability message. The control signaling may indicate a set of resources allocated for full-duplex LOS MIMO communications and a set of transmission modes to be used for the full-duplex LOS MIMO communications.

The transmission modes indicated by the control signaling may correspond to different precoding schemes (e.g., singular value decomposition (SVD) precoding schemes) that reduce inter-layer interference at the first wireless device. Accordingly, the first wireless device and the second wireless device may perform the full-duplex MIMO communications via the set of resources in accordance with the set of transmission modes indicated by the control signaling. The techniques described herein may enable the first wireless device and the second wireless device to attain higher throughput levels (e.g., by performing simultaneous transmission and reception) and higher multiplexing gain (e.g., by using LOS MIMO) without decreasing the reliability of communications between the first wireless device and the second wireless device.

Aspects of the disclosure are initially described in the context of wireless communications systems, antenna array structures, transmission mode correlations, resource diagrams, communication schemes, full-duplex configurations, and process flows. Aspects of the disclosure are further illustrated by and described with reference to apparatus diagrams, system diagrams, and flowcharts that relate to full-duplex for LOS MIMO.

FIG. 1 illustrates an example of a wireless communications system 100 that supports full-duplex for LOS MIMO in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a device such as a cellular phone, a smart phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or a machine type communication (MTC) device, or the like, which may be implemented in various articles such as appliances, drones, robots, vehicles, meters, or the like.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as category (CAT)-M, CAT M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRP). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may support LOS MIMO and massive MIMO. LOS MIMO may be based on a Rician channel model, where LOS percentage is equal to $a^2$. A Rician channel model for LOS MIMO may be derived using Equations 1 through 3. In Equation 1, a is a LOS component, b is a non-LOS component, H is a channel matrix, $H_{LOS}$ is a LOS channel matrix, and $H_{NLOS}$ is a non-LOS channel matrix. In Equation 2, $r_{jk}$ is a distance between a receive antenna element at a receiving device and a transmit antenna element at a transmitting device, and λ is the wavelength of a signal transmitted by the transmitting device.

Circular, one-dimensional (1D), or two-dimensional (2D) antenna arrays can be used for LOS MIMO, whereas 1D or 2D antenna arrays may be used for massive MIMO. LOS MIMO may involve a large (e.g., strong) LOS component (e.g., where a is greater than 0.9 and b is less than 0.1, such that the LOS component accounts for more than 90% of the equivalent channel), whereas massive MIMO may involve a smaller (e.g., weaker) LOS component (e.g., where a is less than b). LOS MIMO may involve an implicit SVD-based precoder, which may be based on a specific channel structure with limited or no channel state feedback. In contrast, massive MIMO may utilize an explicit SVD-based precoder, and channel state feedback may be needed at the transmit-side to compute this SVD-based precoder.

$$H = aH_{LOS} + bH_{NLOS};\ a^2 + b^2 = 1 \tag{1}$$

$$H_{LOS} = \frac{\exp\left(-i2\pi\frac{r_{jk}}{\lambda}\right)}{r_{jk}/\lambda} \tag{2}$$

$$H_{NLOS} \in \{i.i.d.\ \text{Rayleigh},\ \text{clustered delay line}\ (CDL)-x,\ \text{tapped delay line}\ (TDL)-x\} \tag{3}$$

Aspects of the present disclosure may enable devices (e.g., base stations, UEs, relay nodes) to perform full-duplex LOS MIMO communications with improved communication reliability, reduced interference, and higher multiplexing gain, among other benefits. For example, the described techniques may enable devices to perform simultaneous transmission and reception using a specific combination of LOS MIMO transmission modes (e.g., orbital angular momentum (OAM) modes, singular modes) that results in lower interference and higher reliability. Specifically, the combination of transmission modes may result in greater isolation between uplink and downlink operations, which may increase the likelihood of the devices successfully performing full-duplex LOS MIMO communications.

Figure 2:
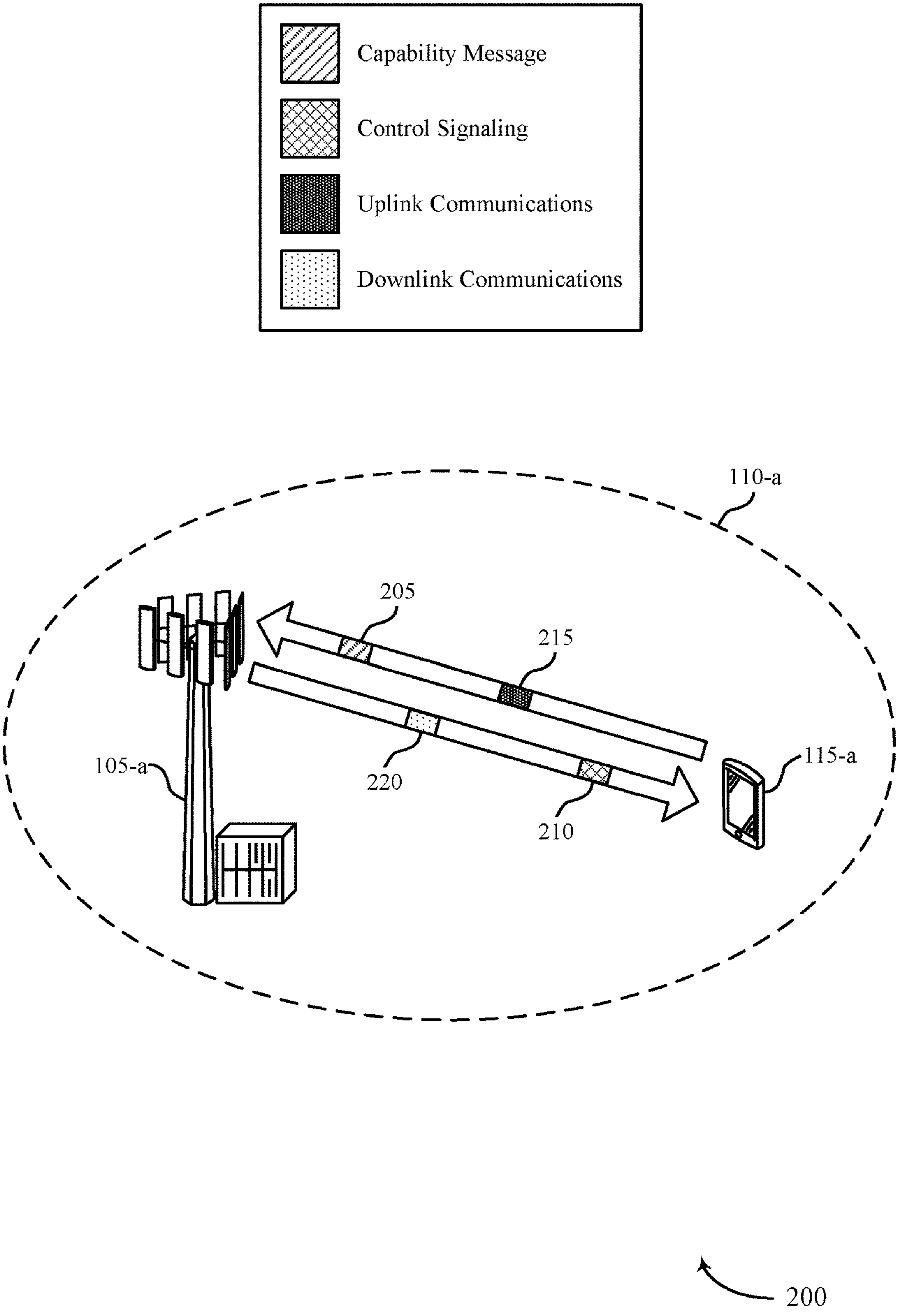

FIG. 2 illustrates an example of a wireless communications system 200 that supports full-duplex for LOS MIMO in accordance with aspects of the present disclosure. The wireless communications system 200 may implement or be implemented by aspects of the wireless communications system 100. For example, the wireless communications system 200 may include a base station 105-*a* and a UE 115-*a*, which may be examples of corresponding devices described with reference to FIG. 1. The base station 105-*a* and the UE 115-*a* may communicate within a geographic coverage area 110-*a*, which may be an example of a geographic coverage area 110 described with reference to FIG. 1. In the wireless communications system 200, the UE 115-*a* may perform full-duplex communications with the base station 105-*a* in accordance with a LOS MIMO communication scheme.

The wireless communications system 200 may have specific conditions for uplink and downlink multiplexing on LOS MIMO modes. For example, the wireless communications system 200 may have conditions for attaining sufficient isolation between uplink and downlink. These conditions may include a large LOS component (e.g., where a is larger than b in Equation 1) and a sync timeline (e.g., whether a misalignment in time between downlink and uplink is within a cyclic prefix (CP)). If misalignment between downlink and uplink are within a CP, inter-symbol interference (ISI) impact may be limited. The wireless communications system 200 may support techniques to reduce misalignment in full-duplex mode by applying an extended CP and a partial timing advance (TA). Physical alignment between transmit and receive arrays of the base station 105-*a* and the UE 115-*a* may be a prerequisite for attaining sufficient isolation between uplink and downlink. Alternatively, if there is misalignment between transmit and receive arrays of the base station 105-*a* and the UE 115-*a*, the misalignment may be compensated for in LOS MIMO operations.

In the following description of the wireless communications system 200, it may be assumed that the transmit and receive arrays of the base station 105-*a* and the UE 115-*a* are aligned or that misalignment between the transmit and receive arrays of the base station 105-*a* and the UE 115-*a* is estimated and compensated to achieve LOS MIMO multiplexing gain. For example, compensation of x-axis or y-axis rotation can be achieved by updating a precoding matrix and a combining matrix. Using multiple panels or TRPs can improve isolation between uplink and downlink. In some cases, misalignment compensation may be performed per panel or per TRP.

The wireless communications system 200 may support mapping modes for downlink and uplink, which may apply for both OAM modes and singular modes (e.g., SVD modes) in general for uniform linear array (ULA) and uniform rectangular array (URA) antenna structures. These mapped modes, also referred to herein as LOS MIMO modes or transmission modes, may be utilized for full-duplex sessions between the base station 105-*a* (e.g., a TRP) and the UE 115-*a* (e.g., a relay device). For dynamic physical downlink shared channel (PDSCH) or physical uplink shared channel (PUSCH), the base station 105-*a* may indicate modes used for downlink and modes used for uplink in scheduling downlink control information (DCI). For configured grant uplink or semi-persistent scheduled (SPS) downlink transmissions, the base station 105-*a* may indicate these modes in an RRC configuration per SPS or configured grant configuration (e.g., per index) or in an activation or deactivation DCI (e.g., for SPS and configured grant type 2). The base station 105-*a* can also indicate the modes to be used by the UE for transmission of uplink control information (UCI). These signals may be sent by a single mode or multiple modes repeating the same signal. Alternatively, modes used for physical downlink control channel (PDCCH) transmissions, such as DCI, may be predefined.

The following description of the wireless communications system 200 may apply for both OAM modes and singular modes in general for ULA and URA structures, and may indicate how the base station 105-*a* determines a mapping of modes to uplink or downlink. In some examples, the base station 105-*a* may determine the mapping based on a channel pairing in full-duplex. This channel pairing may be channel-dependent. For example, a PDSCH and physical uplink control channel (PUCCH) channel pairing may be associated with a higher detectability in comparison to a channel pairing of PDSCH and PUSCH. The base station 105-*a* may assign modes based on a threshold isolation level between scheduled channels and a threshold detection signal to interference and noise ratio (SINR). The mapping may also be based on transmission priority or QoS. For example, the base station 105-*a* may associate specific mode patterns with a specific priority. For SPS transmissions and configured grant-based transmissions, this priority may be configured via RRC, and may not change with DCI. As such, the configuration may be semi-static. Other constraints such as type of precoder used and open or closed loop operation may also be considered when determining this mapping.

The base station 105-*a* can also indicate to the UE 115-*a* how to use OAM modes for uplink repetitions or downlink repetitions. That is, the base station 105-*a* can map repetitions to a pattern of modes. For example, a repetition sequence for an uplink or downlink communication can map to a sequence of modes, where each repetition is communicated using a respective mode in the sequence of modes. Additionally or alternatively, the base station 105-*a* can define multiple patterns of mode assignments, and may parameterize these patterns based on a transport block size (TBS), a QoS threshold, or a transmission priority. Accordingly, the base station 105-*a* may signal a pattern index to UE 115-*a* via DCI. Alternatively, or additionally, the UE 115-*a* can determine this pattern based on predefined rules, a transmission priority, or a TBS, among other examples. The mode pattern used for uplink and downlink can also depend on an active transmission configuration indicator (TCI) state of the UE 115-*a* or the base station 105-*a*. That is, the selection of uplink or downlink beams can affect mode assignment.

The base station 105-*a* may also consider different polarization states (e.g., antenna polarizations) and power constraints when determining the mapping. For example, different LOS MIMO modes may be indicated or defined per polarization. Different polarizations can be used to improve isolation between uplink and downlink. As an example, the base station 105-*a* may assign different LOS MIMO modes for downlink and uplink, and the LOS MIMO modes assigned for downlink and uplink may correspond to different polarizations. That is, downlink LOS MIMO modes can be mapped to a first polarization (e.g., a horizontal polarization), while uplink LOS MIMO modes can be mapped to a second polarization (e.g., a vertical polarization). The base station 105-*a* can consider both LOS MIMO modes and polarizations when scheduling communications with the UE 115-*a*. In some examples, LOS MIMO modes with lower isolation can be used with different polarizations, which may increase the likelihood of successful communications when using these modes. The base station 105-*a* can also improve power allocation over the modes and the selected polarization to attain desired downlink and uplink performance (e.g., a target throughput or block error rate (BLER)).

For in-band full duplex (IBFD), the main source of interference may be linear interference caused by a signal transmitted by the base station 105-*a*. In such examples, the base station 105-*a* can estimate a correlation between LOS MIMO modes and acquire information related to the transmitted signal. Accordingly, the base station 105-*a* (e.g., a full-duplex node) can construct and cancel this interference based on the correlation between LOS MIMO modes. Specifically, the base station 105-*a* may construct and cancel this interference using Equation 4, where y is a signal received by a receiving device (e.g., the base station 105-*a*), $\tilde{H}_{Tx\_Rx}$ is a first equivalent channel matrix between a transmitting device (e.g., the UE 115-*a*) and the receiving device, $\tilde{H}_{Jam\_Rx}$ is a second equivalent channel matrix between a jamming device (e.g., the base station 105-*a* or another device) and the receiving device (e.g., the base station 105-*a*), n is a noise adjustment factor, $\sqrt{\rho}$ is a power scaling coefficient multiplied by the second equivalent channel matrix, x is a signal transmitted by the transmitting device (e.g., the UE 115-*a*), and z is a signal transmitted by the jamming device.

$$y = \tilde{H}_{Tx\_Rx}x + \sqrt{\rho}\,\tilde{H}_{Jam\_Rx}z + n \qquad (4)$$

In the example of FIG. 2, the UE 115-*a* may transmit a capability message 205 indicating a capability of the UE 115-*a* to support full-duplex LOS MIMO communications. In response to (e.g., subsequent to receiving) the capability message 205, the base station 105-*a* may transmit control signaling 210 to the UE 115-*a*. For example, the base station 105-*a* may transmit the control signaling 210 to the UE 115-*a* after (e.g., based on) receiving the capability message 205 from the UE 115-*a*. The control signaling 210 may indicate uplink resources, downlink resources, and LOS MIMO transmission modes to be used for full-duplex communications between the base station 105-*a* and the UE 115-*a*. Accordingly, the base station 105-*a* transmit downlink communications 220 to the UE 115-*a* while simultaneously receiving uplink communications 215 from the UE 115-*a*. For example, the base station 105-*a* may transmit the downlink communications 220 using a first set of one or more LOS MIMO communication modes (e.g., SVD precoding schemes), and the UE 115-*a* may transmit the uplink communications 215 using a second set of one or more LOS MIMO communication modes. The combination of the first set of LOS MIMO communication modes and the second set of one or more LOS MIMO communication modes may result in reduced interference at the UE 115-*a* and the base station 105-*a* for full-duplex communication.

The wireless communications system 200 may enable the base station 105-*a* and the UE 115-*a* to perform full-duplex LOS MIMO communications with improved communication reliability, reduced interference, and higher multiplexing gain, among other benefits. For example, the described techniques may enable the base station 105-*a* and the UE 115-*a* to perform simultaneous transmission and reception using a specific combination of transmission modes (e.g., OAM modes, singular modes) that results in lower interference and higher reliability. Specifically, the combination of transmission modes may result in greater isolation between uplink and downlink operations, which may increase the likelihood of the base station 105-*a* and the UE 115-*a* successfully performing full-duplex LOS MIMO communications.

Figure 3:
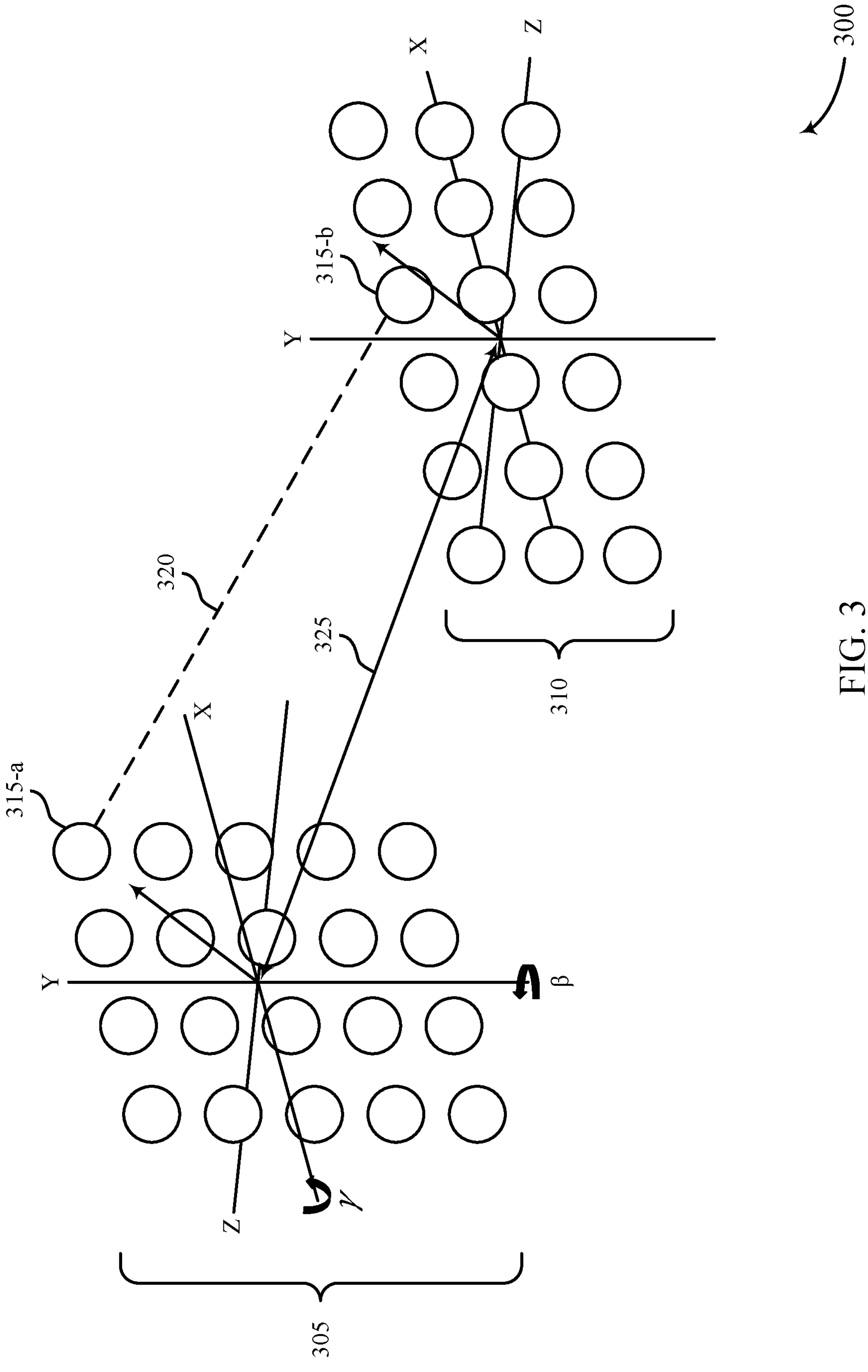
FIG. 3 illustrates an example of an antenna array structure that supports full-duplex for LOS MIMO in accordance with aspects of the present disclosure.

FIG. 3 illustrates an example of an antenna array structure 300 that supports full-duplex for LOS MIMO in accordance with aspects of the present disclosure. The antenna array structure 300 may implement or be implemented by aspects of the wireless communications system 100 or the wireless communications system 200. For example, the antenna array structure 300 may implement or be implemented by a UE or a base station, which may be examples of corresponding devices described with reference to FIGS. 1 and 2. The antenna array structure 300 may illustrate an example of a LOS MIMO channel between a transmit antenna array 305 and a receive antenna array 310.

The antenna array structure 300 may support higher LOS MIMO multiplexing gain, among other benefits. Specifically, the structure of LOS MIMO channels can be utilized to attain high multiplexing gain. This LOS MIMO gain decreases with distance, and multiplexing gain may be negligible at a threshold distance (e.g., 1000 lambda, which may be approximately 85 m for 3.5 GHZ). The distance at which maximum LOS MIMO multiplexing gain occurs may depend on a product of transmit and receive antenna apertures. This multiplexing gain may also be related to a spectral efficiency factor, which may represent a ratio between achievable spectral efficiency and single mode capacity (e.g., $\log_2(1+Nr*SNR)$, where Nr refers to a number of receive antenna elements). The spectral efficiency factor may be indicative of spatial multiplexing gain.

As described herein, a wireless device may be capable of compensating for x-axis or y-axis rotation. This compensation may involve a simplification for far field. For example, the compensation may involve an x-axis rotational component $\gamma \in [0\ 2\pi]$ (e.g., $\gamma_{Tx}$ and $\gamma_{Rx}$ for transmitter and receiver) and a y-axis rotational component $\beta \in [0\ 2\pi]$ (e.g., $\beta_{Tx}$ and $\beta_{Rx}$ for transmitter and receiver). The simplification may be derived by using an approximation for small angle and large distance, locally estimating rotation parameters (e.g., $\gamma$ and $\beta$), constructing a rotational matrix (e.g., $R_{Tx}$ or $R_{Rx}$), updating a precoder matrix on the transmit side (e.g., $V^{new}$), and updating a post-processor matrix on the receive side (e.g., $U^{new}$). X-axis and y-axis rotation can be compensated at the transmit side and the receive side separately (e.g., using beam steering). Receive-side compensation can also be done implicitly using a minimum mean square error (MMSE) receiver. This compensation may be computed according to Equations 5 through 7.

$$h_{mn}\ \alpha\ \frac{\exp\left(-i2\pi\frac{d_{mn}}{\lambda}\right)}{d_{mn}} \qquad (5)$$

$$V_{ik} = V_{ij}e^{-j2\pi\left(-s_{kx}sin(\beta)+s_{ky}cos(\beta)sin(\gamma)\right)};\ (\gamma, \beta) \leftarrow (\gamma_{Tx}, \beta_{Tx}) \qquad (6)$$

$$U_{ik} = U_{ik}e^{-j2\pi\left(-r_{ix}sin(\beta)+r_{iy}cos(\beta)sin(\gamma)\right)};\ (\gamma, \beta) \leftarrow (\gamma_{Rx}, \beta_{Rx}) \qquad (7)$$

In the example of FIG. 3, a first device may perform full-duplex LOS MIMO communications with a second device. The first device may employ the transmit antenna array 305, and the second device may employ the receive antenna array 310. The transmit antenna array 305 may be separated from the receive antenna array 310 by a distance 325 (e.g., r). The transmit antenna array 305 of the first device may include multiple antennas, such as an antenna 315-*a*. Similarly, the receive antenna array 310 of the second device may include multiple antennas, such as an antenna 315-*b*. A LOS channel matrix between the first device and the second device may be computed according to Equation 5, where $d_{mn}$ represents a distance 320 between the antenna 315-*a* and the antenna 315-*b*. In Equations 6 and 7, $s_k$ represents an orientation of the transmit antenna array 305 (e.g., $\vec{s_k}=[s_{kx}\ s_{ky}\ 0]$) and $r_i$ represents an orientation of the receive antenna array 310 (e.g., $\vec{r_i}=[r_{ix}\ r_{iy}\ 0]$).

The antenna array structure 300 may enable devices (e.g., base stations, UEs, relay nodes) to perform full-duplex LOS MIMO communications with improved communication reliability, reduced interference, and higher multiplexing gain, among other benefits. For example, the described techniques may enable devices to perform simultaneous transmission and reception using a specific combination of transmission modes (e.g., OAM modes, singular modes) that results in lower interference and higher reliability. Specifically, the combination of transmission modes may result in greater isolation between uplink and downlink operations, which may increase the likelihood of the devices successfully performing full-duplex LOS MIMO communications.

Figure 4A:
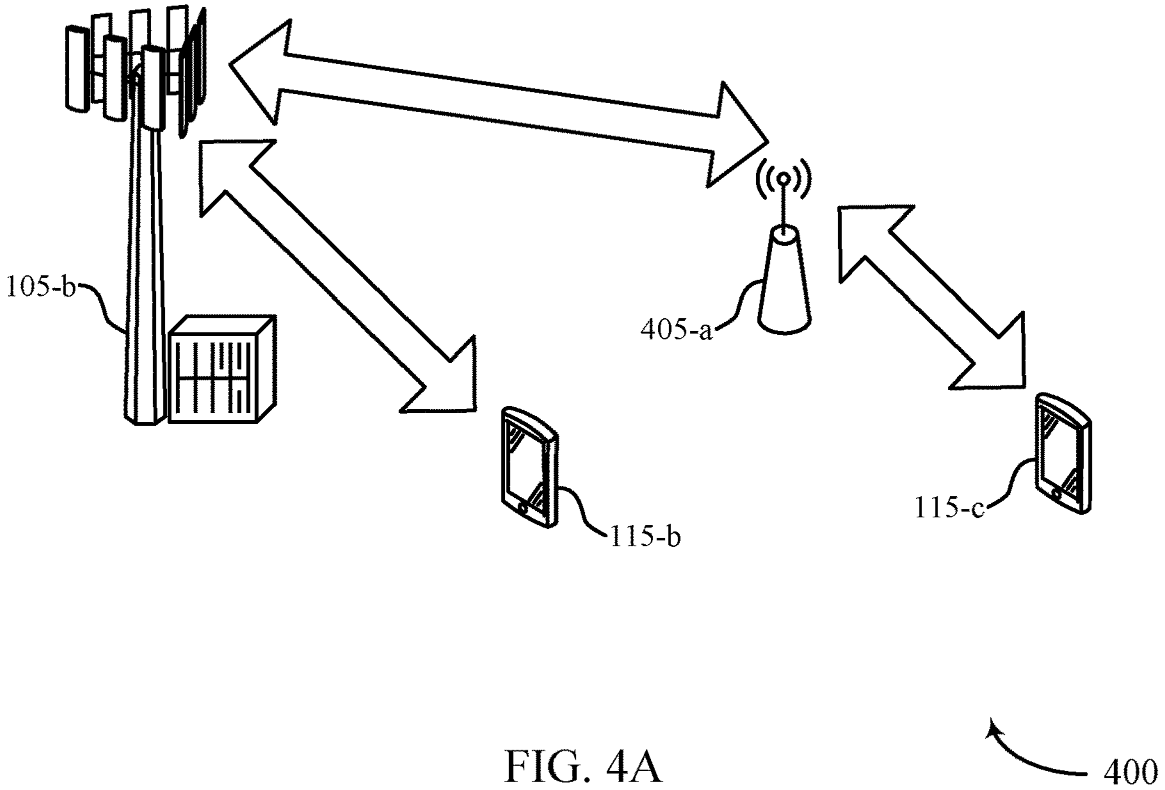
FIGS. 4A and 4B illustrate examples of wireless communications systems that support full-duplex for LOS MIMO in accordance with aspects of the present disclosure.
Figure 4B:
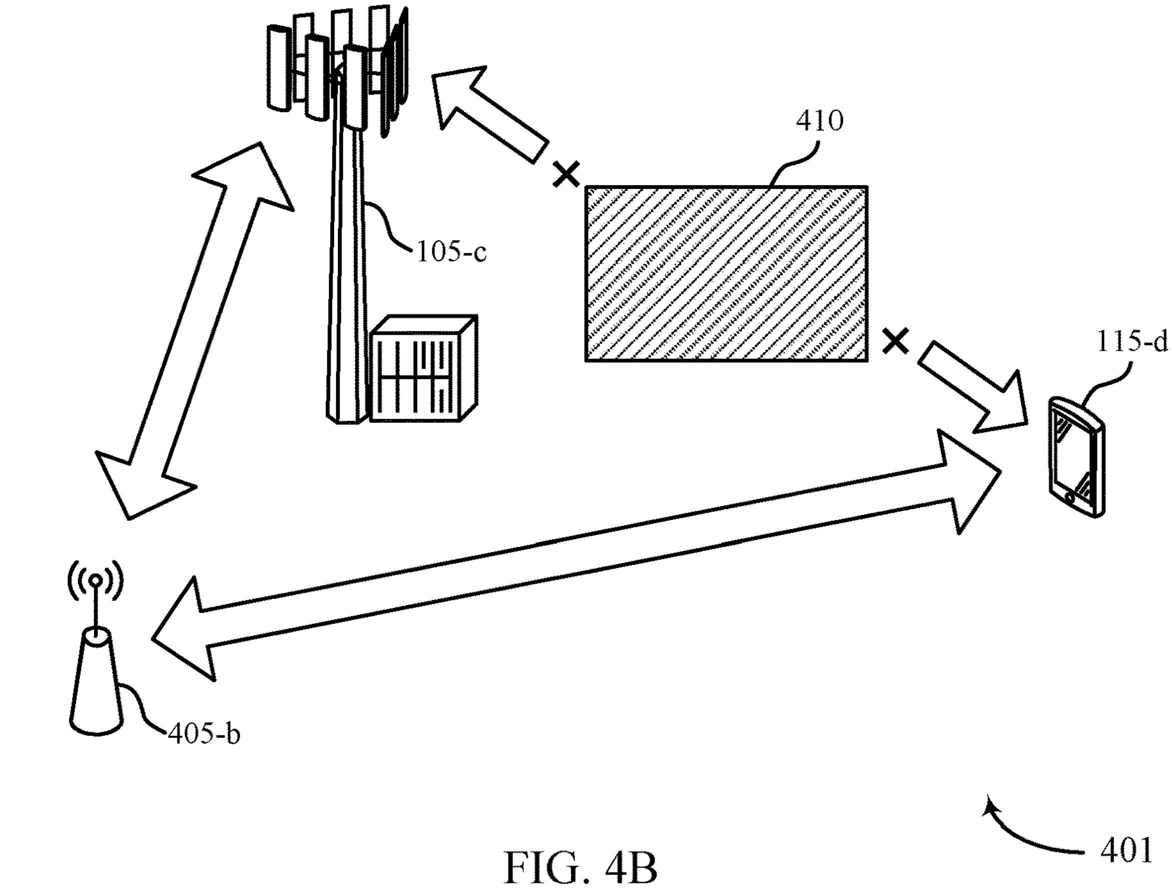

FIGS. 4A and 4B illustrate examples of a wireless communications system 400 and a wireless communications system 401 that support full-duplex for LOS MIMO in accordance with aspects of the present disclosure. The wireless communications system 400 and the wireless communications system 401 may implement or be implemented by aspects of the wireless communications system 100, the wireless communications system 200, or the antenna array structure 300. For example, the wireless communications system 400 and the wireless communications system 401 may include a base station 105-*b*, a base station 105-*c*, a UE 115-*b*, a UE 115-*c*, and a UE 115-*d*, which may be examples of corresponding devices described with reference to FIGS. 1 through 3. In the wireless communications system 400 and the wireless communications system 401, the base stations 105 may perform full-duplex communications with the UEs 115 in accordance with a LOS MIMO communication scheme.

LOS MIMO may provide high multiplexing gain under specific conditions. For example, if a distance between transmit and receive arrays is below a specific distance threshold that depends on apertures of transmit and receive arrays as well as carrier frequencies used. Accurate LOS MIMO precoding may be based on channel information available at transmitter, distance, feedback, and misalignment compensation, among other examples. There may be multiple deployment scenarios with different constraints, which may include LOS MIMO for backhaul links between a base station and a relay (e.g., an integrated access and backhaul (IAB) node, a smart repeater, a customer premises equipment (CPE)) and LOS MIMO for access links between a base station or TRP and a UE.

As described herein, different precoder designs may be associated with different feedback overhead levels. Aspects of the present disclosure may provide for codebook-based precoders that support higher LOS MIMO multiplexing gain. Some precoders, such as SVD-based precoders, may be based on full channel information and high overhead. Other precoders may be derived based on limited feedback. The techniques described herein may be based on codebook-based precoders, and may be applicable to scenarios with limited feedback and no sounding or limited sounding capabilities (e.g., as opposed to full spatial sounding). The described techniques may be applicable for aligned transmit and receive arrays or for nodes with misalignment estimation and compensation capabilities (e.g., distance and misalignment feedback) as well as for devices with relatively low mobility (e.g., a semi-static receive orientation).

Aspects of the present disclosure may support using open loop precoders for LOS MIMO. For cases where a transmit node has limited or no feedback from a receive node, the transmit node may be unable to accurately estimate the channel to derive the precoder. For semi-open loop operation (e.g., with known receive and transmit array configurations), it may be difficult to attain high LOS MIMO multiplexing gain. That is, it may be difficult to achieve high multiplexing gain in fully open loop operations without any knowledge of transmit and receive array configurations (e.g., without a universal precoder). The techniques described herein may be applicable to receive nodes with no sounding or limited sounding capabilities (e.g., smart repeaters with limited mobile termination (MT) capabilities), devices with aligned transmit and receive arrays, or devices with misalignment estimation and compensation capabilities. Open loop precoders may also be used to decrease sounding overhead for large receive arrays (e.g., when overhead of alignment estimation is less than sounding overhead) as well as for low-complexity operations.

In the example of FIG. 4A, the base station 105-*b* may be capable of performing full-duplex LOS MIMO communications with a UE 115-*b* over a first access link. The base station 105-*b* may also be capable of performing LOS MIMO communications with a relay device 405-*a* (e.g., an IAB node, a relay node, a CPE) over a first backhaul link. Additionally, the relay device 405-*a* may be capable of performing full-duplex LOS MIMO communications with the UE 115-*c* over a second access link. In the example of FIG. 4B, the base station 105-*c* may be capable of performing full-duplex communications with a relay node 405-*b* over a second backhaul link, and the relay node 405-*b* may be capable of performing full-duplex communications with the UE 115-*d* over a third access link. However, the base station 105-*c* may be unable to perform full-duplex LOS MIMO communications with the UE 115-*d* due to an obstruction 410 between the UE 115-*d* and the base station 105-*c*.

The wireless communications system 400 and the wireless communications system 401 may enable the base stations 105, the UEs 115, and the relay nodes 405 to perform full-duplex LOS MIMO communications with improved communication reliability, reduced interference, and higher multiplexing gain, among other benefits. For example, the described techniques may enable the UEs 115, the base stations 105, and the relay nodes 405 to perform simultaneous transmission and reception using a specific combination of transmission LOS MIMO modes (e.g., OAM modes, singular modes) that results in lower interference and higher reliability. Specifically, the combination of transmission modes may result in greater isolation between uplink and downlink operations, which may increase the likelihood of the UEs 115, the base stations 105, and the relay nodes 405 successfully performing full-duplex LOS MIMO communications.

Figure 5A:
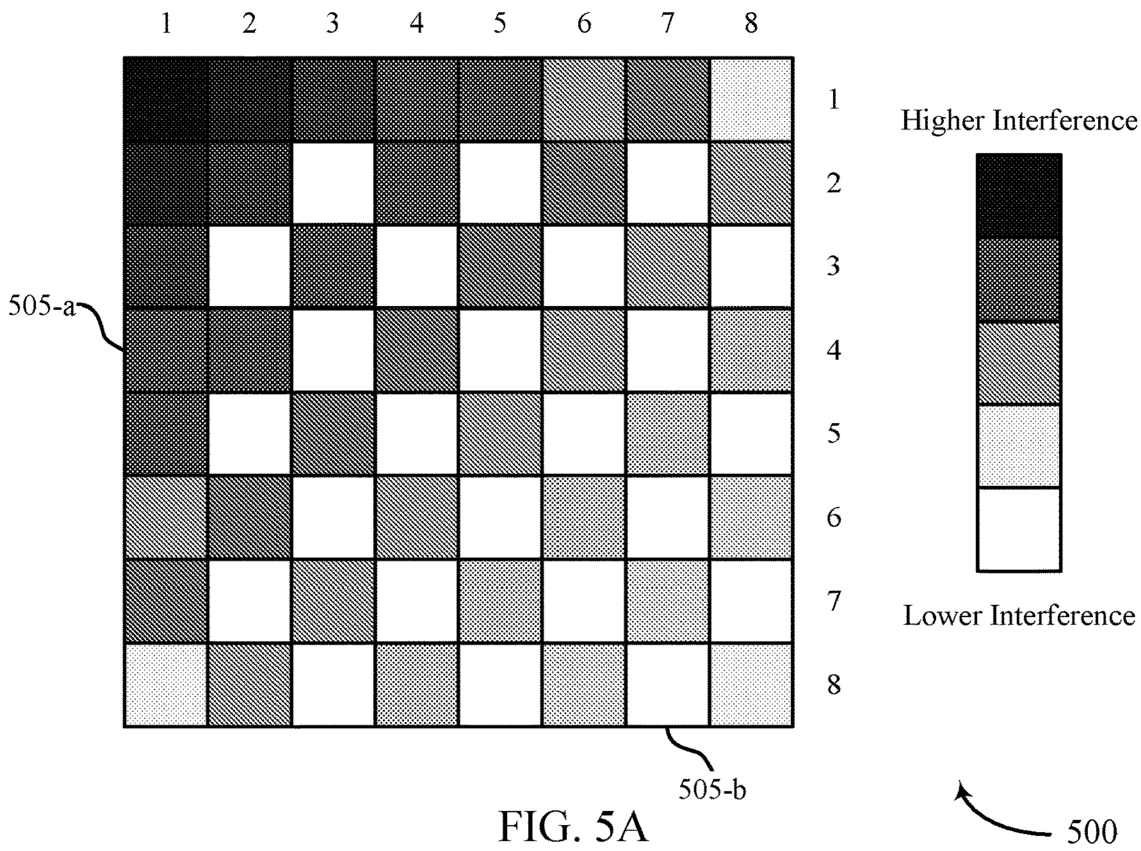
FIGS. 5A and 5B illustrate examples of transmission mode correlations that support full-duplex for LOS MIMO in accordance with aspects of the present disclosure.
Figure 5B:
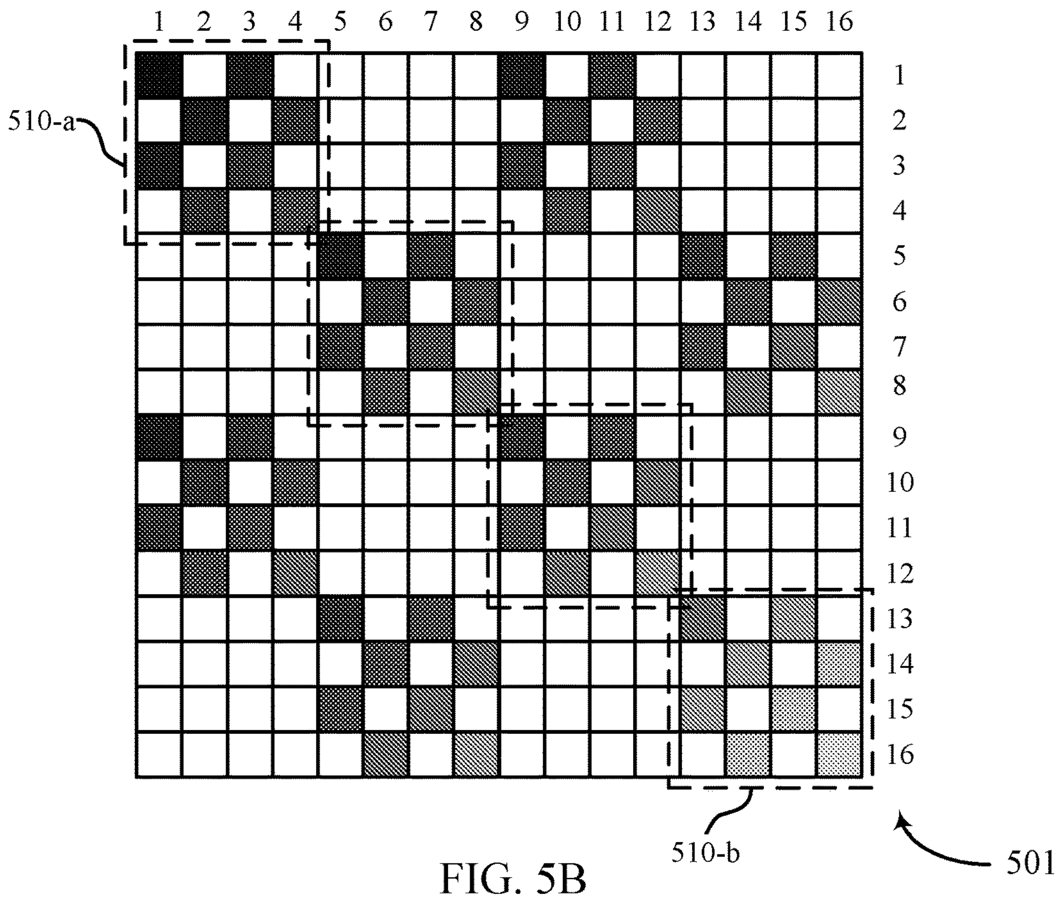

FIGS. 5A and 5B illustrate examples of a transmission mode correlation 500 and a transmission mode correlation 501 that support full-duplex for LOS MIMO in accordance with aspects of the present disclosure. The transmission mode correlation 500 and the transmission mode correlation 501 may implement or be implemented by aspects of the wireless communications system 100, the wireless communications system 200, the antenna array structure 300, the wireless communications system 400, or the wireless communications system 401. For example, the transmission mode correlation 500 and the transmission mode correlation 501 may implement or be implemented by a base station or a UE, which may be examples of corresponding devices described with reference to FIGS. 1 through 4. The transmission mode correlation 500 and the transmission mode correlation 501 illustrate different combinations of LOS MIMO transmission modes that result in different levels of inter-layer interference.

Aspects of the present disclosure may support using Legendre-based precoding schemes for full-duplex LOS MIMO communications. Legendre-based precoders may reduce inter-layer interference, as any two consecutive layers may be orthogonal (e.g., layers 1 and 2 may be orthogonal). The described techniques may apply to URA antenna structures where Nt (e.g., a number of transmit array elements) is less than Nr (e.g., a number of receive antenna elements). For cases in which Nr is greater than Nt, processing gain and SINR may be high, as large Nr may compensate for some precoders.

The described techniques may support mode separation for open-loop LOS MIMO using ULA antenna structures. For ULAs, Slepian or Legendre-based precoders may include Slepian precoders or Legendre precoders for transmit and receive arrays with Nt less than Nr, block-Slepian, or block-Legendre precoders for transmit and receive arrays with Nt greater than Nr. In accordance with aspects of the present disclosure, full-duplex base stations, relays, or UEs with ULAs may use Slepian or Legendre-based precoders for precoding downlink and uplink signals. Slepian and Legendre-based precoders may result in approximate orthogonality between even and odd modes. These odd and even modes may not be shared between downlink and uplink to ensure sufficient isolation between uplink and downlink. For example, modes 0, 2, and 4 may be used for uplink and modes 1, 3, and 5 may be used for downlink (or vice versa).

The described techniques may also support modal separation for open-loop LOS MIMO using UPAs. For UPAs, a Kronecker product of two 1D precoders may be used. For example, a Kronecker product of a Slepian or Legendre precoder for transmit and receive arrays with Nt_x (e.g., a number of x-axis transmit antenna elements) less than or equal to Nr_x (e.g., a number of x-axis receive antenna elements) and Nt_y (e.g., a number of y-axis transmit antenna elements) less than or equal to Nr_y (e.g., a number of y-axis receive antenna elements). In accordance with examples described herein, full-duplex base stations, relays, or UEs with UPAs may use Slepian or Legendre-based precoders for downlink and uplink signals. There may be approximate orthogonality between even and odd modes. Additionally, there may be orthogonality between blocks of modes because of the Kronecker product structure of the precoder. In some examples, odd and even modes may be used to ensure sufficient isolation between uplink and downlink. In other examples, odd and even blocks of modes (e.g., corresponding to rows of a precoding matrix) can be used to orthogonalize downlink and uplink.

The transmission mode correlation 500 and the transmission mode correlation 501 may illustrate a correlation between LOS MIMO modes (e.g., singular modes) for a precoded channel with a LOS MIMO precoder. More specifically, the transmission mode correlation 500 and the transmission mode correlation 501 may illustrate inter-layer interference from the perspective of a Gramian matrix (e.g., $\tilde{H}\cdot\tilde{H}$) of a precoded channel. The mathematical expression of this inter-layer interference may be derived from Equations 8 and 9, where P is a power allocation matrix, $\tilde{V}$ is a precoding matrix, and H is a LOS channel between two wireless devices.

$$10\log_{10}(\tilde{H}^*\tilde{H});\ \max(10\log_{10}(\tilde{H}^*\tilde{H}),0) \tag{8}$$

$$\mathrm{SIN}R(k)=\frac{1}{\left[(I+\tilde{H}^*\tilde{H})^{-1}\right]_{k,k}}-1;\ \tilde{H}=H\tilde{V}P^{1/2} \tag{9}$$

FIG. 5A illustrates an example of a 1D precoding matrix. Each column and row of the 1D precoding matrix may represent a different LOS MIMO communication mode. For example, a matrix location 505-*a* may indicate that a first LOS MIMO communication mode (e.g., mode 1) is used for transmission and a fourth LOS MIMO communication mode (e.g., mode 4) is used for reception (or vice versa). Likewise, a matrix location 505-*b* may indicate that a seventh LOS MIMO communication mode (e.g., mode 7) is used for transmission and an eighth LOS MIMO communication mode (e.g., mode 8) is used for reception (or vice versa). The value of each matrix location may be determined according to Equation 8, which represents an interference level between respective LOS MIMO communication modes indicated by the matrix location. For example, the value of the matrix location 505-*a* may correspond to an interference level between the first LOS MIMO communication mode and the fourth LOS MIMO communication mode.

FIG. 5B illustrates an example of a 2D precoding matrix, which may include blocks 510 of LOS MIMO transmission modes. For example, the 2D precoding matrix may include a first block 510-*a* of LOS MIMO transmission modes (e.g., modes 1 through 4) and a second block 510-*b* of LOS MIMO transmission modes (e.g., modes 13 through 16). As illustrated in the example of FIG. 5B, there may be orthogonality between the different blocks 510 of the 2D precoding matrix, which may result in lower inter-layer interference. There may also be orthogonality between even and odd LOS MIMO transmission modes within each of the blocks 510, which may provide additional isolation between uplink and downlink operations.

The transmission mode correlation 500 and the transmission mode correlation 501 may enable devices (e.g., base stations, UEs, relay nodes) to perform full-duplex LOS MIMO communications with improved communication reliability, reduced interference, and higher multiplexing gain, among other benefits. For example, the described techniques may enable devices to perform simultaneous transmission and reception using a specific combination of transmission modes (e.g., OAM modes, singular modes) that results in lower interference and higher reliability. Specifically, the combination of transmission modes may result in greater isolation between uplink and downlink operations, which may increase the likelihood of the devices successfully performing full-duplex LOS MIMO communications.

Figure 6A:
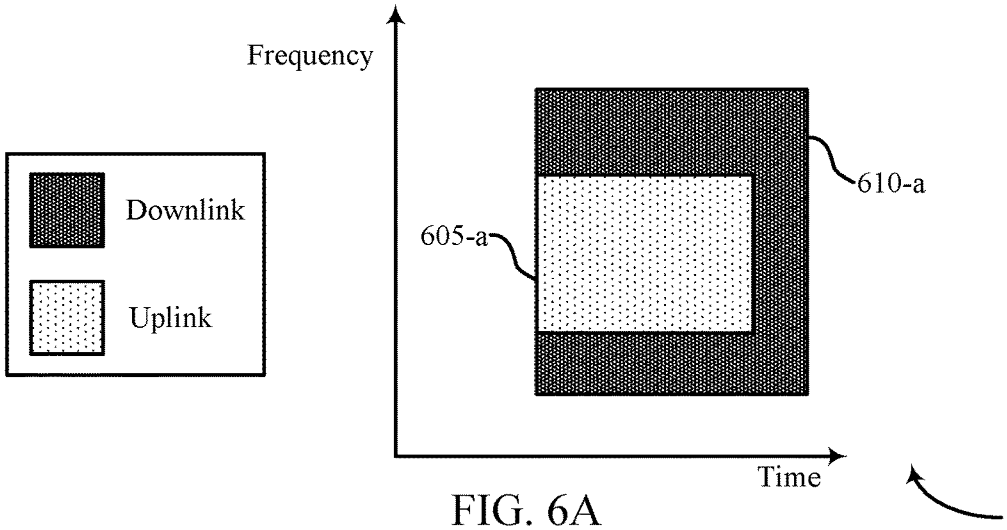
FIGS. 6A, 6B, and 6C illustrate examples of resource diagrams that support full-duplex for LOS MIMO in accordance with aspects of the present disclosure.
Figure 6B:
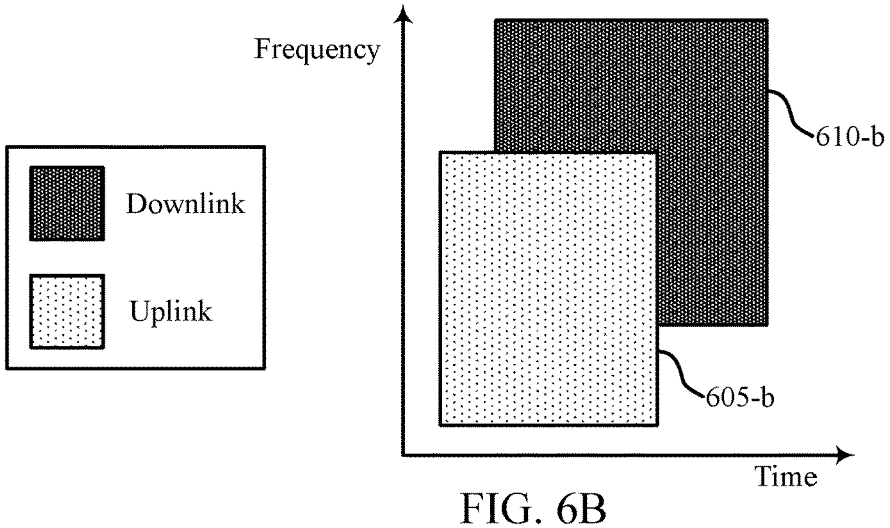
Figure 6C:
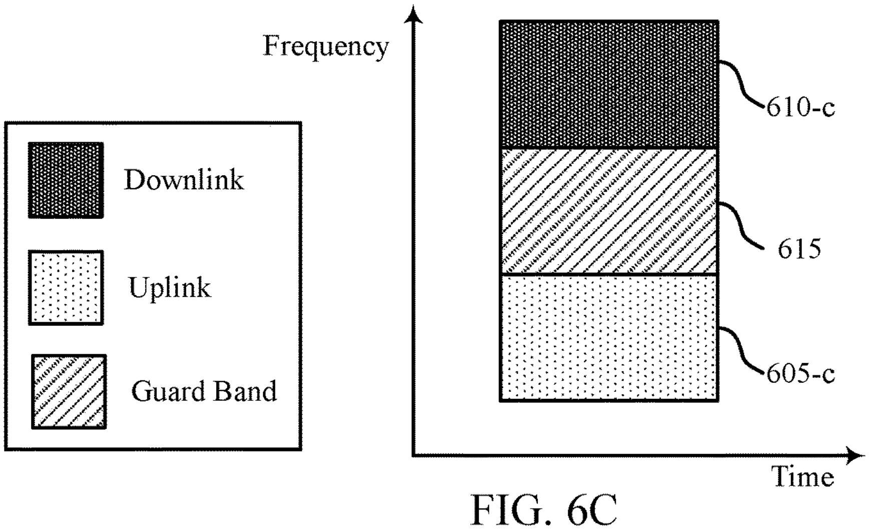

FIGS. 6A, 6B, and 6C illustrate examples of a resource diagram 600, a resource diagram 601, and a resource diagram 602 that support full-duplex for LOS MIMO in accordance with aspects of the present disclosure. The resource diagram 600, the resource diagram 601, and the resource diagram 602 may implement or be implemented by aspects of the wireless communications system 100, the wireless communications system 200, the antenna array structure 300, the wireless communications system 400, the wireless communications system 401, the transmission mode correlation 500, or the transmission mode correlation 501. For example, the resource diagram 600, the resource diagram 601, and the resource diagram 602 may implement or be implemented by a UE or a base station, which may be examples of corresponding devices described with reference to FIGS. 1 through 5. The resource diagram 600, the resource diagram 601, and the resource diagram 602 may illustrate an in-band full-duplex communication scheme with full overlap, an in-band full-duplex communication scheme with partial overlap, and a sub-band full-duplex communication scheme.

Aspects of the present disclosure may support various full-duplex communication schemes, such as IBFD and sub-band full-duplex (SBFD). In IBFD, transmission and reception operations may occur on the same time and frequency resources. That is, downlink and uplink may utilize the same IBFD time and frequency resources (e.g., a full or partial overlap). For sub-band full-duplex (e.g., flexible full-duplex), transmission and reception may occur at the same time but on different frequency resources. The downlink resources may be separated from the uplink resources in the frequency-domain.

FIG. 6A illustrates an example of an IBFD communication scheme with full overlap between uplink and downlink resources. For example, uplink resources 605-*a* may fully overlap with downlink resources 610-*a* in frequency and time. FIG. 6B illustrates an example of an IBFD communication with partial overlap between uplink resources and downlink resources. For example, uplink resources 605-*b* may partially overlap with downlink resources 610-*b* in time and frequency. FIG. 6C illustrates an example of a SBFD communication scheme in which there is no frequency overlap between uplink and downlink resources. For example, uplink resources 605-*c* may not overlap in frequency with downlink resources 610-*c*. However, the uplink resources 605-*c* may overlap in time with downlink resources 610-*c* if there is a guard band 615 configured between the uplink resources 605-*c* and the downlink resources 610-*c*.

The resource diagram 600, the resource diagram 601, and the resource diagram 602 may enable devices (e.g., base stations, UEs, relay nodes) to perform full-duplex LOS MIMO communications with improved communication reliability, reduced interference, and higher multiplexing gain, among other benefits. For example, the described techniques may enable devices to perform simultaneous transmission and reception using a specific combination of transmission modes (e.g., OAM modes, singular modes) that results in lower interference and higher reliability. Specifically, the combination of transmission modes may result in greater isolation between uplink and downlink operations, which may increase the likelihood of the devices successfully performing full-duplex LOS MIMO communications.

Figure 7:
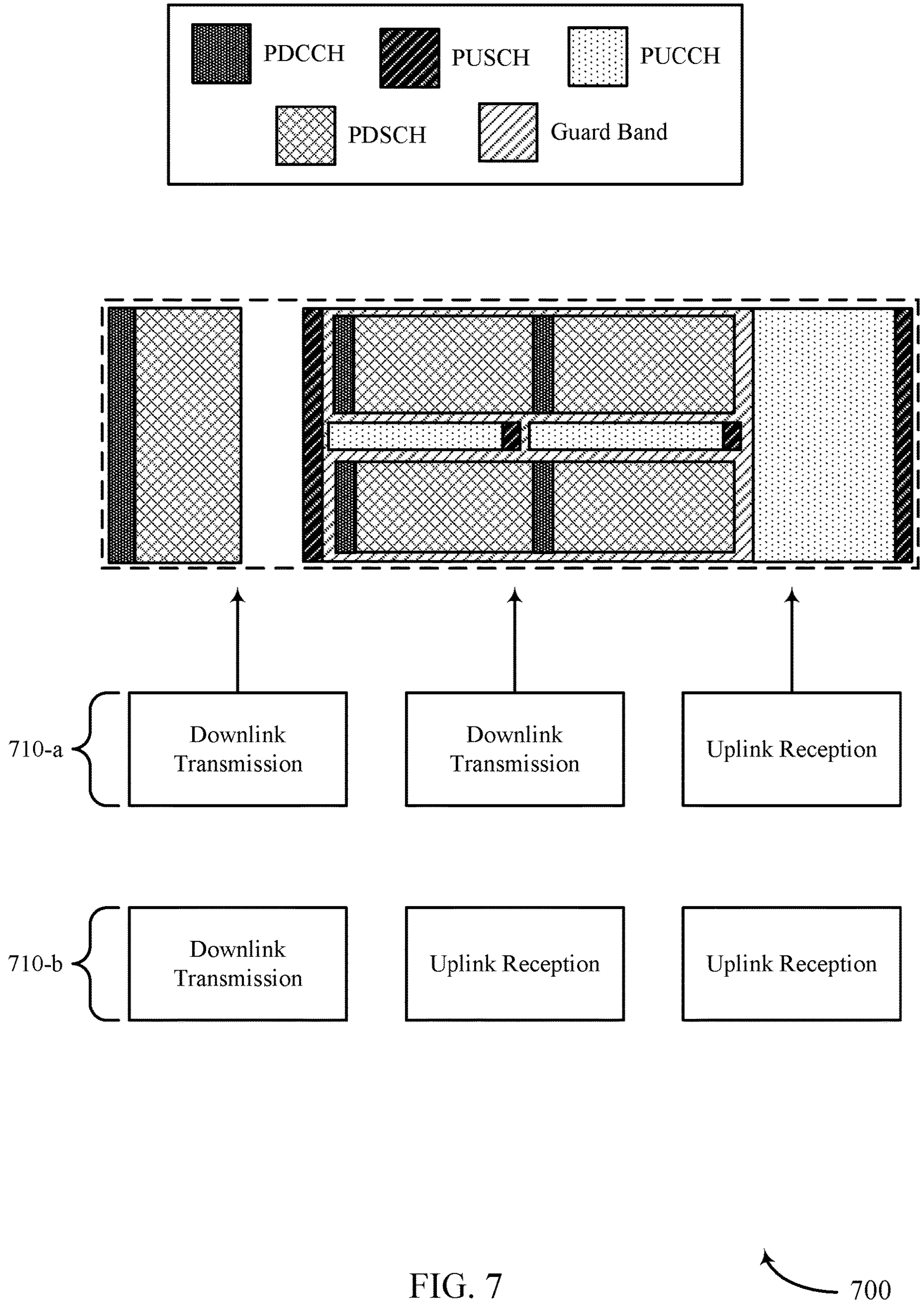
FIG. 7 illustrates an example of a communication scheme that supports full-duplex for LOS MIMO in accordance with aspects of the present disclosure.

FIG. 7 illustrates an example of a communication scheme 700 that supports full-duplex for LOS MIMO in accordance with aspects of the present disclosure. The communication scheme 700 may implement or be implemented by aspects of the wireless communications system 100, the wireless communications system 200, the antenna array structure 300, the wireless communications system 400, the wireless communications system 401, the transmission mode correlation 500, the transmission mode correlation 501, the resource diagram 600, the resource diagram 601, or the resource diagram 602. For example, the communication scheme 700 may implement or be implemented by a UE or a base station, which may be examples of corresponding devices described with reference to FIGS. 1 through 6. The communication scheme 700 illustrates antenna panels 710 that support full-duplex operations.

The example of FIG. 7 illustrates an example of a base station that supports full-duplex communications. Aspects of the present disclosure may support self-interference mitigation at the base station. For improved isolation (e.g., greater than 50 dB), an architecture that includes two separate panels for simultaneous transmission and reception operations may be used. A first panel may be used for downlink transmission at both edges of a frequency band, and a second panel may be used for uplink reception in the middle of the frequency band. To attain more than 40 dB of isolation using sub-band full-duplex, downlink and uplink may be allocated to different portions of the frequency band.

Additionally or alternatively, a guard band may be included between uplink and downlink. Receive-side weighted overlap and add (WOLA) may also be used to reduce an adjacent channel leakage ratio (ACLR) corresponding to an uplink signal. An analog low pass filter (LPF) may also be used to improve an analog digital converter (ADC) dynamic range of the base station. The described techniques may support improvements to receive-side automatic gain control (AGC) states, which may provide noise figure (NF) improvements. A digital interference cancellation (IC) may also reduce ACLR leakage by more than 20 dB using a non-linear model per transmit and receive pair.

In the example of FIG. 7, a base station utilizes an antenna panel 710-*a* and an antenna panel 710-*b* to perform full-duplex communications. The antenna panels 710 may be configured to provide isolation between uplink and downlink operations at the base station. The full-duplex communications may include PDCCH transmissions, PUSCH transmissions, PUCCH transmissions, and PDSCH transmissions, among other examples. For cases in which the antenna panel 710-*a* is performing downlink transmission while the antenna panel 710-*b* is performing uplink reception, a guard band may be configured between the downlink transmissions and the uplink transmissions to provide isolation between uplink and downlink operations at the base station.

The communication scheme 700 may enable devices (e.g., base stations, UEs, relay nodes) to perform full-duplex LOS MIMO communications with improved communication reliability, reduced interference, and higher multiplexing gain, among other benefits. For example, the described techniques may enable devices to perform simultaneous transmission and reception using a specific combination of transmission modes (e.g., OAM modes, singular modes) that results in lower interference and higher reliability. Specifically, the combination of transmission modes may result in greater isolation between uplink and downlink operations, which may increase the likelihood of the devices successfully performing full-duplex LOS MIMO communications.

FIGS. 8A, 8B, 8C, and 8D illustrate examples of a full-duplex configuration 800, a full-duplex configuration 801, a full-duplex configuration 802, and a full-duplex configuration 803 that support full-duplex for LOS MIMO in accordance with aspects of the present disclosure. The full-duplex configuration 800, the full-duplex configuration 801, the full-duplex configuration 802, and the full-duplex configuration 803 may implement or be implemented by aspects of the wireless communications system 100, the wireless communications system 200, the antenna array structure 300, the wireless communications system 400, the wireless communications system 401, the transmission mode correlation 500, the transmission mode correlation 501, the resource diagram 600, the resource diagram 601, the resource diagram 602, or the communication scheme 700. For example, the full-duplex configuration 800, the full-duplex configuration 801, the full-duplex configuration 802, and the full-duplex configuration 803 may implement or be implemented by a base station or a UE, which may be examples of corresponding devices described with reference to FIGS. 1 through 7. The full-duplex configuration 800, the full-duplex configuration 801, the full-duplex configuration 802, and the full-duplex configuration 803 may illustrate different examples of self-interference caused by full-duplex operations.

FIGS. 8A, 8B, 8C, and 8D may illustrate scenarios for implementing full-duplex using LOS MIMO. IBFD for LOS MIMO may be implemented in different ways, such as using a subset of antenna arrays for transmission and a subset for reception at a base station, relay, UE, or any combination thereof. In other examples, IBFD for LOS MIMO may be implemented using multi-panels at a base station, relay, UE, or any combination thereof. Additionally or alternatively, IBFD for LOS MIMO may be implemented using a multi-TRP or distributed antennas at a base station. A similar example may involve simultaneous operation of MT and distributed unit (DU) functions at an IAB node. For IBFD, linear interference may be of primary concern (e.g., in contrast to the impact of non-linear interference on ACLR for SBFD).

Figure 8A:
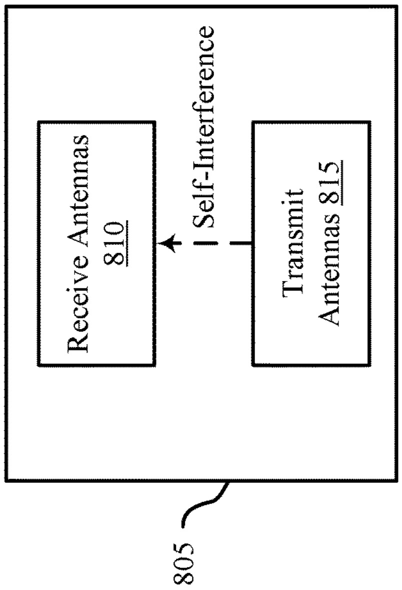
FIGS. 8A, 8B, 8C, and 8D illustrate examples of full-duplex configurations that support full-duplex for LOS MIMO in accordance with aspects of the present disclosure.
Figure 8B:
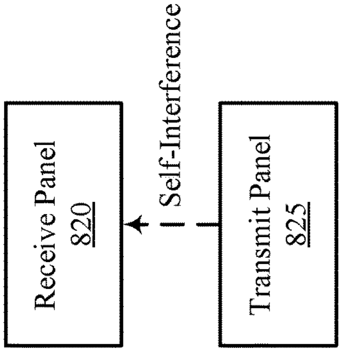
Figure 8C:
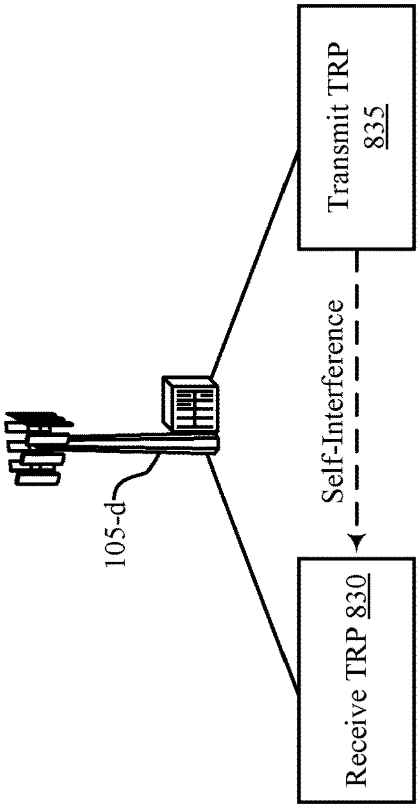
Figure 8D:
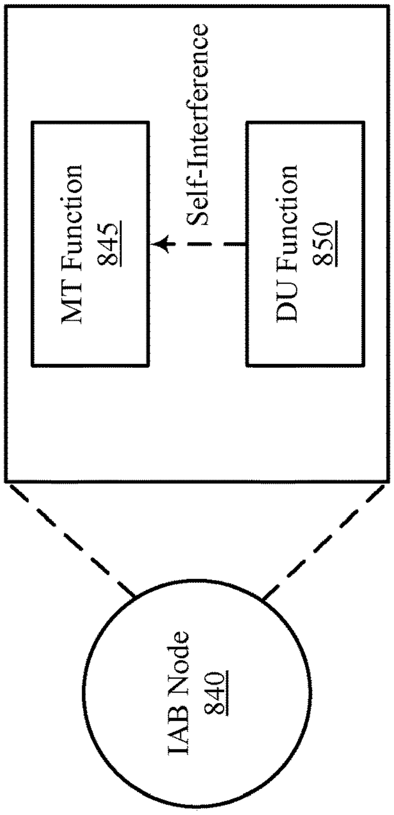

FIG. 8A illustrates an example of a device 805 that uses a subset of transmit antenna arrays and a subset of receive antenna arrays to perform full-duplex communications. For example, the device 805 may include receive antennas 810 and transmit antennas 815, which may be different subsets of the same antenna array. In some examples, the transmit antennas 815 may cause self-interference at the receive antennas 810. FIG. 8B illustrates an example of a device that uses a receive panel 820 and a transmit panel 825 to perform full-duplex communications. Unlike the device 805 illustrated with reference to FIG. 8A, the transmit panel 825 and the receive panel 820 may be separate components. In some examples, the transmit panel 825 may cause self-interference at the receive panel 820. FIG. 8C illustrates an example of a base station 105-*d* that uses a receive TRP 830 and a transmit TRP 835 to perform full-duplex communications. In some examples, the transmit TRP 835 may cause self-interference at the receive TRP 830. FIG. 8D illustrates an example of an IAB node 840 that includes an MT function 845 and a DU function 850. The MT function 845 and the DU function 850 may enable the IAB node 840 to perform full-duplex communications. In some examples, the DU function 850 may cause self-interference at the MT function 845.

The full-duplex configuration 800, the full-duplex configuration 801, the full-duplex configuration 802, and the full-duplex configuration 803 may enable devices (e.g., base stations, UEs, IAB nodes) to perform full-duplex LOS MIMO communications with improved communication reliability, reduced interference, and higher multiplexing gain, among other benefits. For example, the described techniques may enable devices to perform simultaneous transmission and reception using a specific combination of transmission modes (e.g., OAM modes, singular modes) that results in lower interference and higher reliability. Specifically, the combination of transmission modes may result in greater isolation between uplink and downlink operations, which may increase the likelihood of the devices successfully performing full-duplex LOS MIMO communications.

Figure 9:
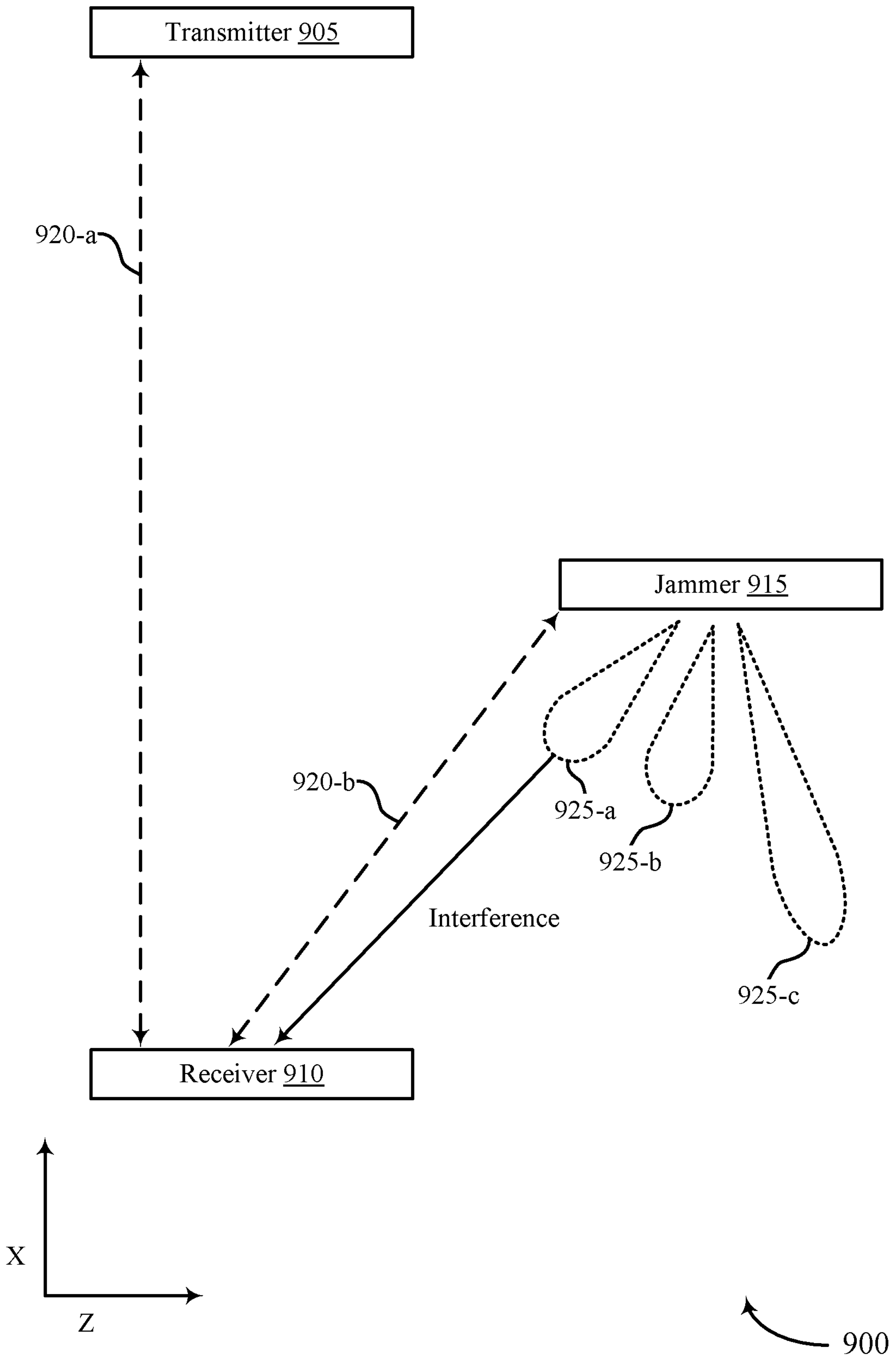
FIG. 9 illustrates an example of a wireless communications system that supports full-duplex for LOS MIMO in accordance with aspects of the present disclosure.

FIG. 9 illustrates an example of a wireless communications system 900 that supports full-duplex for LOS MIMO in accordance with aspects of the present disclosure. The wireless communications system 900 may implement or be implemented by aspects of the wireless communications system 100, the wireless communications system 200, the antenna array structure 300, the wireless communications system 400, the wireless communications system 401, the transmission mode correlation 500, the transmission mode correlation 501, the resource diagram 600, the resource diagram 601, the resource diagram 602, the communication scheme 700, the full-duplex configuration 800, the full-duplex configuration 801, the full-duplex configuration 802, or the full-duplex configuration 803. For example, the wireless communications system 900 may include a transmitter 905, a receiver 910, and a jammer 915, which may be examples of a base station or a UE described with reference to FIGS. 1 through 8. In the wireless communications system 900, transmissions from the jammer 915 may interfere with communications between the transmitter 905 and the receiver 910.

In the example of FIG. 9, the receiver 910 may experience interference while using a LOS MIMO communication scheme. The jammer 915 may transmit signals that form a specific radiation pattern. The radiation pattern may include a lobe 925-*a* (e.g., a first sidelobe), a lobe 925-*b* (e.g., a second sidelobe), and a lobe 925-*c* (e.g., a main lobe). The lobe 925-*c* may be generated using a DFT and LOS MIMO precoder by the jammer 915. Leakage from the lobe 925-*a* may interfere with the receiver 910 (e.g., a receive node). In some examples, the jammer 915 may be an example of a DU panel at an IAB node and the receiver 910 may be an example of an MT panel at the IAB node. In the example of FIG. 9, the transmitter 905 and the receiver 910 may be separated by a distance 920-*a* (e.g., 200 lambda), whereas the jammer 915 and the receiver 910 may be separated by a distance 920-*b* (e.g., 50 lambda in the x-axis, 20 lambda in the z-axis).

To model the directionality of an antenna array of the jammer 915, it may be assumed that DFT beam steering is used at the jammer 915 (e.g., in addition to a LOS MIMO precoder), where interference is caused by the lobe 925-*a* (e.g., the first sidelobe). This may be applicable to cases where the transmitter 905, the receiver 910, the jammer 915, or a combination thereof utilize 1D ULAs, a Kronecker product of 1D precoders, a URA, or a UPA. The combined channel (e.g., H) between the transmitter 905, the receiver 910, and the jammer 915 may be calculated according to Equation 10. The equivalent channel may be determined using Equation 9, where $\tilde{V}$ represents a LOS MIMO precoder and P represents a power loading matrix. For no precoding, $\tilde{V}$ may be equal to 1. For SVD precoding, $\tilde{V}$ may be equal to $V_{opt}$. A Gramian matrix of the equivalent channel may be used to analyze the correlation between singular modes. This Gramian matrix may be determined according to Equation 8.

To analyze the equivalent channel of the receiver 910 (e.g., the interference channel) when the jammer 915 is a transmit node, it may be assumed that a LOS MIMO precoder (e.g., a Legendre-based precoder or a Slepian-based precoder) is used at a transmit array of the jammer 915. This analysis may be based on a LOS MIMO channel between the jammer 915 and the receiver 910, and may assume either omni-directional transmit or receiver arrays or directional transmit arrays (e.g., when a DFT precoder is used in addition to a LOS MIMO precoder). This analysis may reflect the impact of misalignment. In some examples, only a specific LOS MIMO communication mode (e.g., mode 0) may be detectable.

The example of FIG. 9 may illustrate the impact of self-interference on a combined channel of the receiver 910. In some examples, the transmitter 905, the receiver 910, the jammer 915, or a combination thereof may use a 1D ULA (e.g., a 1×8 ULA). For these cases, the difference in achievable SINR and the interference may not impact the correlation between transmission modes (e.g., between mode x and mode x+1, where x is greater than 1). In some examples, interference may be mainly caused by a first singular mode (e.g., mode 0). Self-interference can be reduced or minimized by using the first singular mode for reception and using a different singular mode for transmission at the receiver 910 (e.g., a full-duplex node). This may also be applicable to cases without DFT and a directional shift (e.g., in the x-axis) of 20 or 50 lambda. Equation 10 may be used to determine an equivalent channel at the receiver 910, where H is a combined channel matrix, $H_{Tx\_Rx}$ is a first equivalent channel matrix between a transmitting device and a receiving device, $H_{Jam\_Rx}$ is a second equivalent channel matrix between a jamming device and a receiving device, and $\sqrt{\rho}$ is a power scaling coefficient multiplied by the second equivalent channel matrix. In some examples (e.g., for full-duplex nodes), the jamming device may be the same as the receiving device.

$$H = H_{Tx\_Rx} + \sqrt{\rho}\, H_{Jam\_Rx} \tag{10}$$

The wireless communications system 900 may enable devices (e.g., base stations, UEs, relay nodes) to perform full-duplex LOS MIMO communications with improved communication reliability, reduced interference, and higher multiplexing gain, among other benefits. For example, the described techniques may enable devices to perform simultaneous transmission and reception using a specific combination of transmission modes (e.g., OAM modes, singular modes) that results in lower interference and higher reliability. Specifically, the combination of transmission modes may result in greater isolation between uplink and downlink operations, which may increase the likelihood of the devices successfully performing full-duplex LOS MIMO communications.

Figure 10:
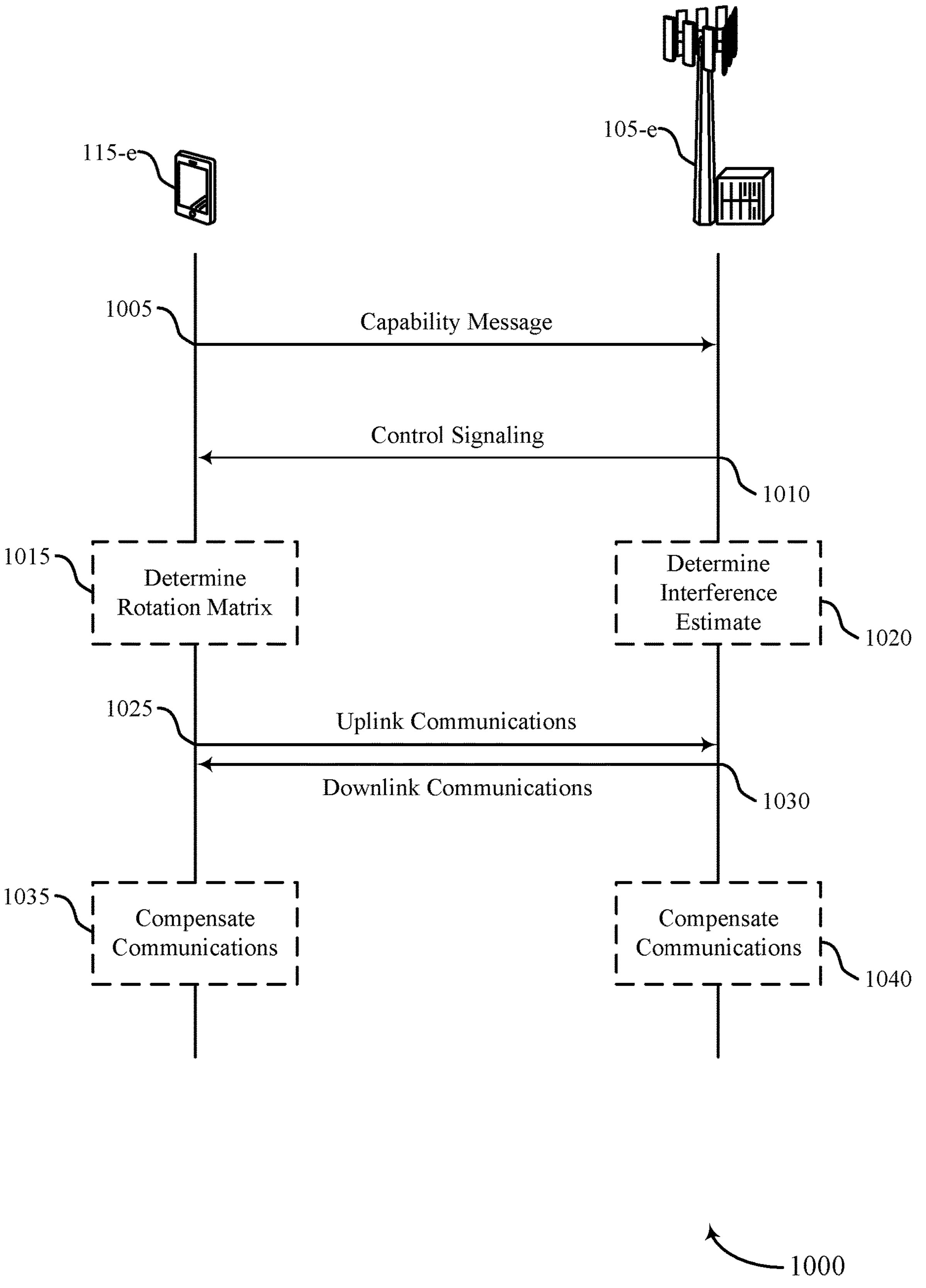
FIG. 10 illustrates an example of a process flow that supports full-duplex for LOS MIMO in accordance with aspects of the present disclosure.

FIG. 10 illustrates an example of a process flow 1000 that supports full-duplex for LOS MIMO in accordance with aspects of the present disclosure. The process flow 1000 may implement or be implemented by aspects of the wireless communications system 100, the wireless communications system 200, the antenna array structure 300, the wireless communications system 400, the wireless communications system 401, the transmission mode correlation 500, the transmission mode correlation 501, the resource diagram 600, the resource diagram 601, the resource diagram 602, the communication scheme 700, the full-duplex configuration 800, the full-duplex configuration 801, the full-duplex configuration 802, the full-duplex configuration 803, or the wireless communications system 900. For example, the process flow 1000 may include a UE 115-*e* and a base station 105-*e*, which may be examples of corresponding devices described with reference to FIGS. 1 through 9. In the following description of the process flow 1000, operations between the UE 115-*e* and the base station 105-*e* may be performed in a different order or at a different time than as shown. Additionally or alternatively, some operations may be omitted from the process flow 1000, and other operations may be added to the process flow 1000.

At 1005, the UE 115-*e* (e.g., a first wireless device) may transmit a message to the base station 105-*e* (e.g., a second wireless device). The message may indicate a capability of the UE 115-*e* to support full-duplex LOS MIMO communications. At 1010, the base station 105-*e* may transmit control signaling to the UE 115-*e* in response to (e.g., subsequent to, based on) the message. That is, the base station 105-*e* may transmit the control signaling to the UE 115-*e* after receiving the message from the UE 115-*e*. The control signaling may include an RRC message or an instance of DCI, among other examples. The control signaling may indicate an uplink channel resource allocated for one or more uplink communications, a downlink channel resource allocated for one or more downlink communications, a first set of one or more LOS MIMO transmission modes to be used for the one or more uplink communications, a second set of one or more LOS MIMO transmission modes to be used for the one or more downlink communications, or a combination thereof. The base station 105-*e* may indicate combinations of uplink and downlink LOS transmission modes that support LOS full-duplex MIMO communication, the selected mode combination may manage (e.g., reduce, minimize) interference between the uplink and downlink full-duplex communications. The uplink channel resource may overlap (e.g., partially or fully) with the downlink channel resource in time, frequency, or both.

The first set of LOS MIMO transmission modes may correspond to a transmission priority of the one or more uplink communications, a QoS threshold associated with the one or more uplink communications, a precoding scheme to be used for the one or more uplink communications, or a combination thereof. Likewise, the second set of one or more LOS MIMO transmission modes may correspond to a transmission priority of the one or more downlink communications, a QoS threshold associated with the one or more downlink communications, a precoding scheme to be used for the one or more downlink communications, or a combination thereof. In some examples, the control signaling may indicate patterns of LOS MIMO transmission modes to be used for the one or more uplink communications and the one or more downlink communications. Additionally or alternatively, the control signaling may indicate a number of uplink repetitions for the one or more uplink communications or a number of downlink repetitions for the one or more downlink communications.

In some examples, the control signaling may indicate a mapping between LOS MIMO transmission modes and channel resource pairings. Each channel resource pairing (also referred to as a channel resource pair) may include a respective uplink channel resource and a respective downlink channel resource. In such examples, the base station 105-*e* may transmit another control message indicating a first channel resource pairing that includes the uplink channel resource and the downlink channel resource. Additionally or alternatively, the control signaling may indicate a mapping between LOS MIMO transmission modes and TCI states, which may be applied at either the transmitter side or the receiver side. In such examples, the base station 105-*e* may transmit another control message indicating a first TCI state to be used for the one or more uplink communications (e.g., by one or both of the base station 105-*e* or the UE 115-*e*), a second TCI state to be used for the one or more downlink communications (e.g., by one or both of the base station 105-*e* or the UE 115-*e*), or both.

In other examples, the control signaling may indicate a mapping between LOS MIMO transmission modes and polarizations (e.g., antenna polarizations), which may be applied at either the transmitter side or the receiver side. In such examples, the base station 105-*e* may transmit another control message indicating a first polarization to be used for the one or more uplink communications (e.g., by one or both of the base station 105-*e* or the UE 115-*e*), a second polarization to be used for the one or more downlink communications (e.g., by one or both of the base station 105-*e* or the UE 115-*e*), or both. The control signaling may also indicate a mapping between LOS MIMO transmission modes and precoding schemes, which may be applicable at either the transmitter side or the receiver side. In such examples, the base station 105-*e* may transmit another control message indicating a first precoding scheme to be used for the one or more uplink communications (e.g., by one or both of the base station 105-*e* or the UE 115-*e*), a second precoding scheme to be used for the one or more downlink communications (e.g., by one or both of the base station 105-*e* or the UE 115-*e*), or both.

In some examples, the UE 115-*e* may determine a rotation matrix at 1015 based on an alignment between an antenna array of the UE 115-*e* and an antenna array of the base station 105-*e*. The UE 115-*e* may determine the rotation matrix according to Equations 5 through 7, as described with reference to FIG. 3. Similarly, the base station 105-*e* may determine an interference estimate at 1020 based on the first set of LOS MIMO transmission modes, the second set of LOS MIMO transmission modes, and Equation 4, as described with reference to FIG. 2.

At 1025, the UE 115-*e* may transmit the one or more uplink communications via the uplink channel resource in accordance with the first set of one or more LOS MIMO transmission modes. At 1030, the base station 105-*e* may transmit the one or more downlink communications via the downlink channel resource in accordance with the second set of one or more LOS MIMO transmission modes. In some examples, the UE 115-*e* may apply a precoder in accordance with the first set of one or more LOS MIMO transmission modes to generate the one or more uplink communications, and the UE 115-*e* may monitor for and receive the one or more downlink communications that are precoded by the base station 105-*e* in accordance with the second set of one or more LOS MIMO transmission modes. In some examples, UE 115-*e* may select a receive beam, from a set of one or more available receives beams, where the selected receive beam corresponds to the second set of one or more LOS MIMO transmission modes to receive the one or more downlink communications.

In some examples, one or both of the UE 115-*e* or the base station 105-*e* may utilize a ULA structure, a URA structure, a uniform circular array (UCA) structure, or a uniform planar array (UPA) structure to communicate the one or more uplink communications and the one or more downlink communications. Additionally or alternatively, one or both of the UE 115-*e* or the base station 105-*e* may utilize a Slepian-based precoding scheme or a Legendre-based precoding scheme to communicate the one or more uplink communications and the one or more downlink communications. As such, full-duplex communication of the one or more uplink communications and the one or more downlink communications between the UE 115-*a* and the base station 105-*e* may be in accordance with the first and second sets of one or more LOS MIMO transmission modes to manage interference.

At 1035, the UE 115-*e* may compensate the one or more downlink communications, the one or more uplink communications, or both based on the rotation matrix determined at 1015. At 1040, the base station 105-*e* may compensate the one or more downlink communications, the one or more uplink communications, or both based on the interference estimate. Compensating the one or more downlink communications and the one or more uplink communications may improve the likelihood of successful communications between the UE 115-*e* and the base station 105-*e*.

The techniques and operations described in the process flow 1000 may enable the UE 115-*e* and the base station 105-*e* to perform full-duplex LOS MIMO communications with improved communication reliability, reduced interference, and greater multiplexing gain, among other benefits. For example, the techniques and operations described in the process flow 1000 may enable the UE 115-*e* and the base station 105-*e* to perform full-duplex communications with reduced interference based on using a specific combination of LOS MIMO transmission modes (e.g., SVD precoding schemes), which may increase the likelihood of successful communications between the base station 105-*e* and the UE 115-*e*.

Figure 11:
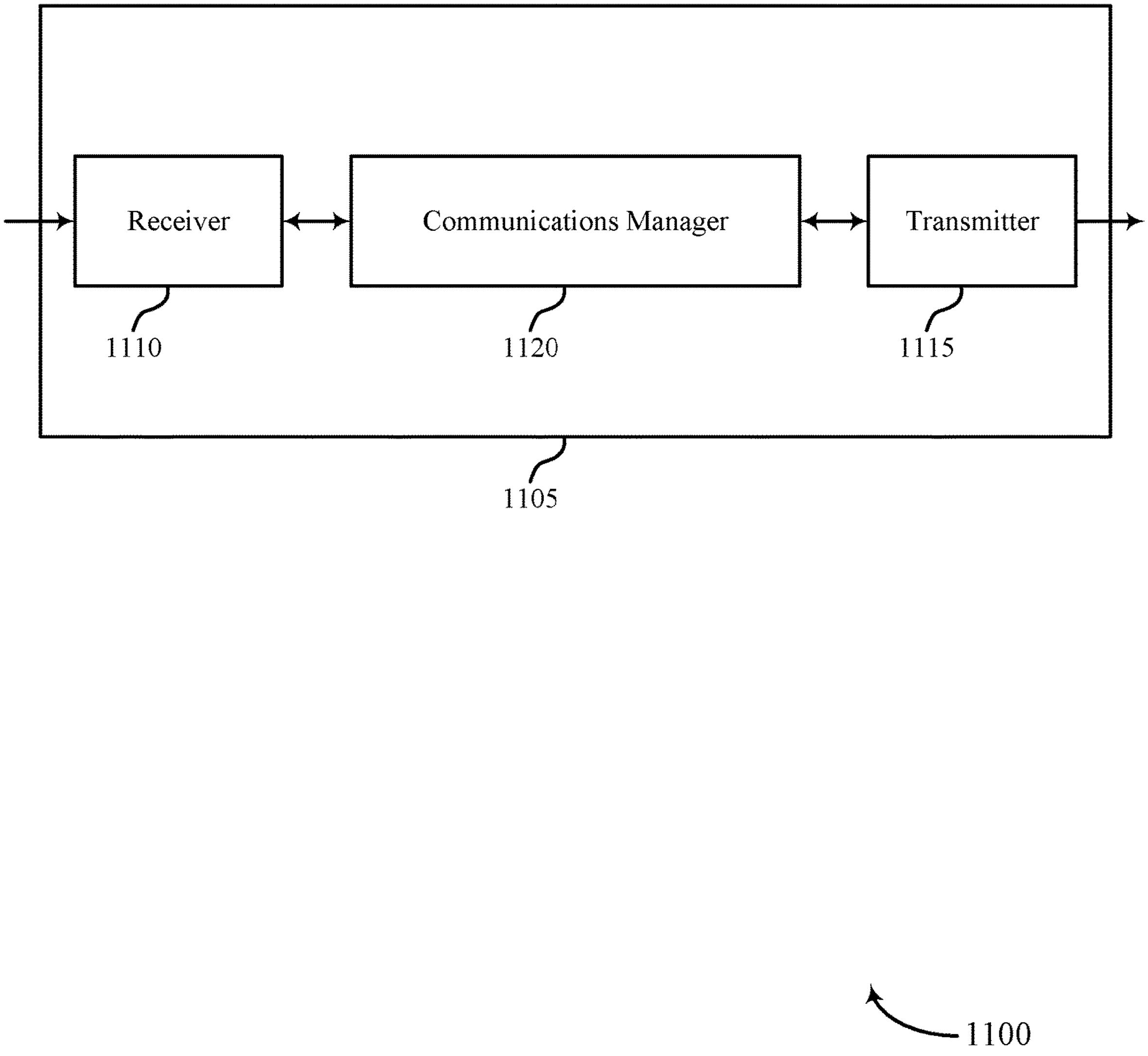
FIGS. 11 and 12 show block diagrams of devices that support full-duplex for LOS MIMO in accordance with aspects of the present disclosure.

FIG. 11 shows a block diagram 1100 of a device 1105 that supports full-duplex for LOS MIMO in accordance with aspects of the present disclosure. The device 1105 may be an example of aspects of a UE 115 as described with reference to FIG. 1. For example, the device 1105 may be an example of aspects of a relay device, a wireless device, a handheld device, or a subscriber device, among other examples. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to full-duplex for LOS MIMO). Information may be passed on to other components of the device 1105. The receiver 1110 may utilize a single antenna or multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to full-duplex for LOS MIMO). In some examples, the transmitter 1115 may be co-located with a receiver 1110 in a transceiver module. The transmitter 1115 may utilize a single antenna or multiple antennas.

The communications manager 1120, the receiver 1110, the transmitter 1115, or various combinations thereof or various components thereof may be examples of means for performing various aspects of full-duplex for LOS MIMO as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at the device 1105 (e.g., a UE 115) in accordance with examples as disclosed herein. For example, the communications manager 1120 may be configured as or otherwise support a means for transmitting, to a second wireless device, a message indicating a capability of the device 1105 to support full-duplex LOS MIMO communications. The communications manager 1120 may be configured as or otherwise support a means for receiving control signaling from the second wireless device in response to the message, the control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both. The communications manager 1120 may be configured as or otherwise support a means for communicating (e.g., transmitting) the one or more uplink communications via the uplink channel resource in accordance with the first set of one or more LOS MIMO transmission modes and communicating (e.g., receiving) the one or more downlink communications via the downlink channel resource in accordance with the second set of one or more LOS MIMO transmission modes based on the control signaling.

Additionally or alternatively, the communications manager 1120 may support wireless communications at the device 1105 (e.g., a UE 115) in accordance with examples as disclosed herein. For example, the communications manager 1120 may be configured as or otherwise support a means for transmitting, to a second wireless device, a message indicating a capability of the device 1105 to support full-duplex LOS MIMO communications. The communications manager 1120 may be configured as or otherwise support a means for receiving control signaling from the second wireless device in response to the message, the control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both. The communications manager 1120 may be configured as or otherwise support a means for either transmitting the one or more uplink communications via the uplink channel resource in accordance with the first set of one or more LOS MIMO transmission modes and receiving the one or more downlink communications via the downlink channel resource in accordance with the second set of one or more LOS MIMO transmission modes based on the control signaling or receiving the one or more uplink communications via the uplink channel resource in accordance with the first set of one or more LOS MIMO transmission modes and transmitting the one or more downlink communications via the downlink channel resource in accordance with the second set of one or more LOS MIMO transmission modes based on the control signaling.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced power consumption based on reducing a number of retransmissions performed by the device 1105. For example, the described techniques may enable the device 1105 to perform full-duplex communications with reduced interference based on using a specific combination of LOS MIMO transmission modes. Performing full-duplex communications with reduced interference may reduce the number of retransmissions performed by the device 1105, which may enable the device 1105 to remain in sleep mode for a longer duration. As a result, the device 1105 may experience greater power savings, among other benefits.

Figure 12:
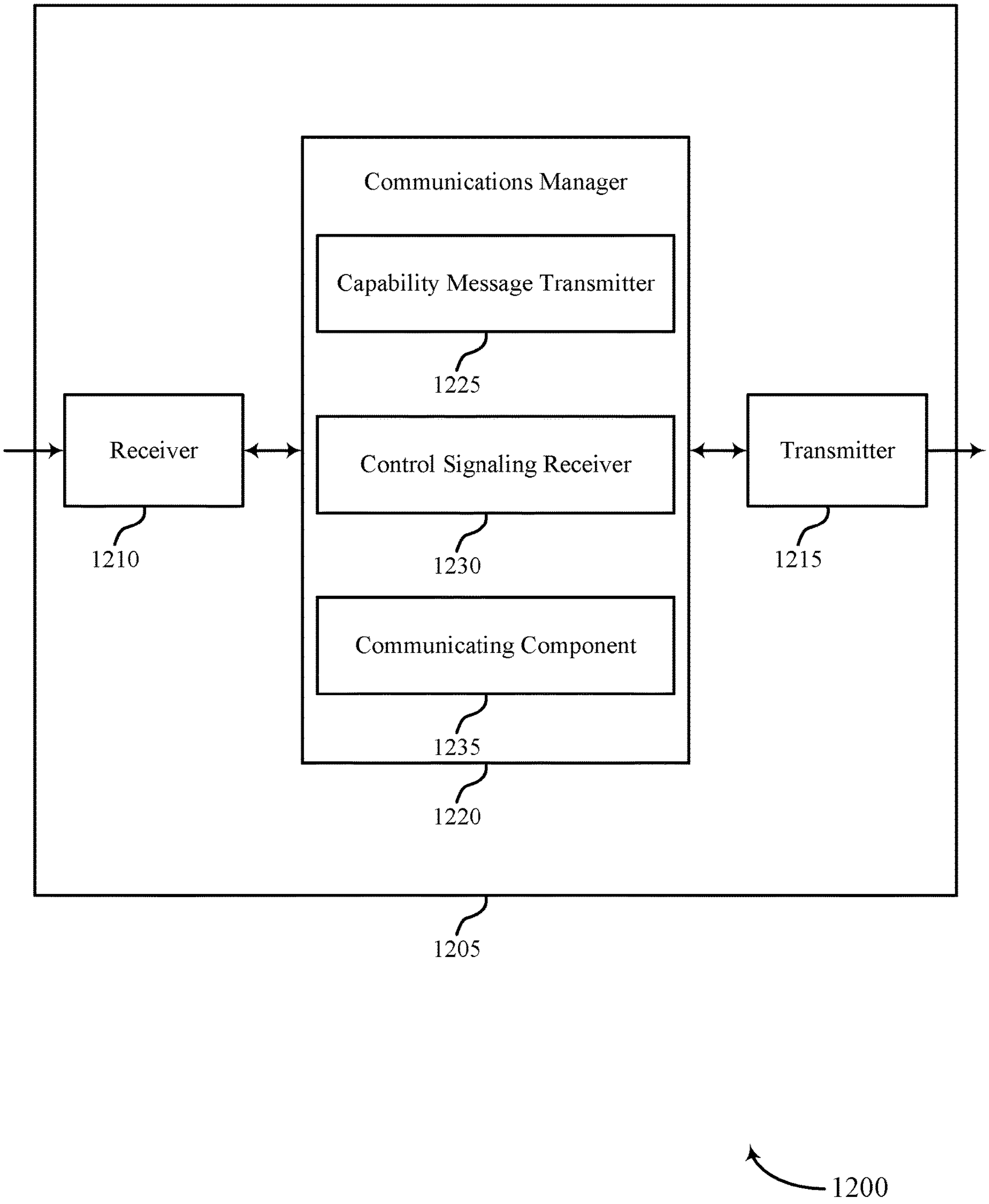

FIG. 12 shows a block diagram 1200 of a device 1205 that supports full-duplex for LOS MIMO in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to full-duplex for LOS MIMO). Information may be passed on to other components of the device 1205. The receiver 1210 may utilize a single antenna or multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to full-duplex for LOS MIMO). In some examples, the transmitter 1215 may be co-located with a receiver 1210 in a transceiver module. The transmitter 1215 may utilize a single antenna or multiple antennas.

The device 1205, or various components thereof, may be an example of means for performing various aspects of full-duplex for LOS MIMO as described herein. For example, the communications manager 1220 may include a capability message transmitter 1225, a control signaling receiver 1230, a communicating component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at the device 1205 (e.g., a UE 115) in accordance with examples as disclosed herein. The capability message transmitter 1225 may be configured as or otherwise support a means for transmitting, to a second wireless device, a message indicating a capability of the device 1205 to support full-duplex LOS MIMO communications. The control signaling receiver 1230 may be configured as or otherwise support a means for receiving control signaling from the second wireless device in response to the message, the control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both. The communicating component 1235 may be configured as or otherwise support a means for communicating the one or more uplink communications via the uplink channel resource in accordance with the first set of one or more LOS MIMO transmission modes and the one or more downlink communications via the downlink channel resource in accordance with the second set of one or more LOS MIMO transmission modes based on the control signaling.

Figure 13:
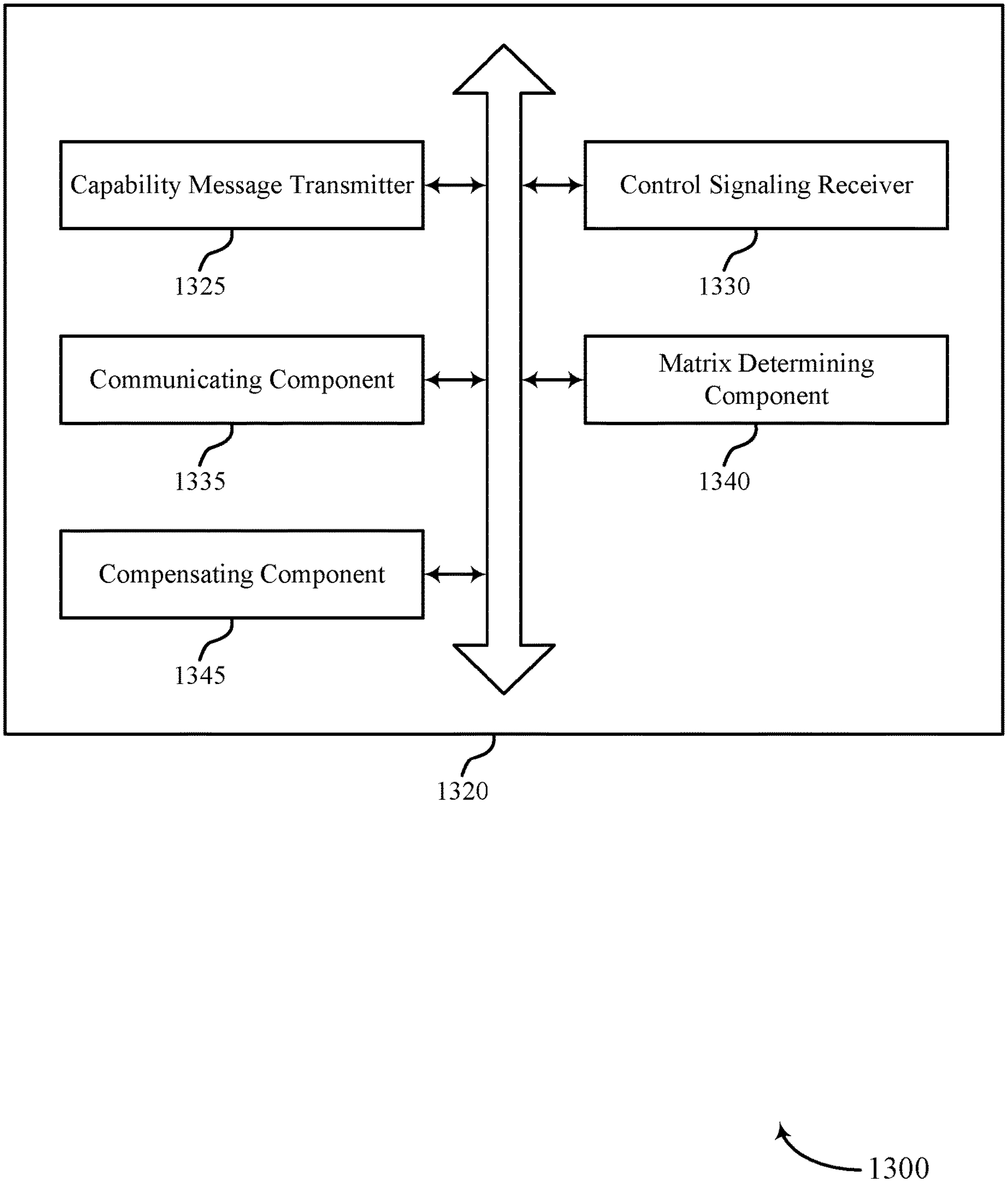
FIG. 13 shows a block diagram of a communications manager that supports full-duplex for LOS MIMO in accordance with aspects of the present disclosure.

FIG. 13 shows a block diagram 1300 of a communications manager 1320 that supports full-duplex for LOS MIMO in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of full-duplex for LOS MIMO as described herein. For example, the communications manager 1320 may include a capability message transmitter 1325, a control signaling receiver 1330, a communicating component 1335, a matrix determining component 1340, a compensating component 1345, or any combination thereof. Each of these components may communicate, directly or indirectly, with one another (e.g., via one or more buses).

The communications manager 1320 may support wireless communications at a first wireless device (e.g., a UE 115) in accordance with examples as disclosed herein. The capability message transmitter 1325 may be configured as or otherwise support a means for transmitting, to a second wireless device, a message indicating a capability of the first wireless device to support full-duplex LOS MIMO communications. The control signaling receiver 1330 may be configured as or otherwise support a means for receiving control signaling from the second wireless device in response to the message, the control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both. The communicating component 1335 may be configured as or otherwise support a means for communicating the one or more uplink communications via the uplink channel resource in accordance with the first set of one or more LOS MIMO transmission modes and the one or more downlink communications via the downlink channel resource in accordance with the second set of one or more LOS MIMO transmission modes based on the control signaling.

In some examples, to support receiving the control signaling, the control signaling receiver 1330 may be configured as or otherwise support a means for receiving, from the second wireless device, a first control message indicating a mapping between multiple LOS MIMO transmission modes and multiple channel resource pairings, each channel resource pairing including a respective uplink channel resource of multiple uplink channel resources and a respective downlink channel resource of multiple downlink channel resources. In some examples, to support receiving the control signaling, the control signaling receiver 1330 may be configured as or otherwise support a means for receiving, from the second wireless device, a second control message indicating a first channel resource pairing of the multiple channel resource pairings including the uplink channel resource and the downlink channel resource.

In some examples, to support receiving the control signaling, the control signaling receiver 1330 may be configured as or otherwise support a means for receiving, from the second wireless device, a first control message indicating a mapping between multiple LOS MIMO transmission modes and multiple TCI states. In some examples, to support receiving the control signaling, the control signaling receiver 1330 may be configured as or otherwise support a means for receiving, from the second wireless device, a second control message indicating one or both of a first TCI state of the multiple TCI states to be used for the one or more uplink communications or a second TCI state of the multiple TCI states to be used for the one or more downlink communications.

In some examples, to support receiving the control signaling, the control signaling receiver 1330 may be configured as or otherwise support a means for receiving, from the second wireless device, a first control message indicating a mapping between multiple LOS MIMO transmission modes and multiple polarizations. In some examples, to support receiving the control signaling, the control signaling receiver 1330 may be configured as or otherwise support a means for receiving, from the second wireless device, a second control message indicating one or both of a first polarization of the multiple polarizations to be used for transmission of the one or more uplink communications or a second polarization of the multiple polarizations to be used for transmission of the one or more downlink communications.

In some examples, to support receiving the control signaling, the control signaling receiver 1330 may be configured as or otherwise support a means for receiving, from the second wireless device, a first control message indicating a mapping between multiple LOS MIMO transmission modes and multiple precoding schemes. In some examples, to support receiving the control signaling, the control signaling receiver 1330 may be configured as or otherwise support a means for receiving, from the second wireless device, a second control message indicating one or both of a first precoding scheme of the multiple precoding schemes to be used for transmission of the one or more uplink communications or a second precoding scheme of the multiple precoding schemes to be used for transmission of the one or more downlink communications.

In some examples, to support receiving the control signaling, the control signaling receiver 1330 may be configured as or otherwise support a means for receiving the control signaling indicating the first set of one or more LOS MIMO transmission modes to be used for the one or more uplink communications, the first set of one or more LOS MIMO transmission modes corresponding to the uplink channel resource to be used for transmission of the one or more uplink communications, a transmission priority of the one or more uplink communications, a QoS threshold associated with the one or more uplink communications, a precoding scheme to be used for transmission of the one or more uplink communications, or a combination thereof. For example, the first set of one or more LOS MIMO transmission modes may be determined based on the transmission priority of the one or more uplink communications, the QoS threshold associated with the one or more uplink communications, the precoding scheme to be used for transmission of the one or more uplink communications, or a combination thereof.

In some examples, to support receiving the control signaling, the control signaling receiver 1330 may be configured as or otherwise support a means for receiving the control signaling indicating the second set of one or more LOS MIMO transmission modes to be used for the one or more downlink communications, the second set of one or more LOS MIMO transmission modes corresponding to the downlink channel resource to be used for transmission of the one or more downlink communications, a transmission priority of the one or more downlink communications, a QoS threshold associated with the one or more downlink communications, a precoding scheme to be used for transmission of the one or more downlink communications, or a combination thereof.

In some examples, to support receiving the control signaling, the control signaling receiver 1330 may be configured as or otherwise support a means for receiving the control signaling indicating a first set of one or more polarizations to be used for transmission of the one or more uplink communications, a second set of one or more polarizations to be used for transmission of the one or more downlink communications, or both.

In some examples, to support receiving the control signaling, the control signaling receiver 1330 may be configured as or otherwise support a means for receiving the control signaling indicating a pattern of one or more LOS MIMO transmission modes to be used for the one or more uplink communications, the pattern corresponding to a TBS of the one or more uplink communications, a QoS threshold associated with the one or more uplink communications, a priority level (equivalently referred to herein as a transmission priority) of the one or more uplink communications, a TCI state to be used for the one or more uplink communications, or a combination thereof.

In some examples, to support receiving the control signaling, the control signaling receiver 1330 may be configured as or otherwise support a means for receiving the control signaling indicating a pattern of LOS MIMO transmission modes to be used for the one or more downlink communications, the pattern corresponding to a TBS of the one or more downlink communications, a QoS threshold associated with the one or more downlink communications, a priority level of the one or more downlink communications, a TCI state to be used for the one or more downlink communications, or a combination thereof.

In some examples, to support receiving the control signaling, the control signaling receiver 1330 may be configured as or otherwise support a means for receiving the control signaling indicating a number of uplink repetitions for the one or more uplink communications, a number of downlink repetitions for the one or more downlink communications, a mapping between the first set of one or more LOS MIMO transmission modes and the number of uplink repetitions, a mapping between the second set of one or more LOS MIMO transmission modes and the number of downlink repetitions, or a combination thereof.

In some examples, to support receiving the control signaling, the control signaling receiver 1330 may be configured as or otherwise support a means for receiving one or more of an RRC message or an instance of DCI indicating the uplink channel resource, the downlink channel resource, the first set of one or more LOS MIMO transmission modes, the second set of one or more LOS MIMO transmission modes, or a combination thereof.

In some examples, the matrix determining component 1340 may be configured as or otherwise support a means for determining a rotation matrix based on an alignment between a first antenna array of the first wireless device and a second antenna array of the second wireless device. In some examples, the compensating component 1345 may be configured as or otherwise support a means for compensating the one or more downlink communications, the one or more uplink communications, or both based on the rotation matrix.

In some examples, to support communicating the one or more uplink communications and the one or more downlink communications, the communicating component 1335 may be configured as or otherwise support a means for communicating the one or more uplink communications and the one or more downlink communications in accordance with a Slepian-based precoding scheme or a Legendre-based precoding scheme.

In some examples, to support communicating the one or more uplink communications and the one or more downlink communications, the communicating component 1335 may be configured as or otherwise support a means for communicating the one or more uplink communications and the one or more downlink communications using a ULA structure, a URA structure, a UCA structure, or a UPA structure.

Figure 14:
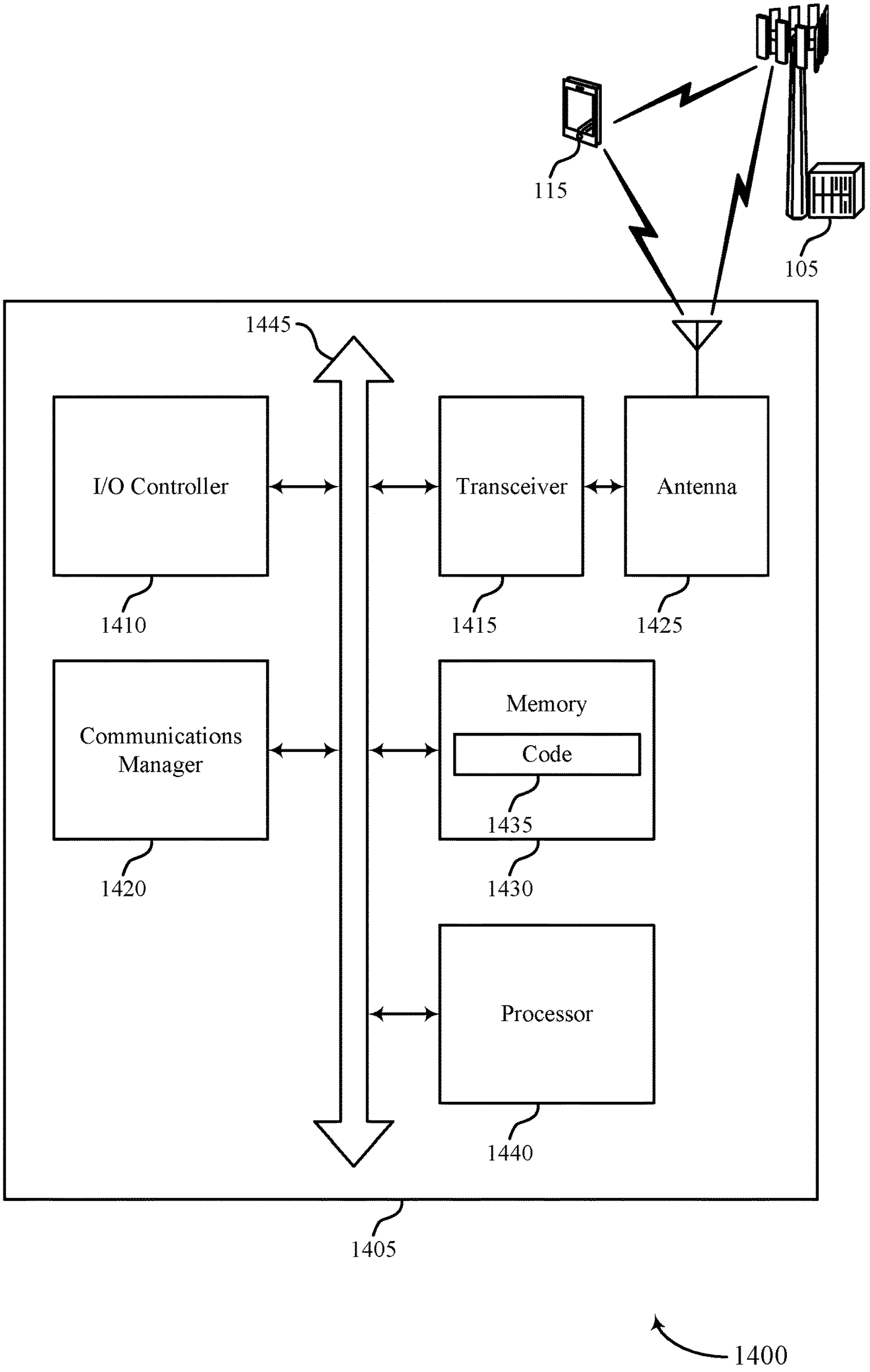
FIG. 14 shows a diagram of a system including a device that supports full-duplex for LOS MIMO in accordance with aspects of the present disclosure.

FIG. 14 shows a diagram of a system 1400 including a device 1405 that supports full-duplex for LOS MIMO in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting full-duplex for LOS MIMO). For example, the device 1405 or a component of the device 1405 may include a processor 1440 and memory 1430 coupled to the processor 1440, the processor 1440 and memory 1430 configured to perform various functions described herein.

The communications manager 1420 may support wireless communications at the device 1405 (e.g., a UE 115) in accordance with examples as disclosed herein. For example, the communications manager 1420 may be configured as or otherwise support a means for transmitting, to a second wireless device, a message indicating a capability of the device 1405 to support full-duplex LOS MIMO communications. The communications manager 1420 may be configured as or otherwise support a means for receiving control signaling from the second wireless device in response to the message, the control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both. The communications manager 1420 may be configured as or otherwise support a means for communicating the one or more uplink communications via the uplink channel resource in accordance with the first set of one or more LOS MIMO transmission modes and the one or more downlink communications via the downlink channel resource in accordance with the second set of one or more LOS MIMO transmission modes based on the control signaling.

By including or configuring the communications manager 1420 in accordance with examples as described herein, the device 1405 may support techniques for improved communication reliability and reduced interference. For example, the described techniques may enable the device 1405 to perform full-duplex communications with reduced interference by using a specific combination of LOS MIMO transmission modes (e.g., SVD precoding schemes). In addition, the described techniques may enable the device 1405 to experience higher multiplexing gain by using a full-duplex LOS MIMO communication scheme.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager

1420 may be supported by or performed by the processor 1440, the memory 1430, the code 1435, or any combination thereof. For example, the code 1435 may include instructions executable by the processor 1440 to cause the device 1405 to perform various aspects of full-duplex for LOS MIMO as described herein, or the processor 1440 and the memory 1430 may be otherwise configured to perform or support such operations.

Figure 15:
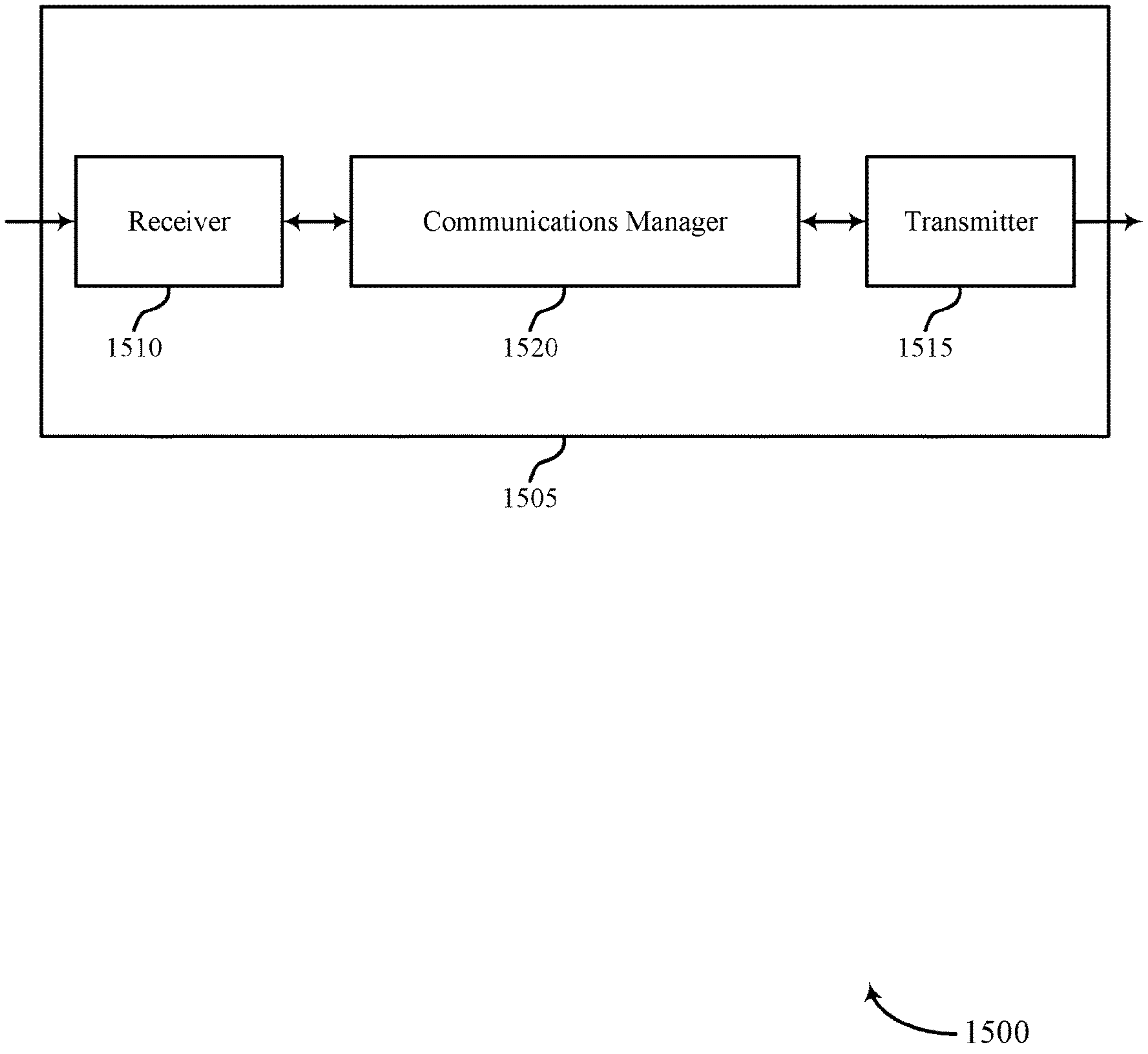
FIGS. 15 and 16 show block diagrams of devices that support full-duplex for LOS MIMO in accordance with aspects of the present disclosure.

FIG. 15 shows a block diagram 1500 of a device 1505 that supports full-duplex for LOS MIMO in accordance with aspects of the present disclosure. The device 1505 may be an example of aspects of a base station 105 as described with reference to FIG. 1. For example, the device 1505 may be an example of aspects of an access point, a radio transceiver, a TRP, an eNB, or a gNB, among other examples. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to full-duplex for LOS MIMO). Information may be passed on to other components of the device 1505. The receiver 1510 may utilize a single antenna or multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to full-duplex for LOS MIMO). In some examples, the transmitter 1515 may be co-located with a receiver 1510 in a transceiver module. The transmitter 1515 may utilize a single antenna or multiple antennas.

The communications manager 1520, the receiver 1510, the transmitter 1515, or various combinations thereof or various components thereof may be examples of means for performing various aspects of full-duplex for LOS MIMO as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at the device 1505 (e.g., a base station 105) in accordance with examples as disclosed herein. For example, the communications manager 1520 may be configured as or otherwise support a means for receiving, from a second wireless device, a message indicating a capability of the second wireless device to support full-duplex LOS MIMO communications. The communications manager 1520 may be configured as or otherwise support a means for transmitting, based on receiving the message from the second wireless device, control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both. The communications manager 1520 may be configured as or otherwise support a means for communicating (e.g., receiving) the one or more uplink communications via the uplink channel resource in accordance with the first set of one or more LOS MIMO transmission modes and communicating (e.g., transmitting) the one or more downlink communications via the downlink channel resource in accordance with the second set of one or more LOS MIMO transmission modes based on the control signaling.

Additionally or alternatively, the communications manager 1520 may support wireless communications at the device 1505 (e.g., a base station 105, a control node, a TRP) in accordance with examples as disclosed herein. For example, the communications manager 1520 may be configured as or otherwise support a means for receiving, from a second wireless device, a message indicating a capability of the second wireless device to support full-duplex LOS MIMO communications. The communications manager 1520 may be configured as or otherwise support a means for transmitting, based on receiving the message from the second wireless device, control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both. The communications manager 1520 may be configured as or otherwise support a means for either receiving the one or more uplink communications via the uplink channel resource in accordance with the first set of one or more LOS MIMO transmission modes and transmitting the one or more downlink communications via the downlink channel resource in accordance with the second set of one or more LOS MIMO transmission modes based on the control signaling or transmitting the one or more uplink communications via the uplink channel resource in accordance with the first set of one or more LOS MIMO transmission modes and receiving the one or more downlink communications via the downlink channel resource in accordance with the second set of one or more LOS MIMO transmission modes based on the control signaling.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for reduced power consumption based on reducing the number of retransmissions performed by the device 1505. For example, the described techniques may enable the device 1505 to perform full-duplex communications with greater reliability and reduced interference, which may reduce a number of retransmissions performed by the device 1505. As a result, the device 1505 may remain in sleep mode for a longer duration, which may decrease power consumption at the device 1505, among other benefits.

Figure 16:
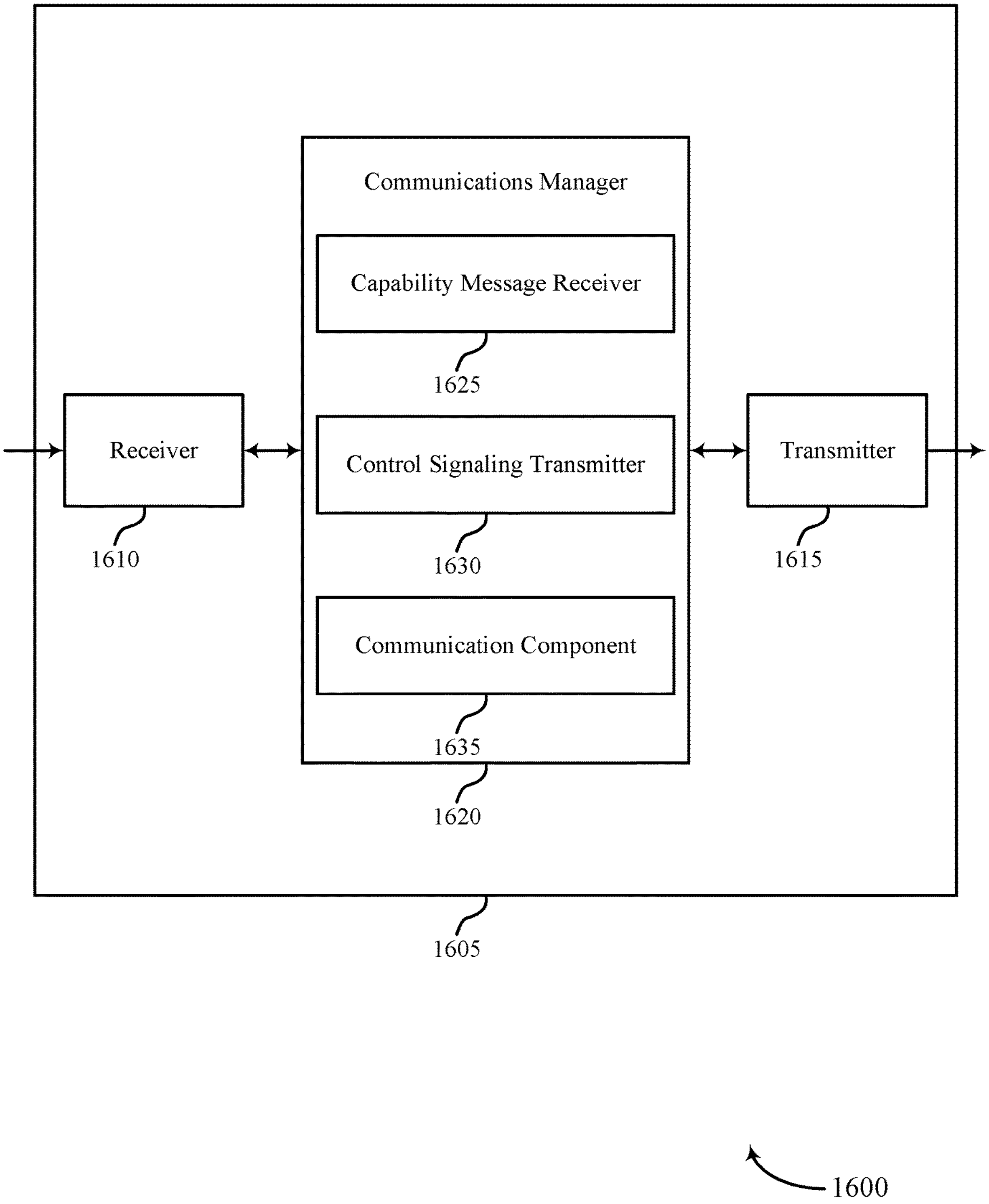

FIG. 16 shows a block diagram 1600 of a device 1605 that supports full-duplex for LOS MIMO in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to full-duplex for LOS MIMO). Information may be passed on to other components of the device 1605. The receiver 1610 may utilize a single antenna or multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to full-duplex for LOS MIMO). In some examples, the transmitter 1615 may be co-located with a receiver 1610 in a transceiver module. The transmitter 1615 may utilize a single antenna or multiple antennas.

The device 1605, or various components thereof, may be an example of means for performing various aspects of full-duplex for LOS MIMO as described herein. For example, the communications manager 1620 may include a capability message receiver 1625, a control signaling transmitter 1630, a communication component 1635, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communications at the device 1605 (e.g., a base station 105) in accordance with examples as disclosed herein. The capability message receiver 1625 may be configured as or otherwise support a means for receiving, from a second wireless device, a message indicating a capability of the second wireless device to support full-duplex LOS MIMO communications. The control signaling transmitter 1630 may be configured as or otherwise support a means for transmitting, based on receiving the message from the second wireless device, control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both. The communication component 1635 may be configured as or otherwise support a means for communicating the one or more uplink communications via the uplink channel resource in accordance with the first set of one or more LOS MIMO transmission modes and the one or more downlink communications via the downlink channel resource in accordance with the second set of one or more LOS MIMO transmission modes based on the control signaling.

Figure 17:
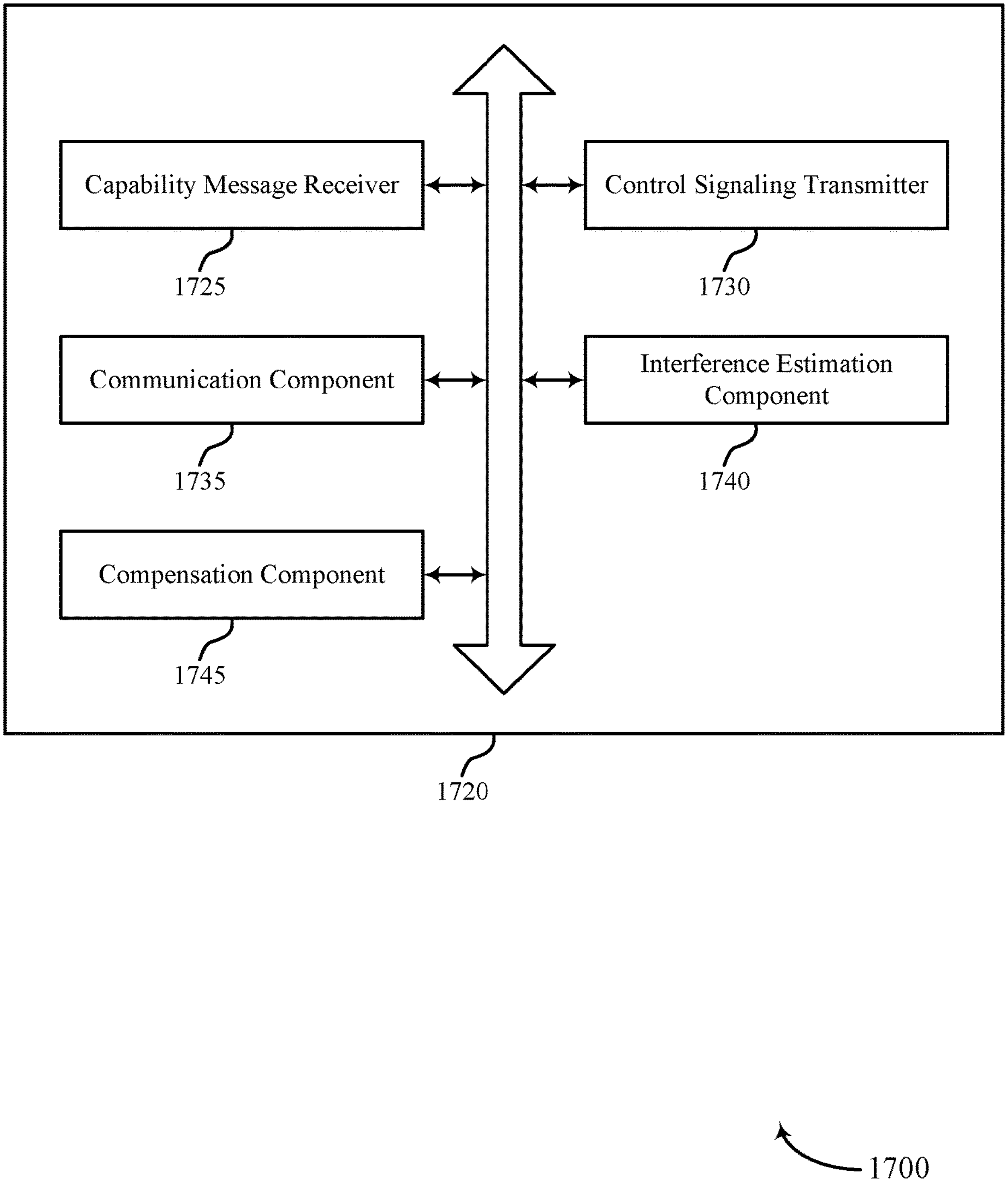
FIG. 17 shows a block diagram of a communications manager that supports full-duplex for LOS MIMO in accordance with aspects of the present disclosure.

FIG. 17 shows a block diagram 1700 of a communications manager 1720 that supports full-duplex for LOS MIMO in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of full-duplex for LOS MIMO as described herein. For example, the communications manager 1720 may include a capability message receiver 1725, a control signaling transmitter 1730, a communication component 1735, an interference estimation component 1740, a compensation component 1745, or any combination thereof. Each of these components may communicate, directly or indirectly, with one another (e.g., via one or more buses).

The communications manager 1720 may support wireless communications at a first wireless device (e.g., a base station 105) in accordance with examples as disclosed herein. The capability message receiver 1725 may be configured as or otherwise support a means for receiving, from a second wireless device, a message indicating a capability of the second wireless device to support full-duplex LOS MIMO communications. The control signaling transmitter 1730 may be configured as or otherwise support a means for transmitting, based on receiving the message from the second wireless device, control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both. The communication component 1735 may be configured as or otherwise support a means for communicating the one or more uplink communications via the uplink channel resource in accordance with the first set of one or more LOS MIMO transmission modes and the one or more downlink communications via the downlink channel resource in accordance with the second set of one or more LOS MIMO transmission modes based on the control signaling.

In some examples, to support transmitting the control signaling, the control signaling transmitter 1730 may be configured as or otherwise support a means for transmitting a first control message indicating a mapping between multiple LOS MIMO transmission modes and multiple channel resource pairings, each channel resource pairing including a respective uplink channel resource of multiple uplink channel resources and a respective downlink channel resource of multiple downlink channel resources. In some examples, to support transmitting the control signaling, the control signaling transmitter 1730 may be configured as or otherwise support a means for transmitting a second control message indicating a first channel resource pairing of the multiple channel resource pairings including the uplink channel resource and the downlink channel resource.

In some examples, to support transmitting the control signaling, the control signaling transmitter 1730 may be configured as or otherwise support a means for transmitting a first control message indicating a mapping between multiple LOS MIMO transmission modes and multiple TCI states. In some examples, to support transmitting the control signaling, the control signaling transmitter 1730 may be configured as or otherwise support a means for transmitting a second control message indicating one or both of a first TCI state to be used for the one or more uplink communications or a second TCI state to be used for the one or more downlink communications.

In some examples, to support transmitting the control signaling, the control signaling transmitter 1730 may be configured as or otherwise support a means for transmitting a first control message indicating a mapping between multiple LOS MIMO transmission modes and multiple polarizations. In some examples, to support transmitting the control signaling, the control signaling transmitter 1730 may be configured as or otherwise support a means for transmitting a second control message indicating one or both of a first polarization of the multiple polarizations to be used for transmission of the one or more uplink communications or a second polarization of the multiple polarizations to be used for transmission of the one or more downlink communications.

In some examples, to support transmitting the control signaling, the control signaling transmitter 1730 may be configured as or otherwise support a means for transmitting a first control message indicating a mapping between multiple LOS MIMO transmission modes and multiple precoding schemes. In some examples, to support transmitting the control signaling, the control signaling transmitter 1730 may be configured as or otherwise support a means for transmitting a second control message indicating one or both of a first precoding scheme of the multiple precoding schemes to be used for transmission of the one or more uplink communications or a second precoding scheme of the multiple precoding schemes to be used for transmission of the one or more downlink communications.

In some examples, to support transmitting the control signaling, the control signaling transmitter 1730 may be configured as or otherwise support a means for transmitting the control signaling indicating the first set of one or more LOS MIMO transmission modes to be used for the one or more uplink communications, where the first set of one or more LOS MIMO transmission modes corresponds to the uplink channel resource to be used for transmission of the one or more uplink communications, a transmission priority of the one or more uplink communications, a QoS threshold associated with the one or more uplink communications, a precoding scheme to be used for transmission of the one or more uplink communications, or a combination thereof.

In some examples, to support transmitting the control signaling, the control signaling transmitter 1730 may be configured as or otherwise support a means for transmitting the control signaling indicating the second set of one or more LOS MIMO transmission modes to be used for the one or more downlink communications, where the second set of one or more LOS MIMO transmission modes corresponds to the downlink channel resource to be used for transmission of the one or more downlink communications, a transmission priority of the one or more downlink communications, a QoS threshold associated with the one or more downlink communications, a precoding scheme to be used for the one or more downlink communications, or a combination thereof.

In some examples, to support transmitting the control signaling, the control signaling transmitter 1730 may be configured as or otherwise support a means for transmitting the control signaling indicating a first set of one or more polarizations to be used for transmission of the one or more uplink communications, a second set of one or more polarizations to be used for transmission of the one or more downlink communications, or both.

In some examples, to support transmitting the control signaling, the control signaling transmitter 1730 may be configured as or otherwise support a means for transmitting the control signaling indicating a pattern of one or more LOS MIMO transmission modes to be used for the one or more uplink communications, the pattern corresponding to a TBS of the one or more uplink communications, a QoS threshold associated with the one or more uplink communications, a priority level of the one or more uplink communications, a TCI state to be used for the one or more uplink communications, or a combination thereof.

In some examples, to support transmitting the control signaling, the control signaling transmitter 1730 may be configured as or otherwise support a means for transmitting the control signaling indicating a pattern of LOS MIMO transmission modes to be used for the one or more downlink communications, the pattern corresponding to a TBS of the one or more downlink communications, a QoS threshold associated with the one or more downlink communications, a priority level of the one or more downlink communications, a TCI state to be used for the one or more downlink communications, or a combination thereof.

In some examples, to support transmitting the control signaling, the control signaling transmitter 1730 may be configured as or otherwise support a means for transmitting the control signaling indicating a number of uplink repetitions for the one or more uplink communications, a number of downlink repetitions for the one or more downlink communications, a mapping between the first set of one or more LOS MIMO transmission modes and the number of uplink repetitions, a mapping between the second set of one or more LOS MIMO transmission modes and the number of downlink repetitions, or a combination thereof.

In some examples, to support transmitting the control signaling, the control signaling transmitter 1730 may be configured as or otherwise support a means for transmitting one or more of an RRC message or an instance of DCI indicating the uplink channel resource, the downlink channel resource, the first set of one or more LOS MIMO transmission modes, the second set of one or more LOS MIMO transmission modes, or a combination thereof.

In some examples, the interference estimation component 1740 may be configured as or otherwise support a means for determining an interference estimate based on the first set of one or more LOS MIMO transmission modes and the second set of one or more LOS MIMO transmission modes. In some examples, the compensation component 1745 may be configured as or otherwise support a means for compensating the one or more downlink communications, the one or more uplink communications, or both based on the interference estimate.

Figure 18:
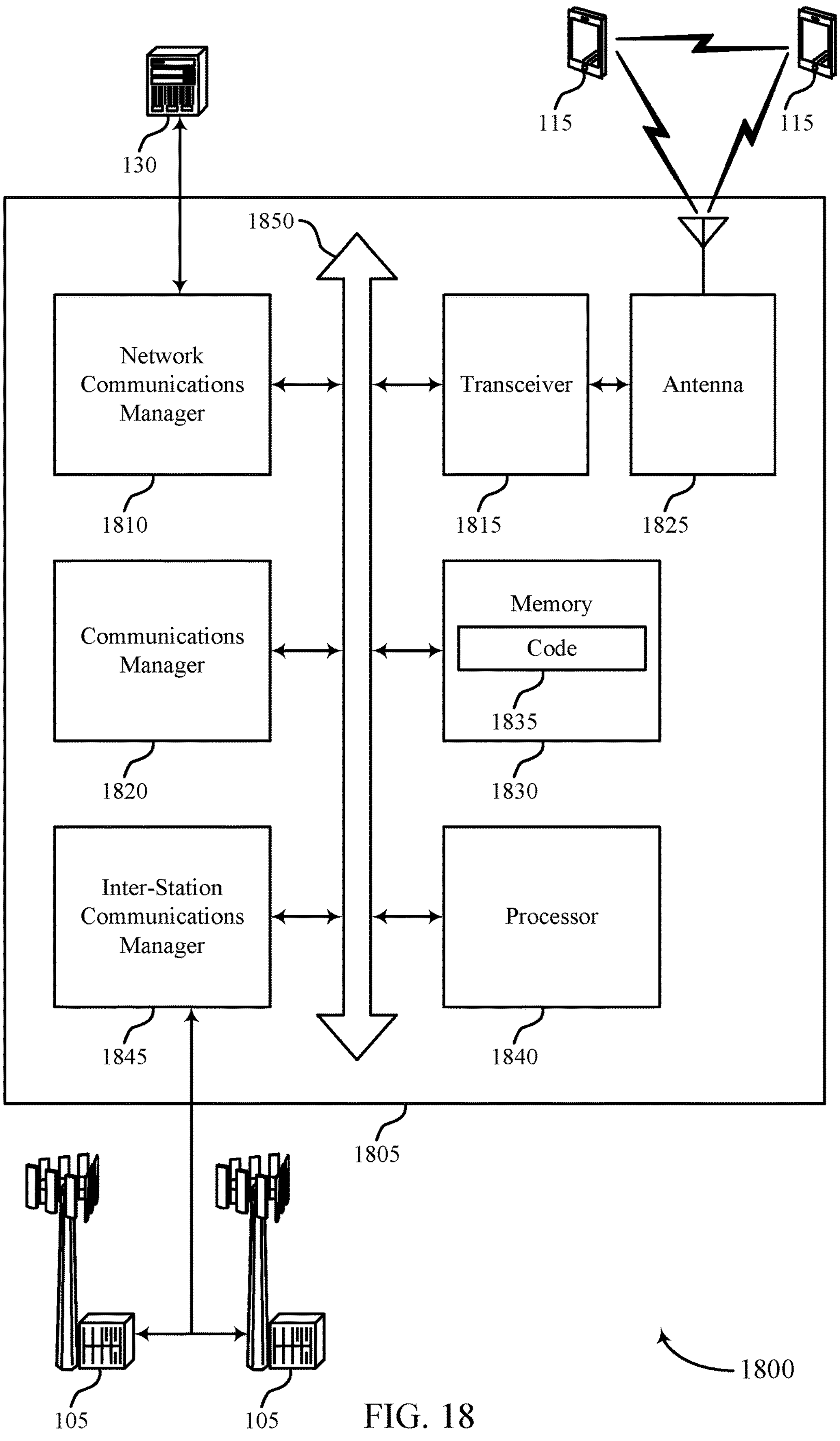
FIG. 18 shows a diagram of a system including a device that supports full-duplex for LOS MIMO in accordance with aspects of the present disclosure.

FIG. 18 shows a diagram of a system 1800 including a device 1805 that supports full-duplex for LOS MIMO in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting full-duplex for LOS MIMO). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communications at the device 1805 (e.g., a base station 105) in accordance with examples as disclosed herein. For example, the communications manager 1820 may be configured as or otherwise support a means for receiving, from a second wireless device, a message indicating a capability of the second wireless device to support full-duplex LOS MIMO communications. The communications manager 1820 may be configured as or otherwise support a means for transmitting, based on receiving the message from the second wireless device, control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, where the uplink channel resource at least partially overlaps with the downlink channel resource in time, frequency, or both. The communications manager 1820 may be configured as or otherwise support a means for communicating the one or more uplink communications via the uplink channel resource in accordance with the first set of one or more LOS MIMO transmission modes and the one or more downlink communications via the downlink channel resource in accordance with the second set of one or more LOS MIMO transmission modes based on the control signaling.

By including or configuring the communications manager 1820 in accordance with examples as described herein, the device 1805 may support techniques for improved communication reliability, reduced interference, and higher multiplexing gain, among other benefits. For example, the described techniques may enable the device 1805 to perform full-duplex communications using a combination of LOS MIMO transmission modes. The combination of LOS MIMO transmission modes used by the device 1805 may result in lower interference levels at the device 1805, which may increase the likelihood of successful communications at the device 1805.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of full-duplex for LOS MIMO as described herein, or the processor 1840 and the memory 1830 may be otherwise configured to perform or support such operations.

Figure 19:
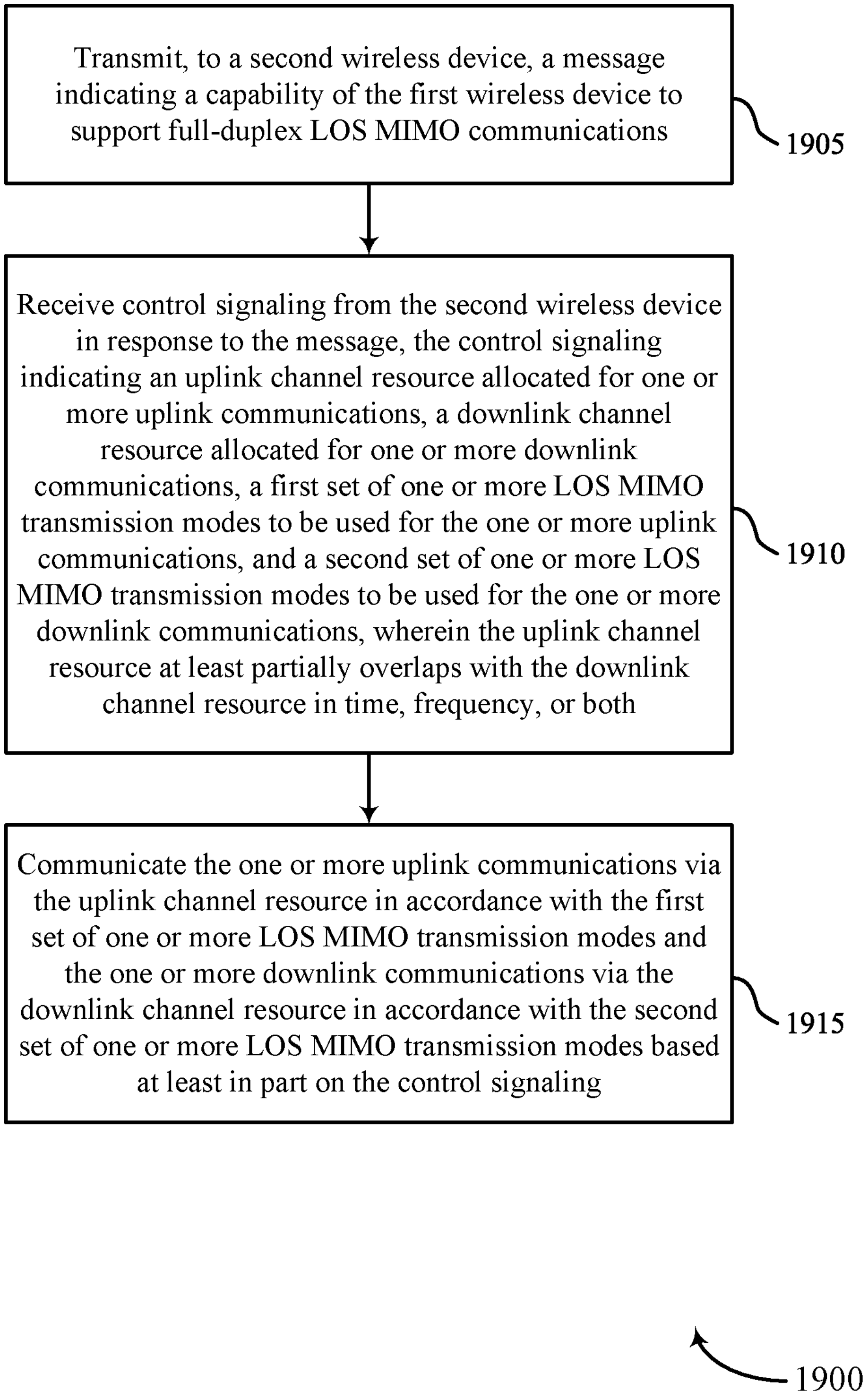
FIGS. 19 through 22 show flowcharts illustrating methods that support full-duplex for LOS MIMO in accordance with aspects of the present disclosure.

FIG. 19 shows a flowchart illustrating a method 1900 that supports full-duplex for LOS MIMO in accordance with aspects of the present disclosure. The operations of the method 1900 may be implemented by a first wireless device (e.g., a UE) or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include transmitting, to a second wireless device, a message indicating a capability of the first wireless device to support full-duplex LOS MIMO communications. The operations of 1905 may be performed in accordance with examples as disclosed herein. In some examples, aspects of the operations of 1905 may be performed by a capability message transmitter 1325 as described with reference to FIG. 13.

At 1910, the method may include receiving control signaling from the second wireless device in response to the message, the control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, wherein the uplink channel resource at least partially overlaps with the downlink channel resource in time, frequency, or both. The operations of 1910 may be performed in accordance with examples as disclosed herein. In some examples, aspects of the operations of 1910 may be performed by a control signaling receiver 1330 as described with reference to FIG. 13.

At 1915, the method may include communicating the one or more uplink communications via the uplink channel resource in accordance with the first set of one or more LOS MIMO transmission modes and the one or more downlink communications via the downlink channel resource in accordance with the second set of one or more LOS MIMO transmission modes based at least in part on the control signaling. The operations of 1915 may be performed in accordance with examples as disclosed herein. In some examples, aspects of the operations of 1915 may be performed by a communicating component 1335 as described with reference to FIG. 13.

Figure 20:
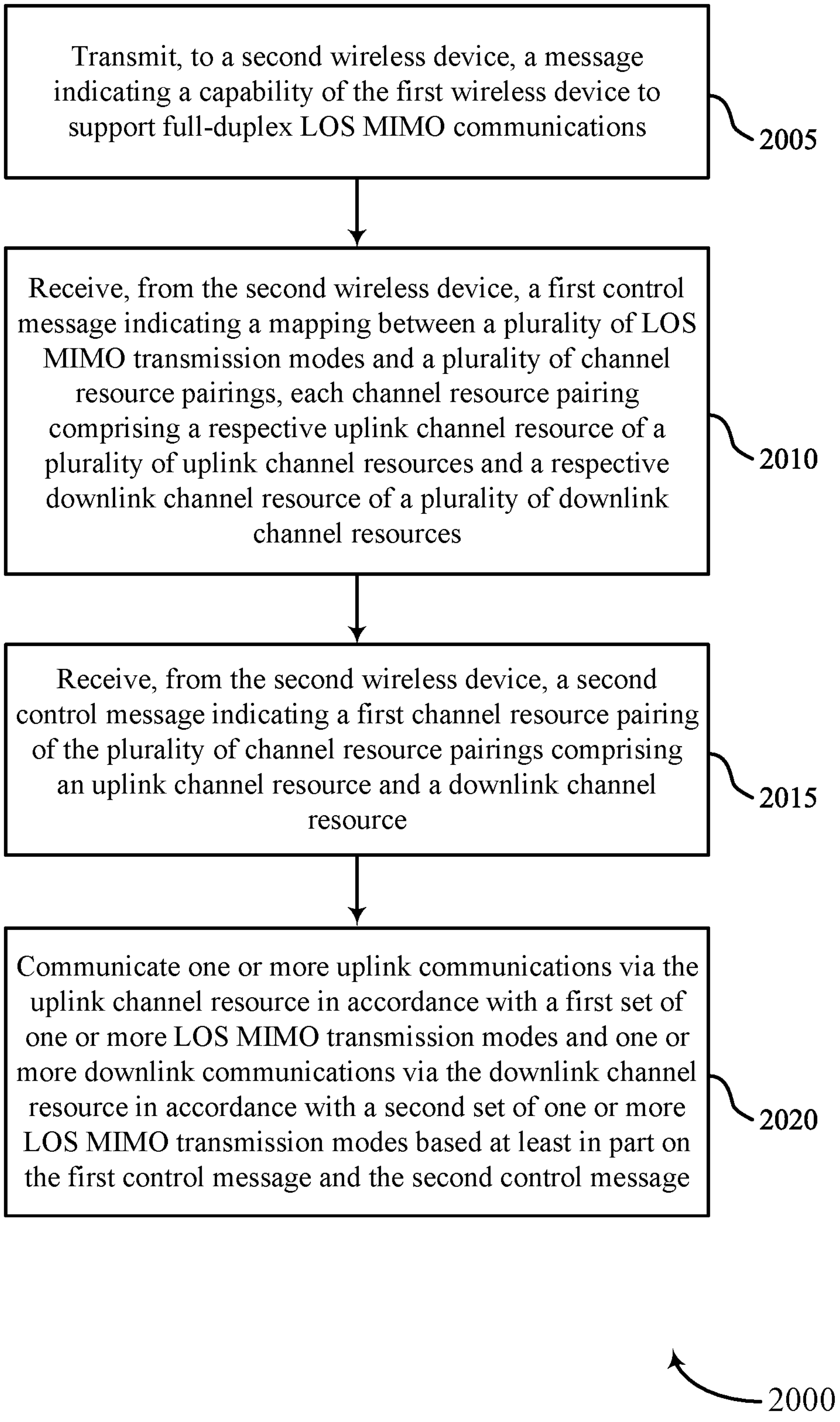

FIG. 20 shows a flowchart illustrating a method 2000 that supports full-duplex for LOS MIMO in accordance with aspects of the present disclosure. The operations of the method 2000 may be implemented by a first wireless device (e.g., a UE) or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2005, the method may include transmitting, to a second wireless device, a message indicating a capability of the first wireless device to support full-duplex LOS MIMO communications. The operations of 2005 may be performed in accordance with examples as disclosed herein. In some examples, aspects of the operations of 2005 may be performed by a capability message transmitter 1325 as described with reference to FIG. 13.

At 2010, the method may include receiving, from the second wireless device, a first control message indicating a mapping between a plurality of LOS MIMO transmission modes and a plurality of channel resource pairings, each channel resource pairing comprising a respective uplink channel resource of a plurality of uplink channel resources and a respective downlink channel resource of a plurality of downlink channel resources. The operations of 2010 may be performed in accordance with examples as disclosed herein. In some examples, aspects of the operations of 2010 may be performed by a control signaling receiver 1330 as described with reference to FIG. 13.

At 2015, the method may include receiving, from the second wireless device, a second control message indicating a first channel resource pairing of the plurality of channel resource pairings comprising an uplink channel resource and a downlink channel resource. The operations of 2015 may be performed in accordance with examples as disclosed herein. In some examples, aspects of the operations of 2015 may be performed by a control signaling receiver 1330 as described with reference to FIG. 13.

At 2020, the method may include communicating one or more uplink communications via the uplink channel resource in accordance with a first set of one or more LOS MIMO transmission modes and one or more downlink communications via the downlink channel resource in accordance with a second set of one or more LOS MIMO transmission modes based at least in part on the first control message and the second control message. The operations of 2020 may be performed in accordance with examples as disclosed herein. In some examples, aspects of the operations of 2020 may be performed by a communicating component 1335 as described with reference to FIG. 13.

Figure 21:
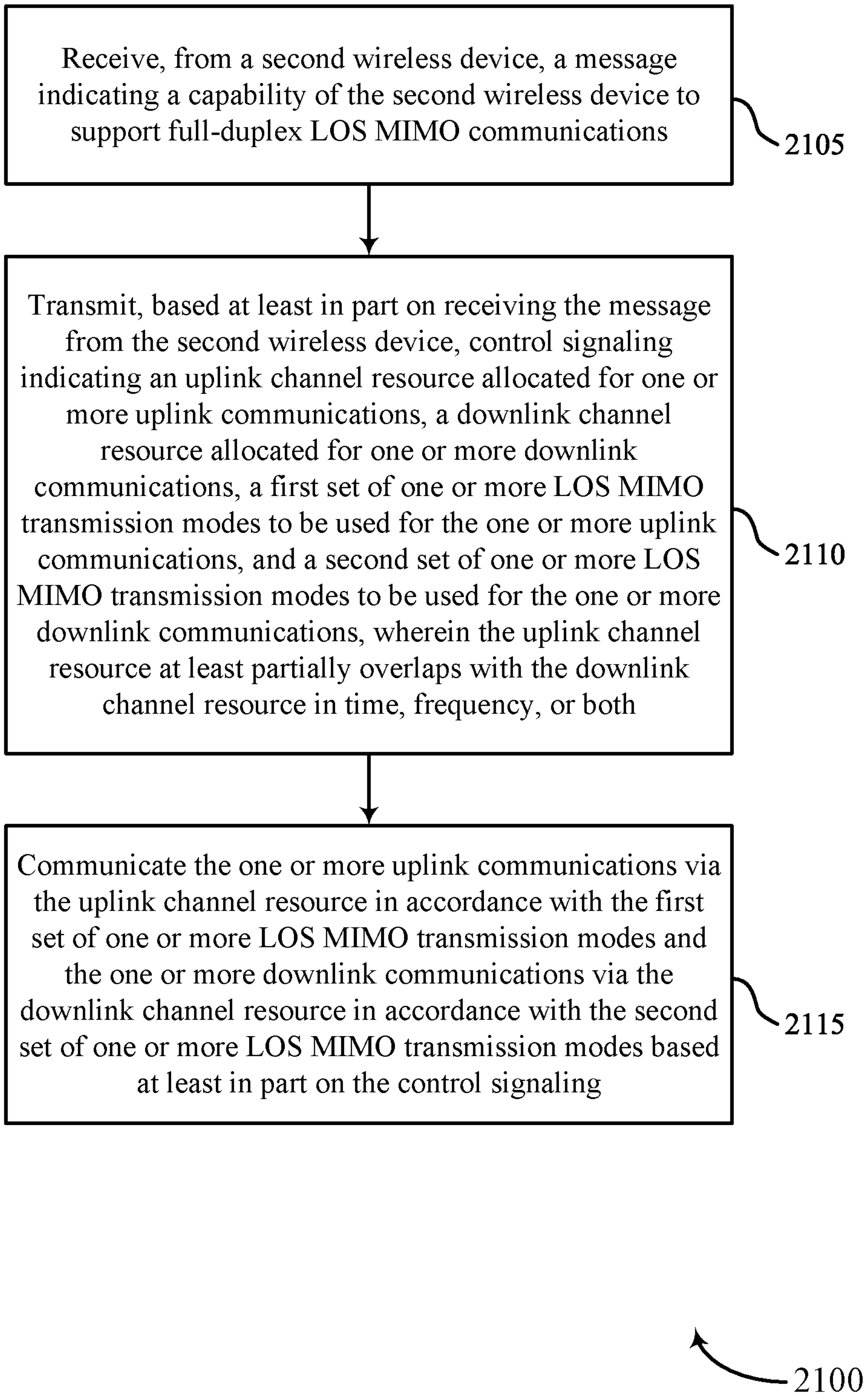

FIG. 21 shows a flowchart illustrating a method 2100 that supports full-duplex for LOS MIMO in accordance with aspects of the present disclosure. The operations of the method 2100 may be implemented by a base station or its components as described herein. For example, the operations of the method 2100 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2105, the method may include receiving, from a second wireless device, a message indicating a capability of the second wireless device to support full-duplex LOS MIMO communications. The operations of 2105 may be performed in accordance with examples as disclosed herein. In some examples, aspects of the operations of 2105 may be performed by a capability message receiver 1725 as described with reference to FIG. 17.

At 2110, the method may include transmitting, based at least in part on receiving the message from the second wireless device, control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, wherein the uplink channel resource at least partially overlaps with the downlink channel resource in time, frequency, or both. The operations of 2110 may be performed in accordance with examples as disclosed herein. In some examples, aspects of the operations of 2110 may be performed by a control signaling transmitter 1730 as described with reference to FIG. 17.

At 2115, the method may include communicating the one or more uplink communications via the uplink channel resource in accordance with the first set of one or more LOS MIMO transmission modes and the one or more downlink communications via the downlink channel resource in accordance with the second set of one or more LOS MIMO transmission modes based at least in part on the control signaling. The operations of 2115 may be performed in accordance with examples as disclosed herein. In some examples, aspects of the operations of 2115 may be performed by a communication component 1735 as described with reference to FIG. 17.

Figure 22:
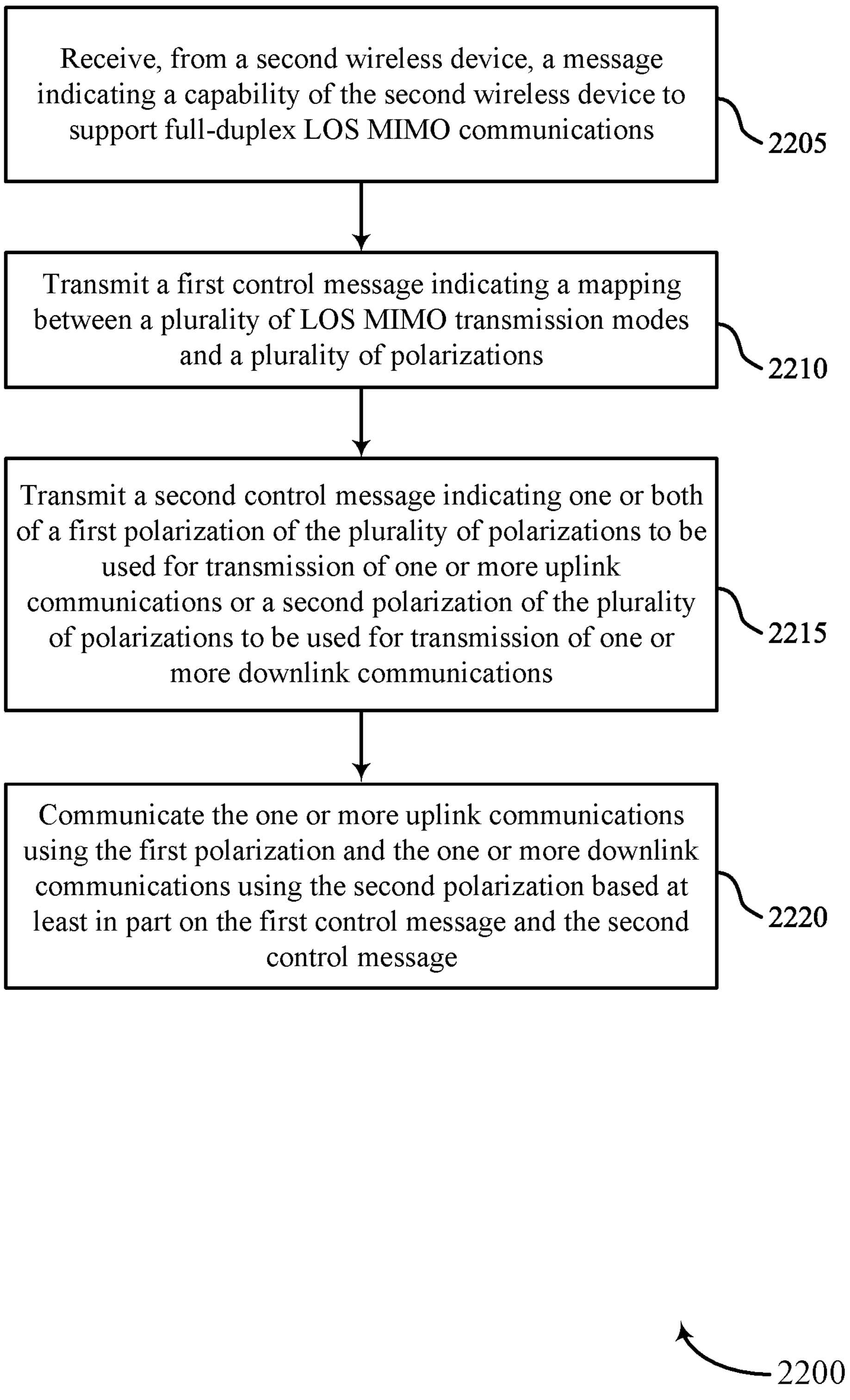

FIG. 22 shows a flowchart illustrating a method 2200 that supports full-duplex for LOS MIMO in accordance with aspects of the present disclosure. The operations of the method 2200 may be implemented by a base station or its components as described herein. For example, the operations of the method 2200 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2205, the method may include receiving, from a second wireless device, a message indicating a capability of the second wireless device to support full-duplex LOS MIMO communications. The operations of 2205 may be performed in accordance with examples as disclosed herein. In some examples, aspects of the operations of 2205 may be performed by a capability message receiver 1725 as described with reference to FIG. 17.

At 2210, the method may include transmitting a first control message indicating a mapping between a plurality of LOS MIMO transmission modes and a plurality of polarizations. The operations of 2210 may be performed in accordance with examples as disclosed herein. In some examples, aspects of the operations of 2210 may be performed by a control signaling transmitter 1730 as described with reference to FIG. 17.

At 2215, the method may include transmitting a second control message indicating one or both of a first polarization of the plurality of polarizations to be used for transmission of one or more uplink communications or a second polarization of the plurality of polarizations to be used for transmission of one or more downlink communications. The operations of 2215 may be performed in accordance with examples as disclosed herein. In some examples, aspects of the operations of 2215 may be performed by a control signaling transmitter 1730 as described with reference to FIG. 17.

At 2220, the method may include communicating the one or more uplink communications using the first polarization and the one or more downlink communications using the second polarization based at least in part on the first control message and the second control message. The operations of 2220 may be performed in accordance with examples as disclosed herein. In some examples, aspects of the operations of 2220 may be performed by a communication component 1735 as described with reference to FIG. 17.

The following provides an overview of aspects of the present disclosure:

Aspect 1: A method for wireless communications at a first wireless device, comprising: transmitting, to a second wireless device, a message indicating a capability of the first wireless device to support full-duplex line-of-sight (LOS) multiple-input multiple-output (MIMO) communications; receiving control signaling from the second wireless device in response to the message, the control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, wherein the uplink channel resource at least partially overlaps with the downlink channel resource in time, frequency, or both; and communicating the one or more uplink communications via the uplink channel resource in accordance with the first set of one or more LOS MIMO transmission modes and the one or more downlink communications via the downlink channel resource in accordance with the second set of one or more LOS MIMO transmission modes based at least in part on the control signaling. The method of aspect 1 may enable the first wireless device to perform the one or more uplink communications and the one or more downlink communications with greater communication reliability by reducing the interference between the one or more uplink communications and the one or more downlink communications.

Aspect 2: A method for wireless communications at a first wireless device, comprising: transmitting, to a second wireless device, a message indicating a capability of the first wireless device to support full-duplex line-of-sight (LOS) multiple-input multiple-output (MIMO) communications; receiving control signaling from the second wireless device in response to the message, the control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, wherein the uplink channel resource at least partially overlaps with the downlink channel resource in time, frequency, or both; and either: transmitting the one or more uplink communications via the uplink channel resource in accordance with the first set of one or more LOS MIMO transmission modes and receiving the one or more downlink communications via the downlink channel resource in accordance with the second set of one or more LOS MIMO transmission modes based at least in part on the control signaling; or receiving the one or more uplink communications via the uplink channel resource in accordance with the first set of one or more LOS MIMO transmission modes and transmitting the one or more downlink communications via the downlink channel resource in accordance with the second set of one or more LOS MIMO transmission modes based at least in part on the control signaling. The method of aspect 2 may enable the first wireless device to perform the one or more uplink communications and the one or more downlink communications with greater communication reliability by reducing the interference between the one or more uplink communications and the one or more downlink communications.

Aspect 3: The method of any of aspects 1 or 2, wherein receiving the control signaling comprises: receiving, from the second wireless device, a first control message indicating a mapping between a plurality of LOS MIMO transmission modes and a plurality of channel resource pairings, each channel resource pairing comprising a respective uplink channel resource of a plurality of uplink channel resources and a respective downlink channel resource of a plurality of downlink channel resources; and receiving, from the second wireless device, a second control message indicating a first channel resource pairing of the plurality of channel resource pairings comprising the uplink channel resource and the downlink channel resource. The method of aspect 3 may enable the second wireless device to indicate the uplink channel resource and the downlink channel resource with reduced signaling overhead.

Aspect 4: The method of any of aspects 1 through 3, wherein receiving the control signaling comprises: receiving, from the second wireless device, a first control message indicating a mapping between a plurality of LOS MIMO transmission modes and a plurality of transmission configuration indicator states; and receiving, from the second wireless device, a second control message indicating one or both of a first transmission configuration indicator state of the plurality of transmission configuration indicator states to be used for the one or more uplink communications or a second transmission configuration indicator state of the plurality of transmission configuration indicator states to be used for the one or more downlink communications. The method of aspect 4 may enable the second wireless device to indicate the first transmission configuration indicator state and the second transmission configuration indicator state with reduced signaling overhead.

Aspect 5: The method of any of aspects 1 through 4, wherein receiving the control signaling comprises: receiving, from the second wireless device, a first control message indicating a mapping between a plurality of LOS MIMO transmission modes and a plurality of polarizations; and receiving, from the second wireless device, a second control message indicating one or both of a first polarization of the plurality of polarizations to be used for transmission of the one or more uplink communications or a second polarization of the plurality of polarizations to be used for transmission of the one or more downlink communications. The method of aspect 5 may enable the second wireless device to indicate the first polarization and the second polarization with reduced signaling overhead.

Aspect 6: The method of any of aspects 1 through 5, wherein receiving the control signaling comprises: receiving, from the second wireless device, a first control message indicating a mapping between a plurality of LOS MIMO transmission modes and a plurality of precoding schemes; and receiving, from the second wireless device, a second control message indicating one or both of a first precoding scheme of the plurality of precoding schemes to be used for transmission of the one or more uplink communications or a second precoding scheme of the plurality of precoding schemes to be used for transmission of the one or more downlink communications. The method of aspect 4 may enable the second wireless device to indicate the first precoding scheme and the second precoding scheme with reduced signaling overhead.

Aspect 7: The method of any of aspects 1 through 6, wherein receiving the control signaling comprises: receiving the control signaling indicating the first set of one or more LOS MIMO transmission modes to be used for the one or more uplink communications, the first set of one or more LOS MIMO transmission modes corresponding to the uplink channel resource to be used for transmission of the one or more uplink communications, a transmission priority of the one or more uplink communications, a quality of service threshold associated with the one or more uplink communications, a precoding scheme to be used for transmission of the one or more uplink communications, or a combination thereof.

Aspect 8: The method of any of aspects 1 through 7, wherein receiving the control signaling comprises: receiving the control signaling indicating the second set of one or more LOS MIMO transmission modes to be used for the one or more downlink communications, the second set of one or more LOS MIMO transmission modes corresponding to the downlink channel resource to be used for transmission of the one or more downlink communications, a transmission priority of the one or more downlink communications, a quality of service threshold associated with the one or more downlink communications, a precoding scheme to be used for transmission of the one or more downlink communications, or a combination thereof.

Aspect 9: The method of any of aspects 1 through 8, wherein receiving the control signaling comprises: receiving the control signaling indicating a first set of one or more polarizations to be used for transmission of the one or more uplink communications, a second set of one or more polarizations to be used for transmission of the one or more downlink communications, or both.

Aspect 10: The method of any of aspects 1 through 9, wherein receiving the control signaling comprises: receiving the control signaling indicating a pattern of one or more LOS MIMO transmission modes to be used for the one or more uplink communications, the pattern corresponding to a transport block size of the one or more uplink communications, a quality of service threshold associated with the one or more uplink communications, a priority level of the one or more uplink communications, a transmission configuration indicator state to be used for the one or more uplink communications, or a combination thereof.

Aspect 11: The method of any of aspects 1 through 10, wherein receiving the control signaling comprises: receiving the control signaling indicating a pattern of LOS MIMO transmission modes to be used for the one or more downlink communications, the pattern corresponding to a transport block size of the one or more downlink communications, a quality of service threshold associated with the one or more downlink communications, a priority level of the one or more downlink communications, a transmission configuration indicator state to be used for the one or more downlink communications, or a combination thereof.

Aspect 12: The method of any of aspects 1 through 11, wherein receiving the control signaling comprises: receiving the control signaling indicating a number of uplink repetitions for the one or more uplink communications, a number of downlink repetitions for the one or more downlink communications, a mapping between the first set of one or more LOS MIMO transmission modes and the number of uplink repetitions, a mapping between the second set of one or more LOS MIMO transmission modes and the number of downlink repetitions, or a combination thereof.

Aspect 13: The method of any of aspects 1 through 12, wherein receiving the control signaling comprises: receiving one or more of a radio resource control message or an instance of downlink control information indicating the uplink channel resource, the downlink channel resource, the first set of one or more LOS MIMO transmission modes, the second set of one or more LOS MIMO transmission modes, or a combination thereof.

Aspect 14: The method of any of aspects 1 through 13, further comprising: determining a rotation matrix based at least in part on an alignment between a first antenna array of the first wireless device and a second antenna array of the second wireless device; and compensating the one or more downlink communications, the one or more uplink communications, or both based at least in part on the rotation matrix.

Aspect 15: The method of any of aspects 1 through 14, wherein communicating the one or more uplink communications and the one or more downlink communications comprises: communicating the one or more uplink communications and the one or more downlink communications in accordance with a Slepian-based precoding scheme or a Legendre-based precoding scheme.

Aspect 16: The method of any of aspects 1 through 15, wherein communicating the one or more uplink communications and the one or more downlink communications comprises: communicating the one or more uplink communications and the one or more downlink communications using a uniform linear array structure, a uniform rectangular array structure, a uniform circular array structure, or a uniform planar array structure.

Aspect 17: A method for wireless communications at a first wireless device, comprising: receiving, from a second wireless device, a message indicating a capability of the second wireless device to support full-duplex LOS MIMO communications; transmitting, based at least in part on receiving the message from the second wireless device, control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, wherein the uplink channel resource at least partially overlaps with the downlink channel resource in time, frequency, or both; and communicating the one or more uplink communications via the uplink channel resource in accordance with the first set of one or more LOS MIMO transmission modes and the one or more downlink communications via the downlink channel resource in accordance with the second set of one or more LOS MIMO transmission modes based at least in part on the control signaling. The method of aspect 17 may enable the first wireless device to perform the one or more uplink communications and the one or more downlink communications with greater communication reliability by reducing the interference between the one or more uplink communications and the one or more downlink communications.

Aspect 18: A method for wireless communications at a first wireless device, comprising: receiving, from a second wireless device, a message indicating a capability of the second wireless device to support full-duplex LOS MIMO communications; transmitting, based at least in part on receiving the message from the second wireless device, control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, wherein the uplink channel resource at least partially overlaps with the downlink channel resource in time, frequency, or both; and either: receiving the one or more uplink communications via the uplink channel resource in accordance with the first set of one or more LOS MIMO transmission modes and transmitting the one or more downlink communications via the downlink channel resource in accordance with the second set of one or more LOS MIMO transmission modes based at least in part on the control signaling; or transmitting the one or more uplink communications via the uplink channel resource in accordance with the first set of one or more LOS MIMO transmission modes and receiving the one or more downlink communications via the downlink channel resource in accordance with the second set of one or more LOS MIMO transmission modes based at least in part on the control signaling. The method of aspect 18 may enable the first wireless device to perform the one or more uplink communications and the one or more downlink communications with greater communication reliability by reducing the interference between the one or more uplink communications and the one or more downlink communications.

Aspect 19: The method of any of aspects 17 or 18, wherein transmitting the control signaling comprises: transmitting a first control message indicating a mapping between a plurality of LOS MIMO transmission modes and a plurality of channel resource pairings, each channel resource pairing comprising a respective uplink channel resource of a plurality of uplink channel resources and a respective downlink channel resource of a plurality of downlink channel resources; and transmitting a second control message indicating a first channel resource pairing of the plurality of channel resource pairings comprising the uplink channel resource and the downlink channel resource. The method of aspect 19 may enable the first wireless device to indicate the uplink channel resource and the downlink channel resource with reduced signaling overhead.

Aspect 20: The method of any of aspects 17 through 19, wherein transmitting the control signaling comprises: transmitting a first control message indicating a mapping between a plurality of LOS MIMO transmission modes and a plurality of transmission configuration indicator states; and transmitting a second control message indicating one or both of a first transmission configuration indicator state to be used for the one or more uplink communications or a second transmission configuration indicator state to be used for the one or more downlink communications. The method of aspect 20 may enable the first wireless device to indicate the first transmission configuration indicator state and the second transmission configuration indicator state with reduced signaling overhead.

Aspect 21: The method of any of aspects 17 through 20, wherein transmitting the control signaling comprises: transmitting a first control message indicating a mapping between a plurality of LOS MIMO transmission modes and a plurality of polarizations; and transmitting a second control message indicating one or both of a first polarization of the plurality of polarizations to be used for transmission of the one or more uplink communications or a second polarization of the plurality of polarizations to be used for transmission of the one or more downlink communications. The method of aspect 21 may enable the first wireless device to indicate the first polarization and the second polarization with reduced signaling overhead.

Aspect 22: The method of any of aspects 17 through 21, wherein transmitting the control signaling comprises: transmitting a first control message indicating a mapping between a plurality of LOS MIMO transmission modes and a plurality of precoding schemes; and transmitting a second control message indicating one or both of a first precoding scheme of the plurality of precoding schemes to be used for transmission of the one or more uplink communications or a second precoding scheme of the plurality of precoding schemes to be used for transmission of the one or more downlink communications. The method of aspect 21 may enable the first wireless device to indicate the first precoding scheme and the second precoding scheme with reduced signaling overhead.

Aspect 23: The method of any of aspects 17 through 22, wherein transmitting the control signaling comprises: transmitting the control signaling indicating the first set of one or more LOS MIMO transmission modes to be used for the one or more uplink communications, wherein the first set of one or more LOS MIMO transmission modes corresponds to the uplink channel resource to be used for transmission of the one or more uplink communications, a transmission priority of the one or more uplink communications, a quality of service threshold associated with the one or more uplink communications, a precoding scheme to be used for transmission of the one or more uplink communications, or a combination thereof.

Aspect 24: The method of any of aspects 17 through 23, wherein transmitting the control signaling comprises: transmitting the control signaling indicating the second set of one or more LOS MIMO transmission modes to be used for the one or more downlink communications, wherein the second set of one or more LOS MIMO transmission modes corresponds to the downlink channel resource to be used for transmission of the one or more downlink communications, a transmission priority of the one or more downlink communications, a quality of service threshold associated with the one or more downlink communications, a precoding scheme to be used for the one or more downlink communications, or a combination thereof.

Aspect 25: The method of any of aspects 17 through 24, wherein transmitting the control signaling comprises: transmitting the control signaling indicating a first set of one or more polarizations to be used for transmission of the one or more uplink communications, a second set of one or more polarizations to be used for transmission of the one or more downlink communications, or both.

Aspect 26: The method of any of aspects 17 through 25, wherein transmitting the control signaling comprises: transmitting the control signaling indicating a pattern of one or more LOS MIMO transmission modes to be used for the one or more uplink communications, the pattern corresponding to a transport block size of the one or more uplink communications, a quality of service threshold associated with the one or more uplink communications, a priority level of the one or more uplink communications, a transmission configuration indicator state to be used for the one or more uplink communications, or a combination thereof.

Aspect 27: The method of any of aspects 17 through 26, wherein transmitting the control signaling comprises: transmitting the control signaling indicating a pattern of LOS MIMO transmission modes to be used for the one or more downlink communications, the pattern corresponding to a transport block size of the one or more downlink communications, a quality of service threshold associated with the one or more downlink communications, a priority level of the one or more downlink communications, a transmission configuration indicator state to be used for the one or more downlink communications, or a combination thereof.

Aspect 28: The method of any of aspects 17 through 27, wherein transmitting the control signaling comprises: transmitting the control signaling indicating a number of uplink repetitions for the one or more uplink communications, a number of downlink repetitions for the one or more downlink communications, a mapping between the first set of one or more LOS MIMO transmission modes and the number of uplink repetitions, a mapping between the second set of one or more LOS MIMO transmission modes and the number of downlink repetitions, or a combination thereof.

Aspect 29: The method of any of aspects 17 through 28, wherein transmitting the control signaling comprises: transmitting one or more of a radio resource control message or an instance of downlink control information indicating the uplink channel resource, the downlink channel resource, the first set of one or more LOS MIMO transmission modes, the second set of one or more LOS MIMO transmission modes, or a combination thereof.

Aspect 30: The method of any of aspects 17 through 29, further comprising: determining an interference estimate based at least in part on the first set of one or more LOS MIMO transmission modes and the second set of one or more LOS MIMO transmission modes; and compensating the one or more downlink communications, the one or more uplink communications, or both based at least in part on the interference estimate.

Aspect 31: An apparatus for wireless communications at a first wireless device, comprising a processor; memory coupled with the processor; and one or more instructions stored in the memory and executable by the processor to cause the apparatus to, based at least in part on the one or more instructions, perform a method of any of aspects 1 through 16.

Aspect 32: An apparatus for wireless communications at a first wireless device, comprising at least one means for performing a method of any of aspects 1 through 16.

Aspect 33: A non-transitory computer-readable medium storing code for wireless communications at a first wireless device, the code comprising instructions executable by a processor to perform a method of any of aspects 1 through 16.

Aspect 34: An apparatus for wireless communications at a first wireless device, comprising a processor; memory coupled with the processor; and one or more instructions stored in the memory and executable by the processor to cause the apparatus to, based at least in part on the one or more instructions, perform a method of any of aspects 17 through 30.

Aspect 35: An apparatus for wireless communications at a first wireless device, comprising at least one means for performing a method of any of aspects 17 through 30.

Aspect 36: A non-transitory computer-readable medium storing code for wireless communications at a first wireless device, the code comprising instructions executable by a processor to perform a method of any of aspects 17 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:

transmitting, to a second wireless device, a message indicating a capability of the first wireless device to support full-duplex line-of-sight (LOS) multiple-input multiple-output (MIMO) communications;

receiving control signaling from the second wireless device in response to the message, the control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, wherein the uplink channel resource at least partially overlaps with the downlink channel resource in time, frequency, or both; and communicating the one or more uplink communications via the uplink channel resource in accordance with the first set of one or more LOS MIMO transmission modes and the one or more downlink communications via the downlink channel resource in accordance with the second set of one or more LOS MIMO transmission modes based at least in part on the control signaling.

2. The method of claim 1, wherein receiving the control signaling comprises:

receiving, from the second wireless device, a first control message indicating a mapping between a plurality of LOS MIMO transmission modes and a plurality of channel resource pairings, each channel resource pairing comprising a respective uplink channel resource of a plurality of uplink channel resources and a respective downlink channel resource of a plurality of downlink channel resources; and receiving, from the second wireless device, a second control message indicating a first channel resource pairing of the plurality of channel resource pairings comprising the uplink channel resource and the downlink channel resource.

3. The method of claim 1, wherein receiving the control signaling comprises:

receiving, from the second wireless device, a first control message indicating a mapping between a plurality of LOS MIMO transmission modes and a plurality of transmission configuration indicator states; and receiving, from the second wireless device, a second control message indicating one or both of a first transmission configuration indicator state of the plurality of transmission configuration indicator states to be used for the one or more uplink communications or a second transmission configuration indicator state of the plurality of transmission configuration indicator states to be used for the one or more downlink communications.

4. The method of claim 1, wherein receiving the control signaling comprises:

receiving, from the second wireless device, a first control message indicating a mapping between a plurality of LOS MIMO transmission modes and a plurality of polarizations; and receiving, from the second wireless device, a second control message indicating one or both of a first polarization of the plurality of polarizations to be used for transmission of the one or more uplink communications or a second polarization of the plurality of polarizations to be used for transmission of the one or more downlink communications.

5. The method of claim 1, wherein receiving the control signaling comprises:

receiving, from the second wireless device, a first control message indicating a mapping between a plurality of LOS MIMO transmission modes and a plurality of precoding schemes; and receiving, from the second wireless device, a second control message indicating one or both of a first precoding scheme of the plurality of precoding schemes to be used for transmission of the one or more uplink communications or a second precoding scheme of the plurality of precoding schemes to be used for transmission of the one or more downlink communications.

6. The method of claim 1, wherein receiving the control signaling comprises:

receiving the control signaling indicating the first set of one or more LOS MIMO transmission modes to be used for the one or more uplink communications, the first set of one or more LOS MIMO transmission modes corresponding to the uplink channel resource to be used for transmission of the one or more uplink communications, a transmission priority of the one or more uplink communications, a quality of service threshold associated with the one or more uplink communications, a precoding scheme to be used for transmission of the one or more uplink communications, or a combination thereof.

7. The method of claim 1, wherein receiving the control signaling comprises:

receiving the control signaling indicating the second set of one or more LOS MIMO transmission modes to be used for the one or more downlink communications, the second set of one or more LOS MIMO transmission modes corresponding to the downlink channel resource to be used for transmission of the one or more downlink communications, a transmission priority of the one or more downlink communications, a quality of service threshold associated with the one or more downlink communications, a precoding scheme to be used for transmission of the one or more downlink communications, or a combination thereof.

8. The method of claim 1, wherein receiving the control signaling comprises:

receiving the control signaling indicating a first set of one or more polarizations to be used for transmission of the one or more uplink communications, a second set of one or more polarizations to be used for transmission of the one or more downlink communications, or both.

9. The method of claim 1, wherein receiving the control signaling comprises:

receiving the control signaling indicating a pattern of one or more LOS MIMO transmission modes to be used for the one or more uplink communications, the pattern corresponding to a transport block size of the one or more uplink communications, a quality of service threshold associated with the one or more uplink communications, a priority level of the one or more uplink communications, a transmission configuration indicator state to be used for the one or more uplink communications, or a combination thereof.

10. The method of claim 1, wherein receiving the control signaling comprises:

receiving the control signaling indicating a pattern of LOS MIMO transmission modes to be used for the one or more downlink communications, the pattern corresponding to a transport block size of the one or more downlink communications, a quality of service threshold associated with the one or more downlink communications, a priority level of the one or more downlink communications, a transmission configuration indicator state to be used for the one or more downlink communications, or a combination thereof.

11. The method of claim 1, wherein receiving the control signaling comprises:

receiving the control signaling indicating a number of uplink repetitions for the one or more uplink communications, a number of downlink repetitions for the one or more downlink communications, a mapping between the first set of one or more LOS MIMO transmission modes and the number of uplink repetitions, a mapping between the second set of one or more LOS MIMO transmission modes and the number of downlink repetitions, or a combination thereof.

12. The method of claim 1, wherein receiving the control signaling comprises:

receiving one or more of a radio resource control message or an instance of downlink control information indicating the uplink channel resource, the downlink channel resource, the first set of one or more LOS MIMO transmission modes, the second set of one or more LOS MIMO transmission modes, or a combination thereof.

13. The method of claim 1, further comprising:

determining a rotation matrix based at least in part on an alignment between a first antenna array of the first wireless device and a second antenna array of the second wireless device; and compensating the one or more downlink communications, the one or more uplink communications, or both based at least in part on the rotation matrix.

14. The method of claim 1, wherein communicating the one or more uplink communications and the one or more downlink communications comprises:

communicating the one or more uplink communications and the one or more downlink communications in accordance with a Slepian-based precoding scheme or a Legendre-based precoding scheme.

15. The method of claim 1, wherein communicating the one or more uplink communications and the one or more downlink communications comprises:

communicating the one or more uplink communications and the one or more downlink communications using a uniform linear array structure, a uniform rectangular array structure, a uniform circular array structure, or a uniform planar array structure.

16. A method for wireless communications at a first wireless device, comprising:

receiving, from a second wireless device, a message indicating a capability of the second wireless device to support full-duplex line-of-sight (LOS) multiple-input multiple-output (MIMO) communications;

transmitting, based at least in part on receiving the message from the second wireless device, control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, wherein the uplink channel resource at least partially overlaps with the downlink channel resource in time, frequency, or both; and communicating the one or more uplink communications via the uplink channel resource in accordance with the first set of one or more LOS MIMO transmission modes and the one or more downlink communications via the downlink channel resource in accordance with the second set of one or more LOS MIMO transmission modes based at least in part on the control signaling.

17. The method of claim 16, wherein transmitting the control signaling comprises:

transmitting a first control message indicating a mapping between a plurality of LOS MIMO transmission modes and a plurality of channel resource pairings, each channel resource pairing comprising a respective uplink channel resource of a plurality of uplink channel resources and a respective downlink channel resource of a plurality of downlink channel resources; and transmitting a second control message indicating a first channel resource pairing of the plurality of channel resource pairings comprising the uplink channel resource and the downlink channel resource.

18. The method of claim 16, wherein transmitting the control signaling comprises:

transmitting a first control message indicating a mapping between a plurality of LOS MIMO transmission modes and a plurality of transmission configuration indicator states; and transmitting a second control message indicating one or both of a first transmission configuration indicator state to be used for the one or more uplink communications or a second transmission configuration indicator state to be used for the one or more downlink communications.

19. The method of claim 16, wherein transmitting the control signaling comprises:

transmitting a first control message indicating a mapping between a plurality of LOS MIMO transmission modes and a plurality of polarizations; and transmitting a second control message indicating one or both of a first polarization of the plurality of polarizations to be used for transmission of the one or more uplink communications or a second polarization of the plurality of polarizations to be used for transmission of the one or more downlink communications.

20. The method of claim 16, wherein transmitting the control signaling comprises:

transmitting a first control message indicating a mapping between a plurality of LOS MIMO transmission modes and a plurality of precoding schemes; and transmitting a second control message indicating one or both of a first precoding scheme of the plurality of precoding schemes to be used for transmission of the one or more uplink communications or a second precoding scheme of the plurality of precoding schemes to be used for transmission of the one or more downlink communications.

21. The method of claim 16, wherein transmitting the control signaling comprises:

transmitting the control signaling indicating the first set of one or more LOS MIMO transmission modes to be used for the one or more uplink communications, wherein the first set of one or more LOS MIMO transmission modes corresponds to the uplink channel resource to be used for transmission of the one or more uplink communications, a transmission priority of the one or more uplink communications, a quality of service threshold associated with the one or more uplink communications, a precoding scheme to be used for transmission of the one or more uplink communications, or a combination thereof.

22. The method of claim 16, wherein transmitting the control signaling comprises:

transmitting the control signaling indicating the second set of one or more LOS MIMO transmission modes to be used for the one or more downlink communications, wherein the second set of one or more LOS MIMO transmission modes corresponds to the downlink channel resource to be used for transmission of the one or more downlink communications, a transmission priority of the one or more downlink communications, a quality of service threshold associated with the one or more downlink communications, a precoding scheme to be used for the one or more downlink communications, or a combination thereof.

23. The method of claim 16, wherein transmitting the control signaling comprises:

transmitting the control signaling indicating a first set of one or more polarizations to be used for transmission of the one or more uplink communications, a second set of one or more polarizations to be used for transmission of the one or more downlink communications, or both.

24. The method of claim 16, wherein transmitting the control signaling comprises:

transmitting the control signaling indicating a pattern of one or more LOS MIMO transmission modes to be used for the one or more uplink communications, the pattern corresponding to a transport block size of the one or more uplink communications, a quality of service threshold associated with the one or more uplink communications, a priority level of the one or more uplink communications, a transmission configuration indicator state to be used for the one or more uplink communications, or a combination thereof.

25. The method of claim 16, wherein transmitting the control signaling comprises:

transmitting the control signaling indicating a pattern of LOS MIMO transmission modes to be used for the one or more downlink communications, the pattern corresponding to a transport block size of the one or more downlink communications, a quality of service threshold associated with the one or more downlink communications, a priority level of the one or more downlink communications, a transmission configuration indicator state to be used for the one or more downlink communications, or a combination thereof.

26. The method of claim 16, wherein transmitting the control signaling comprises:

transmitting the control signaling indicating a number of uplink repetitions for the one or more uplink communications, a number of downlink repetitions for the one or more downlink communications, a mapping between the first set of one or more LOS MIMO transmission modes and the number of uplink repetitions, a mapping between the second set of one or more LOS MIMO transmission modes and the number of downlink repetitions, or a combination thereof.

27. The method of claim 16, wherein transmitting the control signaling comprises:

transmitting one or more of a radio resource control message or an instance of downlink control information indicating the uplink channel resource, the downlink channel resource, the first set of one or more LOS MIMO transmission modes, the second set of one or more LOS MIMO transmission modes, or a combination thereof.

28. The method of claim 16, further comprising:

determining an interference estimate based at least in part on the first set of one or more LOS MIMO transmission modes and the second set of one or more LOS MIMO transmission modes; and compensating the one or more downlink communications, the one or more uplink communications, or both based at least in part on the interference estimate.

29. An apparatus for wireless communications at a first wireless device, comprising:

a processor;

memory coupled with the processor; and one or more instructions stored in the memory and executable by the processor to cause the apparatus to, based at least in part on the one or more instructions:

transmit, to a second wireless device, a message indicating a capability of the first wireless device to support full-duplex line-of-sight (LOS) multiple-input multiple-output (MIMO) communications;

receive control signaling from the second wireless device in response to the message, the control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, wherein the uplink channel resource at least partially overlaps with the downlink channel resource in time, frequency, or both; and communicate the one or more uplink communications via the uplink channel resource in accordance with the first set of one or more LOS MIMO transmission modes and the one or more downlink communications via the downlink channel resource in accordance with the second set of one or more LOS MIMO transmission modes based at least in part on the control signaling.

30. An apparatus for wireless communications at a first wireless device, comprising:

a processor;

memory coupled with the processor; and one or more instructions stored in the memory and executable by the processor to cause the apparatus to, based at least in part on the one or more instructions:

receive, from a second wireless device, a message indicating a capability of the second wireless device to support full-duplex line-of-sight (LOS) multiple-input multiple-output (MIMO) communications;

transmit, based at least in part on receiving the message from the second wireless device, control signaling indicating an uplink channel resource allocated for one or more uplink communications, a downlink channel resource allocated for one or more downlink communications, a first set of one or more LOS MIMO transmission modes to be used for the one or more uplink communications, and a second set of one or more LOS MIMO transmission modes to be used for the one or more downlink communications, wherein the uplink channel resource at least partially overlaps with the downlink channel resource in time, frequency, or both; and communicate the one or more uplink communications via the uplink channel resource in accordance with the first set of one or more LOS MIMO transmission modes and the one or more downlink communications via the downlink channel resource in accordance with the second set of one or more LOS MIMO transmission modes based at least in part on the control signaling.

* * * * *